(12) United States Patent
Besim et al.

(10) Patent No.: US 11,161,302 B2
(45) Date of Patent: Nov. 2, 2021

(54) MOVEMENT SYSTEM FOR ACHIEVING MOVEMENT OF AT LEAST A NOZZLE ASSEMBLY IN AN ADDITIVE MANUFACTURING MACHINE

(71) Applicants: Bulent Besim, South Melbourne (AU); Stephen Weatherly, Miami, FL (US)

(72) Inventors: Bulent Besim, South Melbourne (AU); Stephen Weatherly, Miami, FL (US)

(*) Notice: Subject to any disclaimer, the term of this patent is extended or adjusted under 35 U.S.C. 154(b) by 610 days.

(21) Appl. No.: 15/828,434

(22) Filed: Dec. 1, 2017

(65) Prior Publication Data
US 2019/0168452 A1    Jun. 6, 2019

(51) Int. Cl.
*B29C 64/236* (2017.01)
*B29C 64/118* (2017.01)
*B29C 64/232* (2017.01)
*B29C 64/295* (2017.01)
*B29C 64/209* (2017.01)
*B33Y 30/00* (2015.01)

(52) U.S. Cl.
CPC .......... *B29C 64/236* (2017.08); *B29C 64/118* (2017.08); *B29C 64/209* (2017.08); *B29C 64/232* (2017.08); *B29C 64/295* (2017.08); *B33Y 30/00* (2014.12)

(58) Field of Classification Search
CPC ... B29C 64/236; B29C 64/118; B29C 64/232; B29C 64/295; B29C 64/209
See application file for complete search history.

(56) References Cited

U.S. PATENT DOCUMENTS

| 5,097,716 A | * | 3/1992 | Barbat | B23Q 1/267 |
| | | | | 248/657 |
| 9,481,134 B2 | | 11/2016 | Steiner et al. | |
| 2013/0078073 A1 | * | 3/2013 | Comb | B29C 64/106 |
| | | | | 414/749.1 |
| 2016/0067920 A1 | * | 3/2016 | Fontaine | B29C 64/106 |
| | | | | 264/255 |
| 2016/0236407 A1 | | 8/2016 | Armani | |

FOREIGN PATENT DOCUMENTS

WO    WO-2017017622 A1 * 2/2017 ........... B29C 64/236

OTHER PUBLICATIONS https://web.archive.org/web/20180908135538/https://www.amazon.com/monoprice-assembled-filament-preloaded-printable/dp/b07515fg7p (Year: 2018).*

* cited by examiner

*Primary Examiner* — Joseph S Del Sole
*Assistant Examiner* — John Robitaille

(57) ABSTRACT

A movement system for achieving movement of at least a nozzle assembly in an additive manufacturing machine is provided. The movement system comprises a first tower and a belt assembly. The first tower is configured to move back and forth along a first axis. The belt assembly is configured to enable the back and forth movement of the first tower along the first axis. The belt assembly comprises a belt, a gear and at least two bearings. The belt interfaces with the gear and the two bearings, with one bearing on each side of the gear, such that the belt is sandwiched between the gear and the bearings. The belt is engaged to the first tower. Rotation of the gear results in movement of the belt, and thereby the first tower, along the first axis.

18 Claims, 57 Drawing Sheets

MOVEMENT SYSTEM FOR ACHIEVING MOVEMENT OF AT LEAST A NOZZLE ASSEMBLY IN AN ADDITIVE MANUFACTURING MACHINE

BACKGROUND

Unless otherwise indicated herein, the materials described in this section are not prior art to the claims in this application and are not admitted being prior art by inclusion in this section.

Field of the Invention

The subject matter in general relates to additive manufacturing machines. More particularly, but not exclusively, the subject matter relates to extruding the filament, cooling the molten filament getting deposited on a print plate and the movements in the additive manufacturing machine along different axes.

Discussion of the Related Field

Additive manufacturing (commonly referred to as either rapid prototyping or 3D-printing) has come a long way from building prototypes to manufacturing finished products that can be used in day to day life. Be it retail goods, food industry or medical implants, additive manufacturing is rapidly being adopted in every major industry out there.

Industries are always on the lookout for manufacturing products that are cheap, better, and that can be made in less time. Additive manufacturing, though, having addressed these problems to a great extent compared to conventional manufacturing methods, it lacks refinement in certain areas which needs improvement. Few of which have been discussed below.

One of the main problems related to additive manufacturing machines is the leakage or spillage of molten filament at the tip of the nozzle, when the additive manufacturing machine must be stopped, either momentarily or completely. This leakage of molten filament may result in inaccuracies in products or it may increase the time involved in tweaking the product, to make it a finished product. Also, the spillage leads to wastage of raw materials which in turn means more money spent on raw materials. Another problem that goes hand in hand with the former is that, the filament is retracted to a great deal, when printing has to be momentarily stopped, to reduce the leakage of the molten filament at the nozzle tip. This increases the time involved to retract and then extrude the filament, thereby increasing the print time and reducing the mechanical performance of the additive manufacturing machines.

Another area of concern with additive manufacturing machines relates to relatively slow and inefficient cooling of the molten filament that gets deposited on the print plate. The cool air blown towards the print plate, flows in all directions and is not localised. This results in slow cooling of the molten filament and the machine needs to pump in more cool air in order to cool the molten filament. Also, present additive manufacturing machines lack universally adaptable cooling mechanism to cool the molten filament getting deposited on the print plate.

In addition, the stability and movement of the nozzle assembly and the print plate of additive manufacturing machines plays a major role in printing quality and error-free products. Typically, additive manufacturing machines have the nozzle moving along a rod assembly that is not stable but also prone to twisting and sagging. Also, conventional belt assemblies used to move the nozzle and the print plate tends to lose tension. All this results in flawed printing.

In view of the foregoing discussion, there is a need for an improved and enhanced technique for reduced molten filament leakage at the nozzle tip, for cooling the molten filament after deposition and increased overall stability of the additive manufacturing machines.

SUMMARY

An embodiment provides a movement system for achieving movement of at least a nozzle assembly in an additive manufacturing machine is provided. The movement system comprises first tower and a belt assembly. The first tower is configured to move back and forth along a first axis. The belt assembly is configured to enable the back and forth movement of the first tower along the first axis. The belt assembly comprises a belt, a gear and at least two bearings. The belt interfaces with the gear and the two bearings, with one bearing on each side of the gear, such that the belt is sandwiched between the gear and the bearings. The belt is engaged to the first tower. The rotation of the gear results in movement of the belt, which in turn moves the first tower along the first axis.

In another embodiment, a movement system for achieving movement of at least a nozzle assembly in an additive manufacturing machine is provided. The movement system comprises a first tower, a second tower and a carriage system. The first tower is configured to move back and forth along a first axis, wherein the first tower comprises at least three primary rods. The second tower is configured to enable the movement of the first tower up and down along a second axis, wherein the second tower comprises at least three secondary rods. The carriage system is configured to enable the first tower to move back and forth, relative to the carriage system, along the first axis. The carriage system is further configured to enable the first tower to move up and down the second tower along the second axis. The carriage system moves up and down the second tower along the second axis. The carriage system defines a plurality of holes for the primary rods and the secondary rods to pass through.

In yet another embodiment, a movement system for achieving movement of at least a print plate in an additive manufacturing machine is provided. The movement system comprises a base tower and a belt assembly. The base tower is configured to move back and forth along a third axis. The belt assembly is configured to enable the back and forth movement of the base tower along the third axis. The belt assembly comprises a belt, a gear and at least two bearings. The belt interfaces with the gear and the two bearings, with one bearing on each side of the gear, such that the belt is sandwiched between the gear and the bearings. The belt is engaged to the base tower. The rotation of the gear results in movement of the belt, which in turn moves the base tower, along the third axis.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
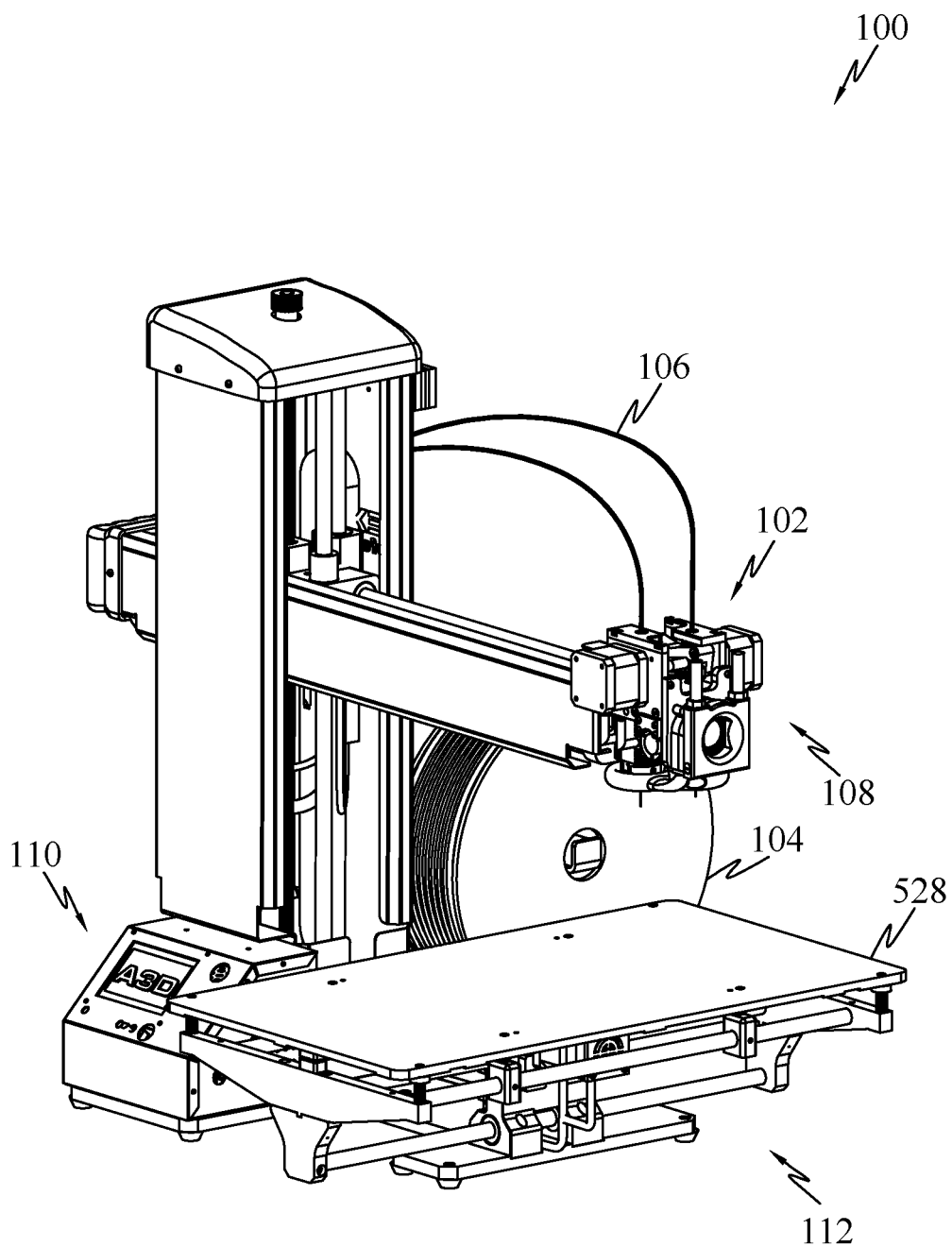
FIG. 1 is an exemplary illustration of an additive manufacturing machine 100, for feeding filament 106 from a spool 104 to a system 102, for cooling molten filament 106 using an integrated cooling system 108 and moving at least a nozzle assembly 206 and a print plate 528 using a movement system 112, in accordance with an embodiment.

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Referring to FIGS. 1, 2A, 2B, 8 and 17, a system 102 is provided for an additive manufacturing machine 100 for feeding a filament 106 from a spool 104 to a nozzle 508, an integrated cooling system 108 is provided for cooling molten filament 106 deposited on a print plate 528 of the additive manufacturing machine 100 and a movement system 112 is provided for the additive manufacturing machine 100 for moving at least a nozzle assembly 206 and the print plate 528.

Overview

Figure 2A:
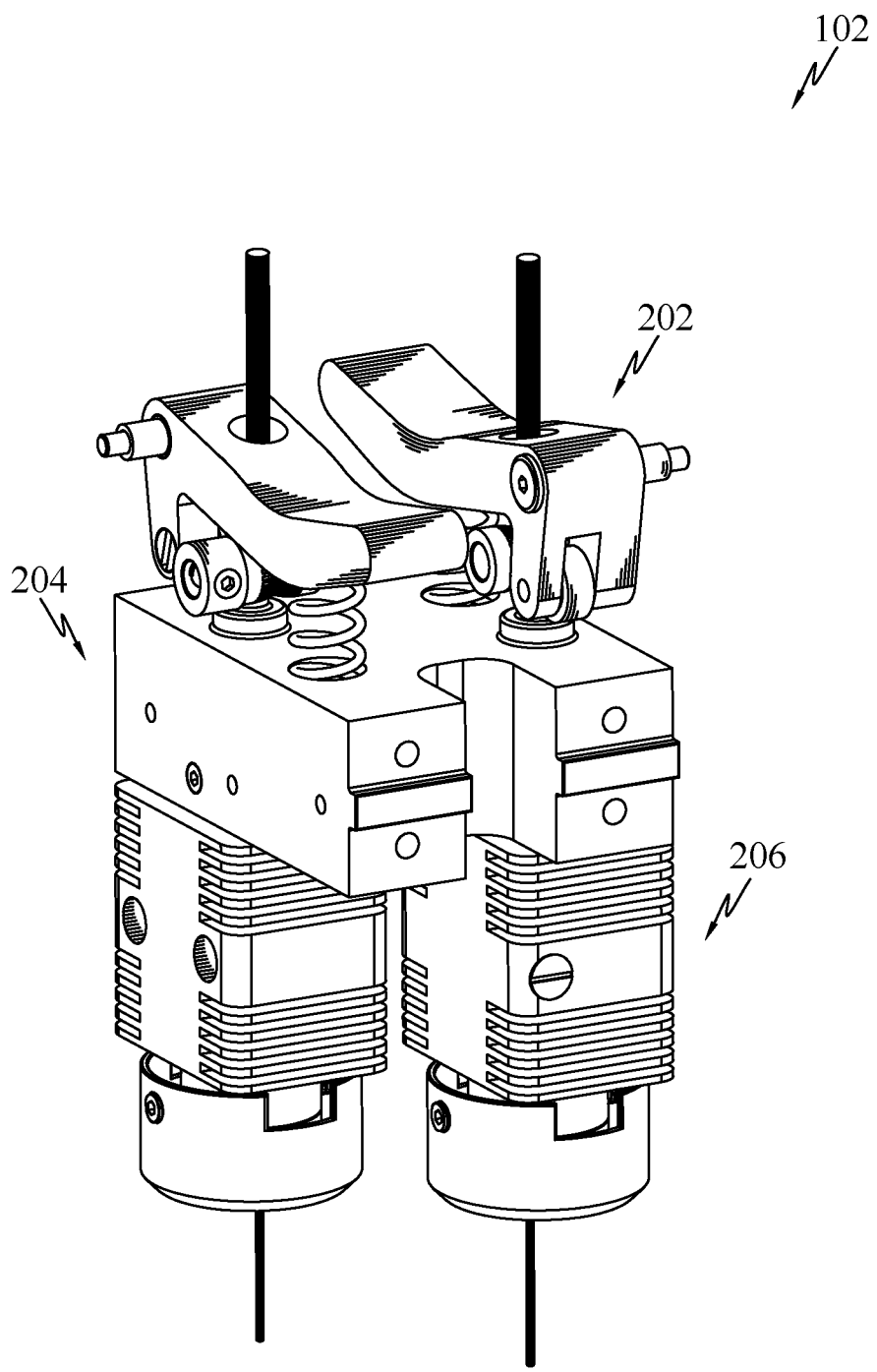
FIG. 2A is an isometric view of the system 102 including a filament extrusion assembly 202, a nozzle holder 204 and a nozzle assembly 206, in accordance with an embodiment.
Figure 4:
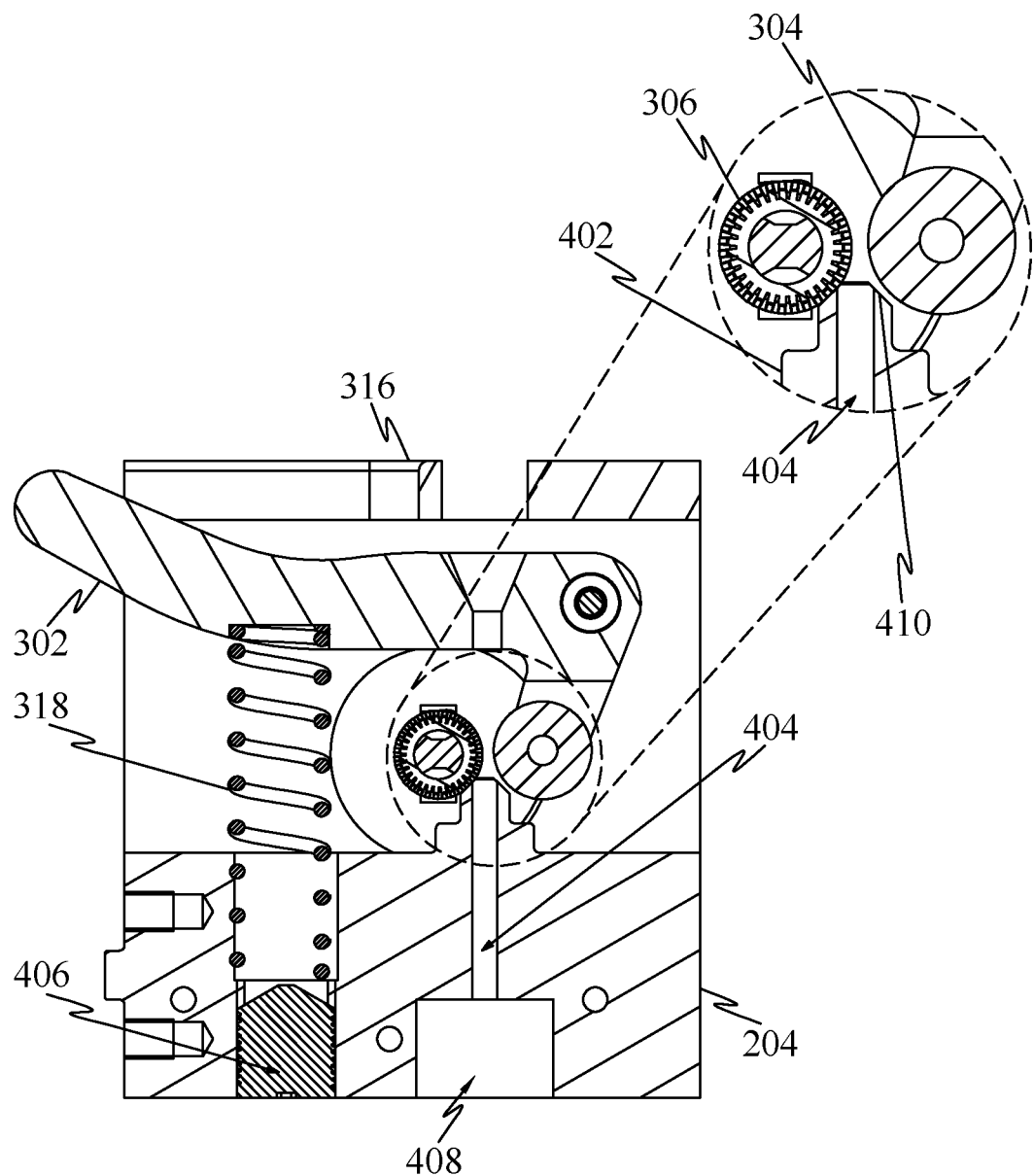
FIG. 4 is a section view of the filament extrusion assembly 202 and the nozzle holder 204, including a detailed view of a protruded portion 402, in accordance with an embodiment.
Figure 5A:
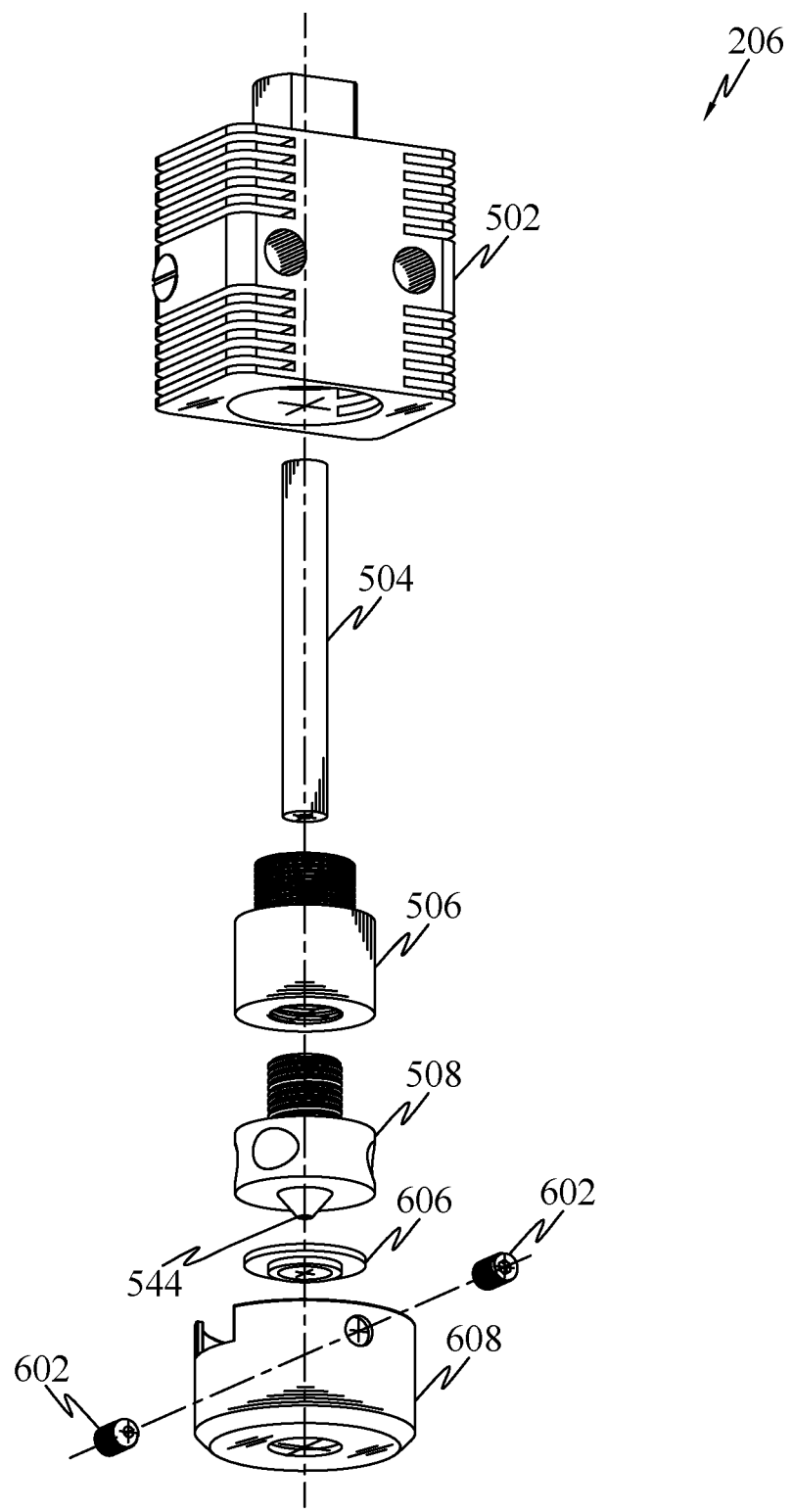
FIG. 5A is an exploded view of the nozzle assembly 206, in accordance with an embodiment.
Figures 5B, 5C:
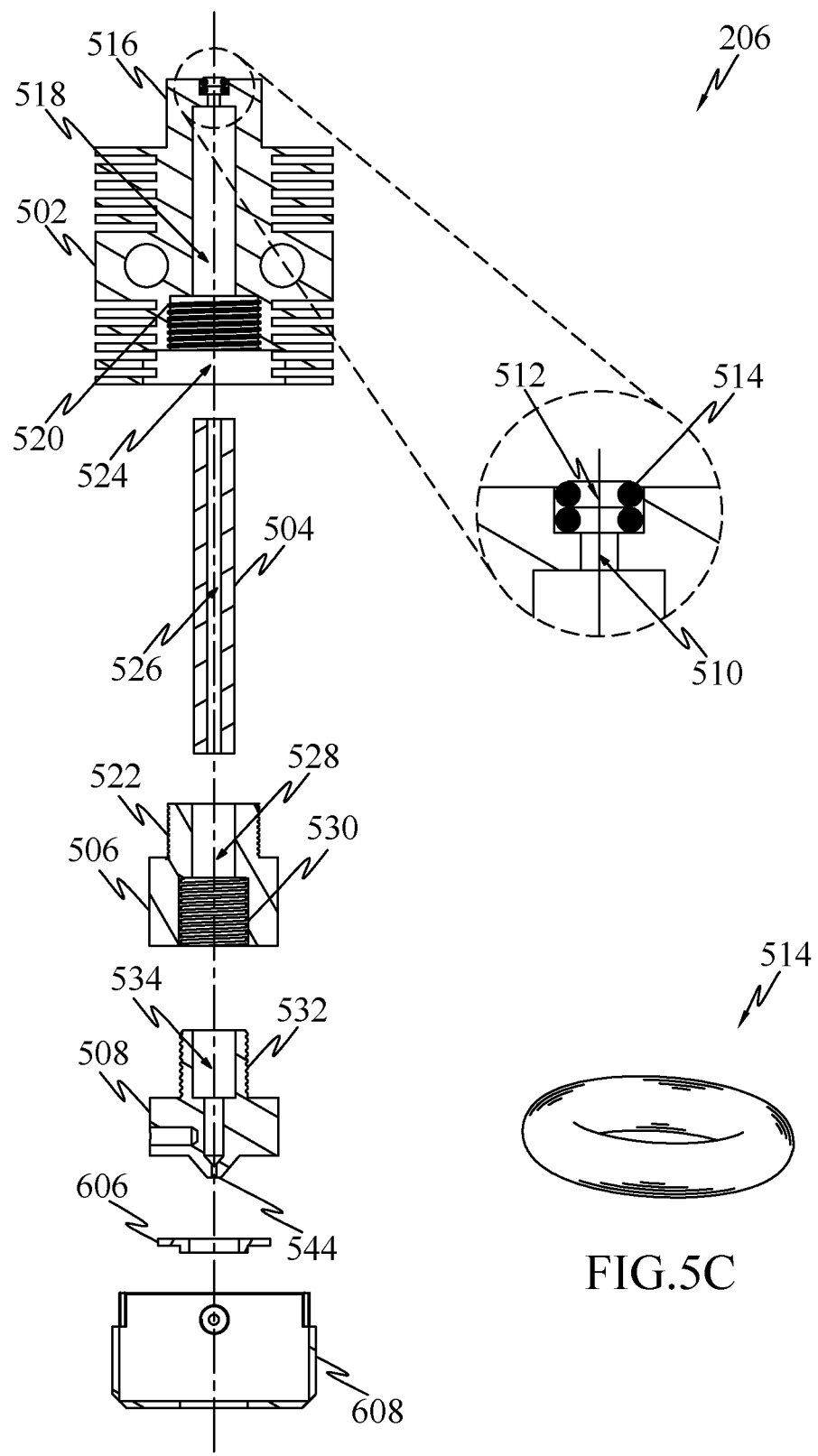
FIG. 5B is an exploded section view of the nozzle assembly 206, including a detailed view of a groove 512 and a sealing member 514, in accordance with an embodiment.
FIG. 5C is an isometric view of an O-ring sealing member 514, in accordance with an embodiment.

The additive manufacturing machine 100 has a mechanism for feeding the filament 106 from the spool 104 to the nozzle. Referring to FIG. 2A, the system 102 may include a filament extrusion assembly 202, a nozzle holder 204 and a nozzle assembly 206. Referring to FIG. 4, the nozzle holder 204 may further include a protruded portion 402, wherein the nozzle holder 204 may define a through hole 404 that may extend into the protruded portion 402. Referring to FIGS. 5A-5B, the nozzle assembly 206 may further include a cooling chamber 502. The cooling chamber 502 may define a through hole 510, that may be aligned with the through hole 404 of the nozzle holder 204. The cooling chamber 502 may define at least one groove 512 coaxial with the through hole 510 of the cooling chamber 502 to accommodate at least one sealing member 514. The filament extrusion assembly 202 may extrude the filament 106, from the spool 104, into the nozzle holder 204 using (refer FIG. 3B) a pusher arm 302, a bearing 304 and a gear 306 assembly. The protruded portion 402 of the nozzle holder 204 may receive the extruded filament 106 from the filament extrusion assembly 202. The filament 106 may then enter the nozzle assembly 206 through the sealing member 514, forming an air tight path for the filament 106 to enter the nozzle 508.

Figure 8:
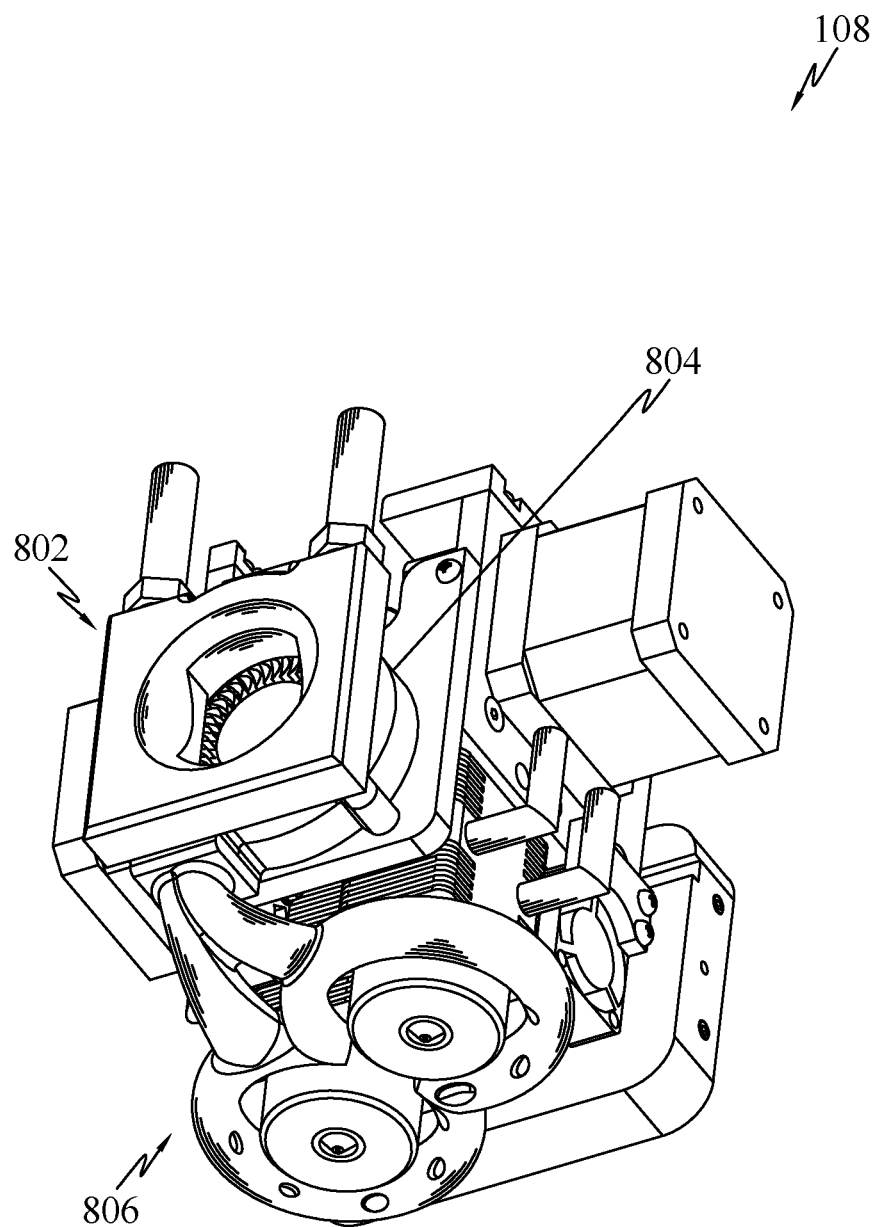
FIG. 8 is an isometric view of the integrated cooling system 108 including a cooler 802, a blower 804 and a delivery duct 806, in accordance with an embodiment.

Now moving on, the integrated cooling system 108 is provided for cooling the molten filament 106 deposited on the print plate of the additive manufacturing machine 100. Referring to FIG. 8, the integrated cooling system 108 may include a cooler 802 to cool air, a blower 804 and a delivery duct 806. The cooler 802 may be attached to a cooling mechanism using cooling ducts 904 (refer FIGS. 9A-9C). The cooling mechanism may infuse a cool fluid into a cavity 910, defined by the cooler 802, using the cooling ducts 904. The cooler 802 may be kept cool due to the cool fluid circulating within the cooler 802. The blower 804 may suck atmospheric air through an opening 902, defined by the cooler 802, and may deliver the air to the delivery duct 806. The atmospheric air coming in contact with the cooler 802 may become cool. The delivery duct 806 may define a plurality of vents 1106 (refer FIGS. 11A-11B). The blower 804 and the delivery duct 806 may be connected to each other using a connecting duct 1104. The blower 804 may blow the cool air into the delivery duct 806 through the connecting duct 1104. The cool air may exit the delivery duct 806 through the plurality of vents 1106 and rapidly cool the molten filament 106 getting deposited on the print plate 528 of the additive manufacturing machine 100.

Figure 17:
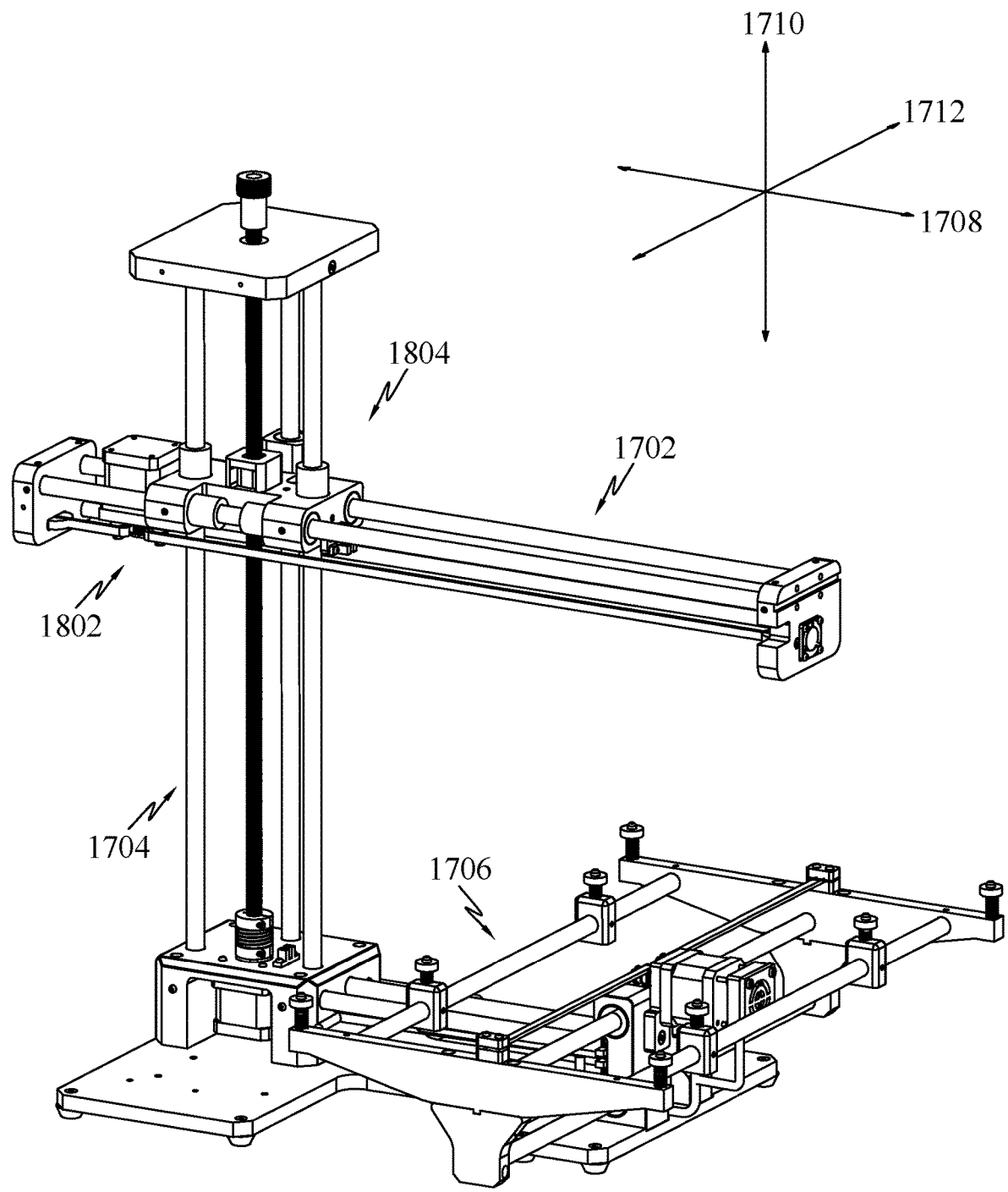
FIG. 17 is an isometric view of the movement system 112 including a first tower 1702, a second tower 1704, a belt assembly 1802, a base tower 1706 and a carriage system 1804, in accordance with an embodiment.
Figure 18:
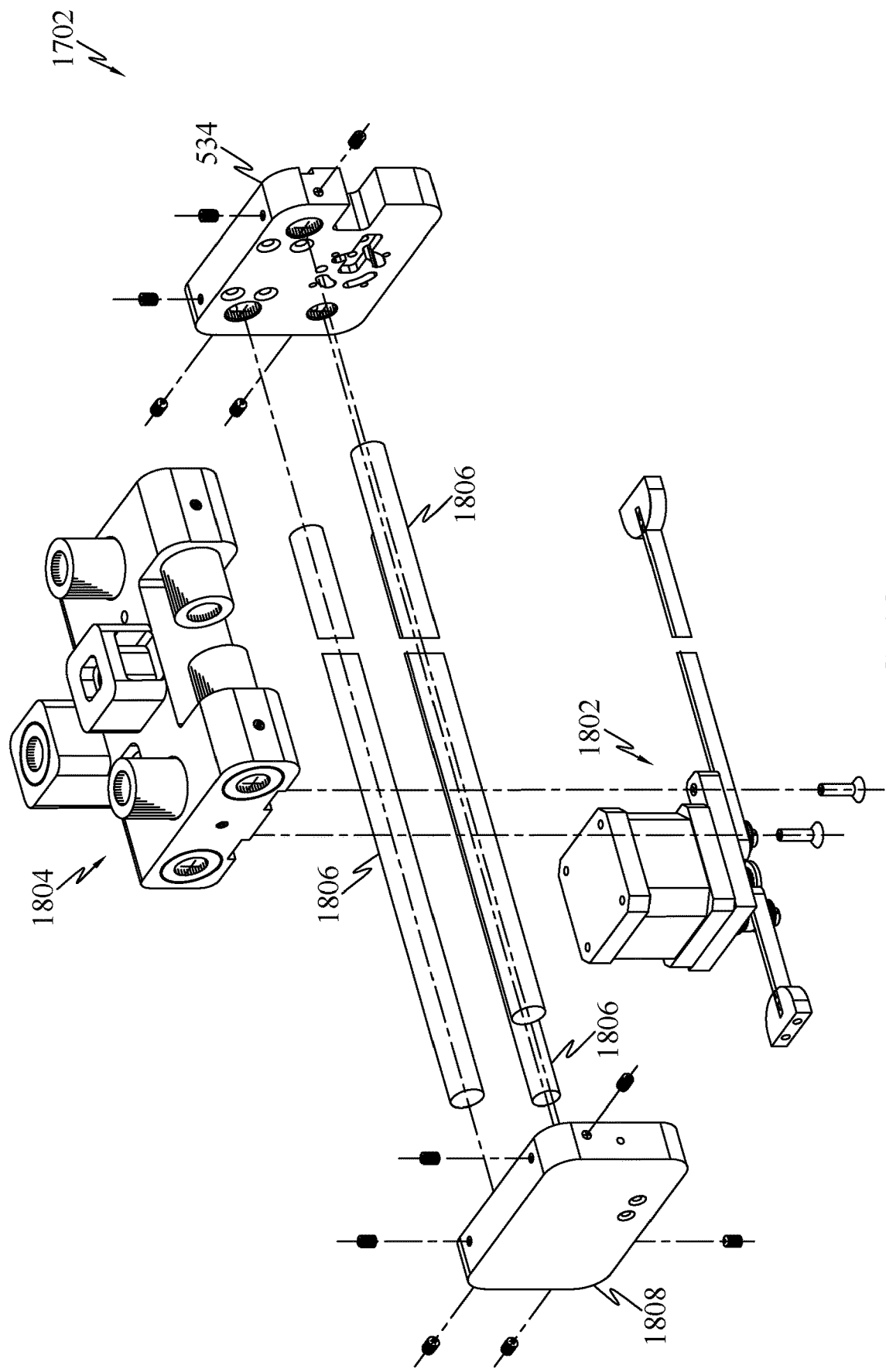
FIG. 18 is an exploded view of the first tower 1702, in accordance with an embodiment.
Figure 32:
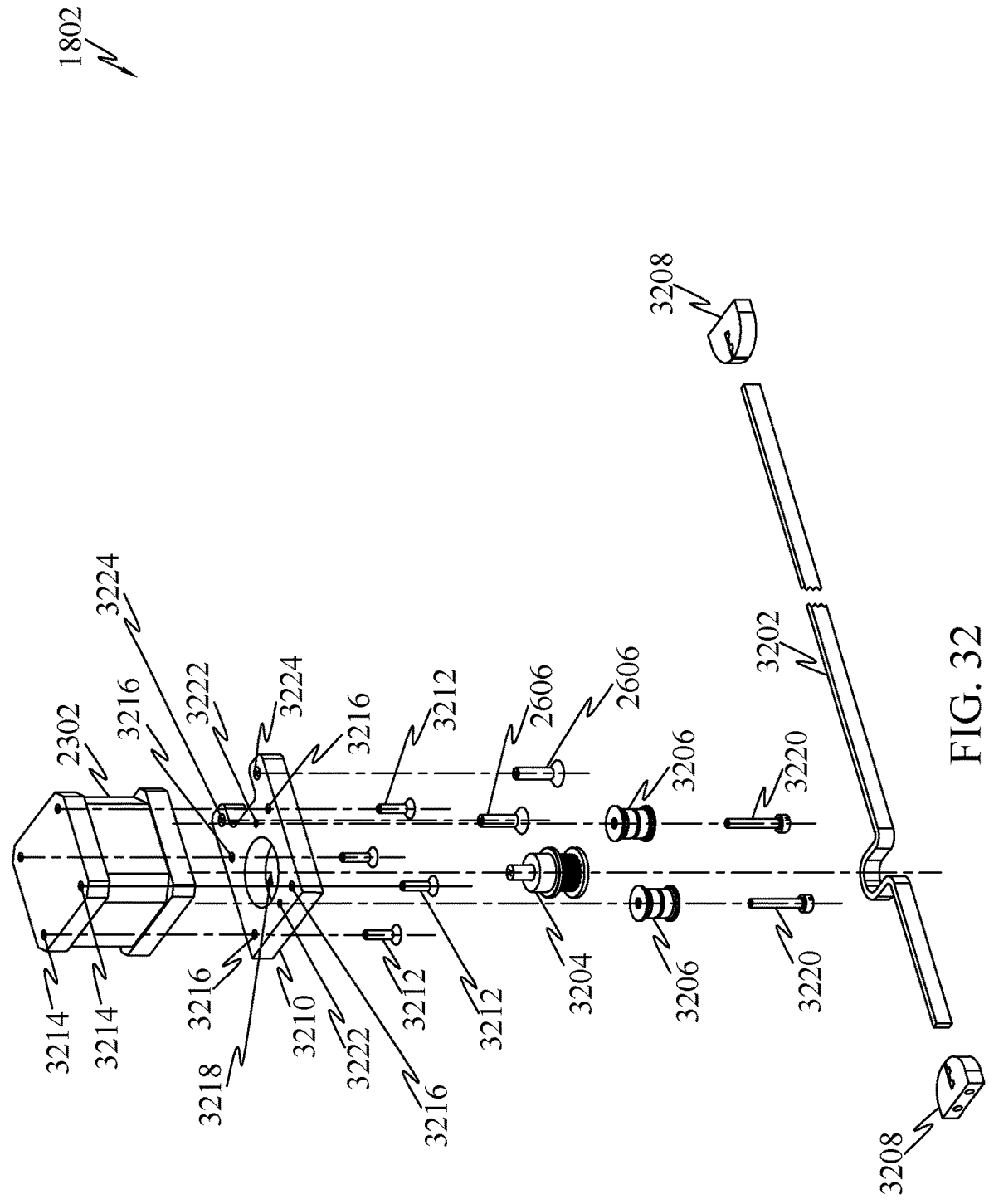
FIG. 32 is an exploded view of the belt assembly 1802 that may be used to move the first tower 1702 and the print plate 528, in accordance with an embodiment.

Referring now to the movement system 112, which is used for moving the nozzle assembly 206 and the print plate 528. Referring to FIGS. 17-18, the movement system 112, to move at least the nozzle assembly 206, may include a first tower 1702, a second tower 1704, a belt assembly 1802 and a carriage system 1804. The belt assembly 1802 may be used to move the first tower 1702 back and forth along a first axis 1708. Referring to FIG. 32, the belt assembly 1802 may include a belt 3202, a gear 3204 and at least two bearings 3206. The gear 3204 and the bearings 3206 may be arranged such that one bearing 3206 may be on each side of the gear 3204. The belt 3202 may interface with the gear 3204 and the two bearings 3206 such that the belt 3202 may be sandwiched between the gear 3204 and the bearings 3206. The first tower 1702 may include three primary rods 1806 that may move back and forth along a first axis 1708. The second tower 1704 may comprise three secondary rods 2002 (refer FIG. 20). The second tower 1704 may enable the movement of the first tower 1702 up and down along a second axis 1710. The carriage system 1804 may enable the first tower 1702 to move back and forth, relative to the carriage system 1804, along the first axis 1708 and may also enable the first tower 1702 to move up and down the second tower 1704 along the second axis 1710. The carriage system 1804 may define a plurality of holes 2310, 2312, 2402, 2404 for the primary rods 1806 and the secondary rods 2002 to pass through. The movement system 112 to move the print plate 528 may include a base tower 1706 and a belt assembly 1802. The belt assembly 1802 may enable the base tower 1706 to move back and forth along a third axis 1712.

In Detail—Filament Extrusion Assembly 202

Referring more specifically to FIGS. 1-7B, in an embodiment, the system 102 may include a plurality of filament extrusion assemblies 202, a plurality of nozzle holders 204 and a plurality of nozzle assemblies 206.

Figure 2B:
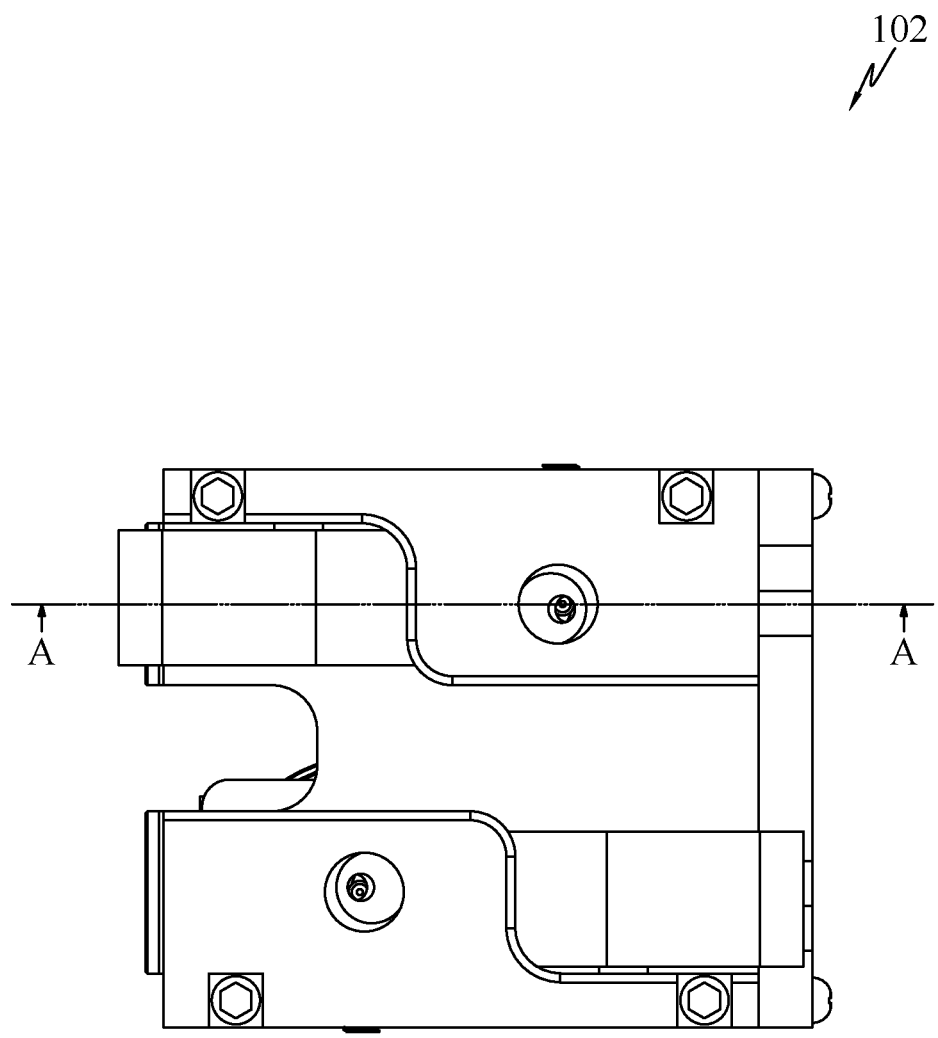
FIG. 2B is an orthographic projection of the system 102 depicting a section line A-A, in accordance with an embodiment.

FIG. 2B is an orthographic projection of the system 102 depicting section line A-A, in accordance with an embodiment. The system 102 and the associated parts will now be described in detail.

Figure 3A:
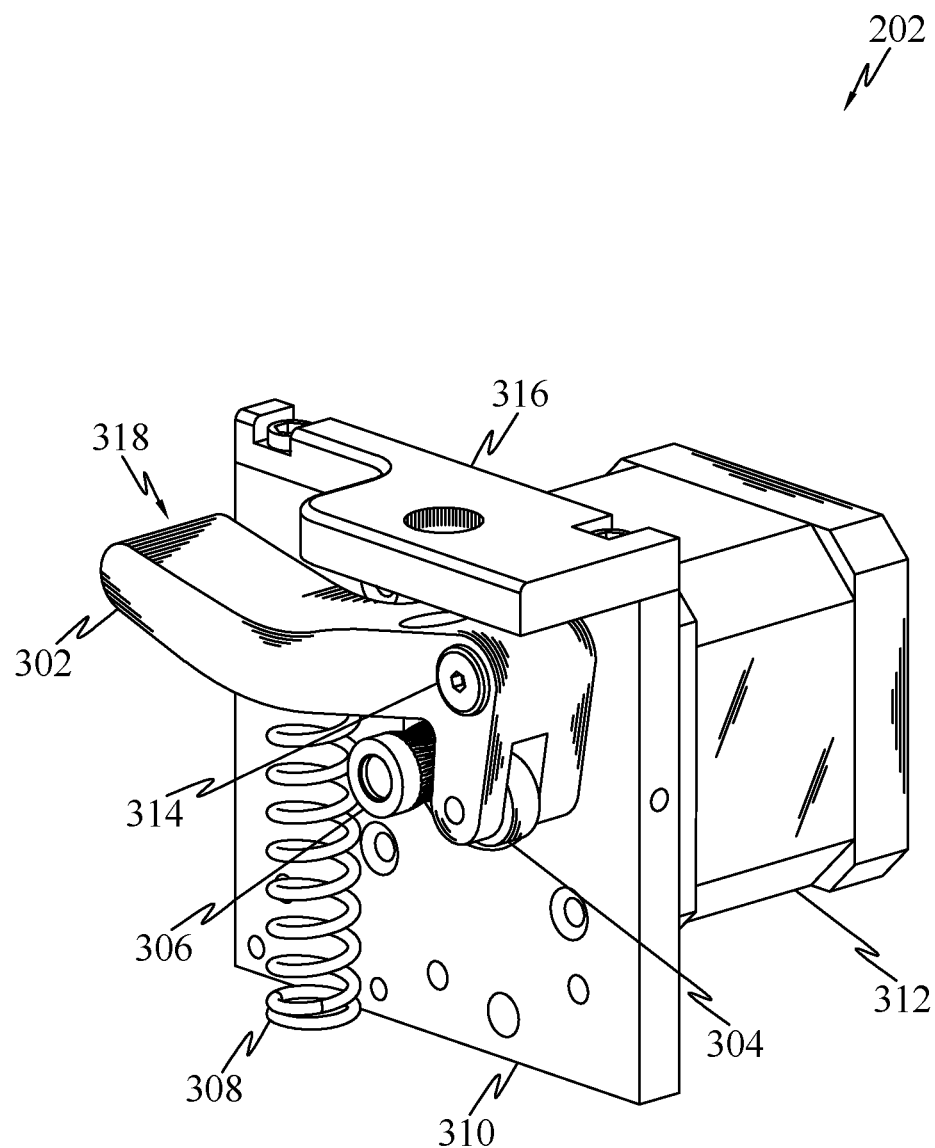
FIG. 3A is an isometric view of the filament extrusion assembly 202, in accordance with an embodiment.

The system 102 may deliver a metered quantity of the filament 106 at a very high speed consistently from the spool 104, using the filament extrusion assembly 202. FIG. 3A is an isometric view of the filament extrusion assembly 202 without the filament 106. The filament extrusion assembly 202 may include a pusher arm 302 that may be pivotably mounted to a mounting block 310 using a pivot pin 314. The filament extrusion assembly 202 may further include a bearing 304, a gear 306 and a tension spring 308. The tension spring 308 may interface with the pusher arm 302 within a socket 320 (shown in FIG. 3B), in a way that the bearing 304, which may be attached to one end of the pusher arm 302, may be pressed against the gear 306.

In an embodiment, a filament guide block 316 may be used to guide the filament 106 into the filament extrusion assembly 202. The filament 106 may be inserted into a hole defined by the filament guide block 316. The filament guide block 316 may be screwed into the mounting block 310 or may be snap fit into the mounting block 310 using any of the snap fit mechanism available presently or that may be made available in the future.

In an embodiment, the pusher arm 302 may have an extended surface 318 for the ease of loading and unloading of filament 106 with lesser effort, into the filament extrusion assembly 202.

In an embodiment, a motor 312, which may be attached to the mounting block 310, may be used to rotate the gear 306 and in turn rotate the bearing 304.

Figure 3B:
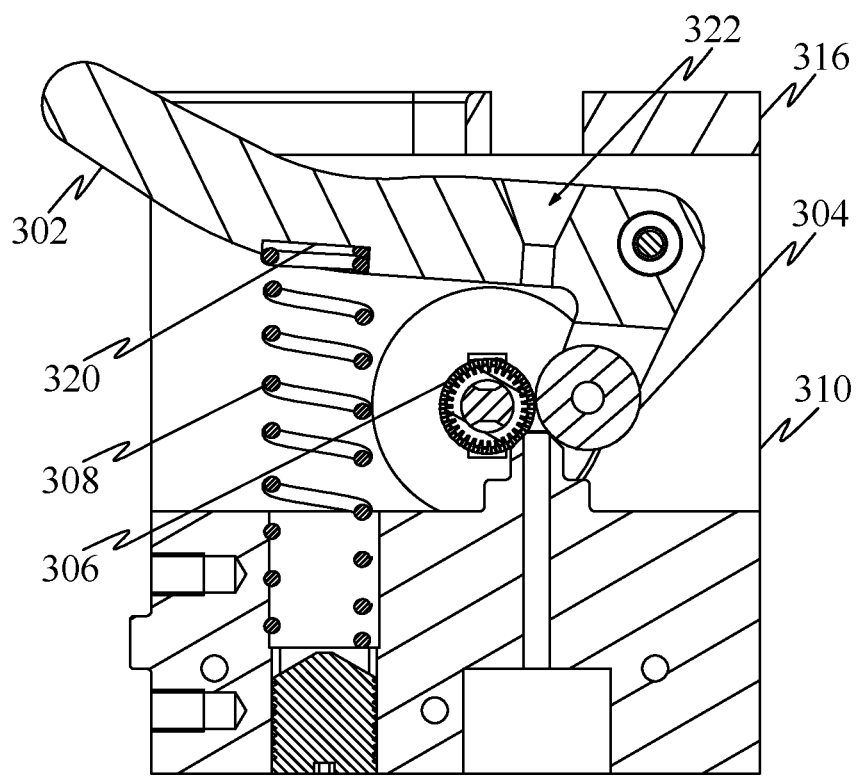
FIG. 3B is a section view of the filament extrusion assembly 202 without the filament 106, in accordance with an embodiment.

FIG. 3B is a section view of the filament extrusion assembly 202, along the section line A-A (shown in FIG. 2B), in accordance with an embodiment. The pusher arm 302 may define a through hole 322, into the path of the bearing 304 and the gear 306 intersection. In an embodiment, the through hole 322 may be a countersunk hole. In the instant embodiment, the bearing 304 and the gear 306 may be peripherally in contact with each other, under spring force from the tension spring 308. When the filament 106 is not introduced into the system 102, the tension spring 308 may force the pusher arm 302 to press the bearing 304 against the gear 306.

Figure 3C:
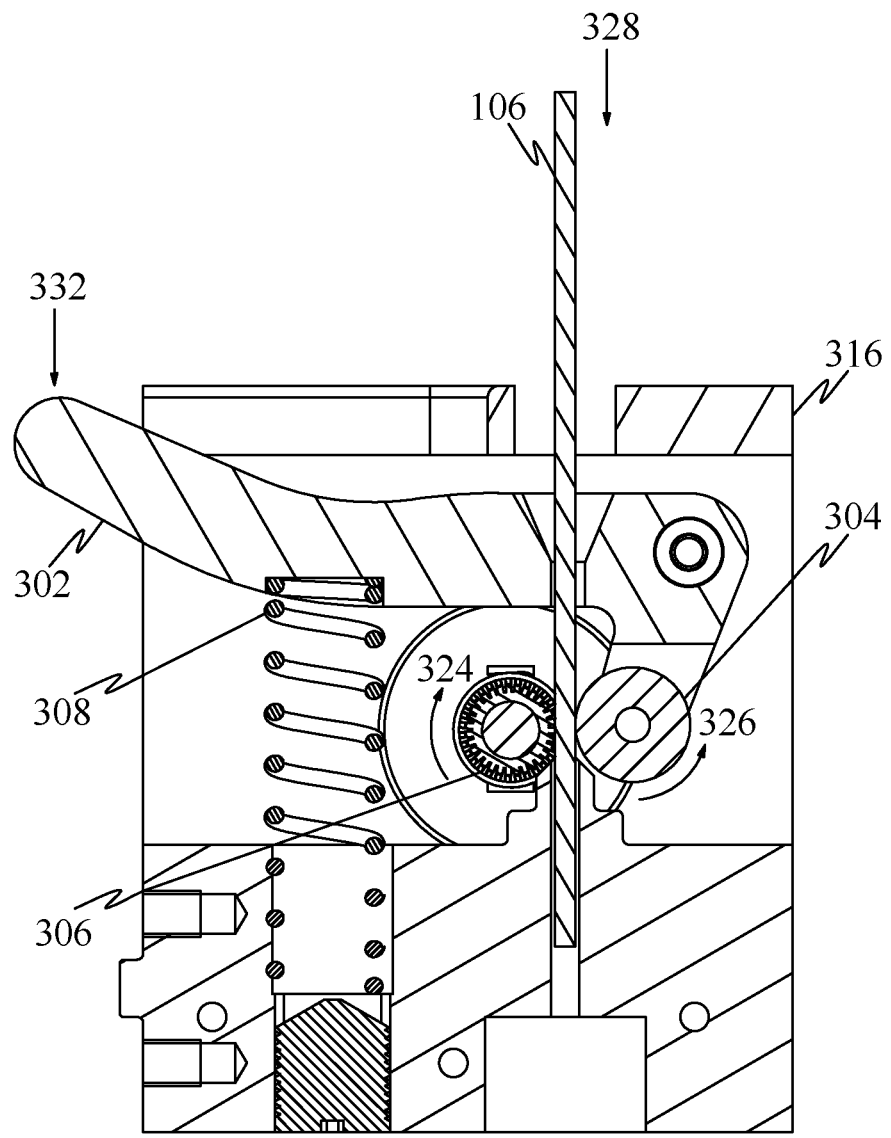
FIG. 3C is a section view of introducing the filament 106 into the filament extrusion assembly 202, in accordance with an embodiment.

FIG. 3C is a section view of the filament 106 being introduced into the filament extrusion assembly 202, along the section line A-A (shown in FIG. 2B), in accordance with an embodiment. The filament 106 may be introduced, along the direction 328, into the filament extrusion assembly 202 using the filament guide block 316. The filament 106 may then be introduced into the through hole 322 defined by the pusher arm 302.

In an embodiment, the filament 106 may be introduced into the filament extrusion assembly 202 till the intersection of the bearing 304 and the gear 306. The motor 312 may be turned on to rotate the gear 306 in a clockwise direction 324. In turn, the gear 306 may rotate the bearing 304 in an anti-clockwise direction 326. This rotation of the bearing 304 and the gear 306 may extrude (or pull) the filament 106, between the gear 306 and the bearing 304, in the direction 328.

In an embodiment, the extended surface 318 of the pusher arm 302 may be manually or automatically pushed in the direction 332. On the application of force in the direction 332, the tension spring 308 may compress and facilitate pivoting of the pusher arm 302, which in turn moves the bearing 304 away from the gear 306. This may create a gap between the bearing 304 and the gear 306 for the filament 106 to be positioned between the bearing 304 and the gear 306. Once the filament 106 has been placed between the bearing 304 and the gear 306, the force on the pusher arm 302 may be released so that the tension spring 308 may expand and force the pusher arm 302 to pivot back, so that the filament 106 is sandwiched tightly between the bearing 304 and the gear 306.

The introduction of the filament 106 between the bearing 304 and the gear 306 may provide a part of tension required in the filament 106 for effective printing.

Figure 3D:
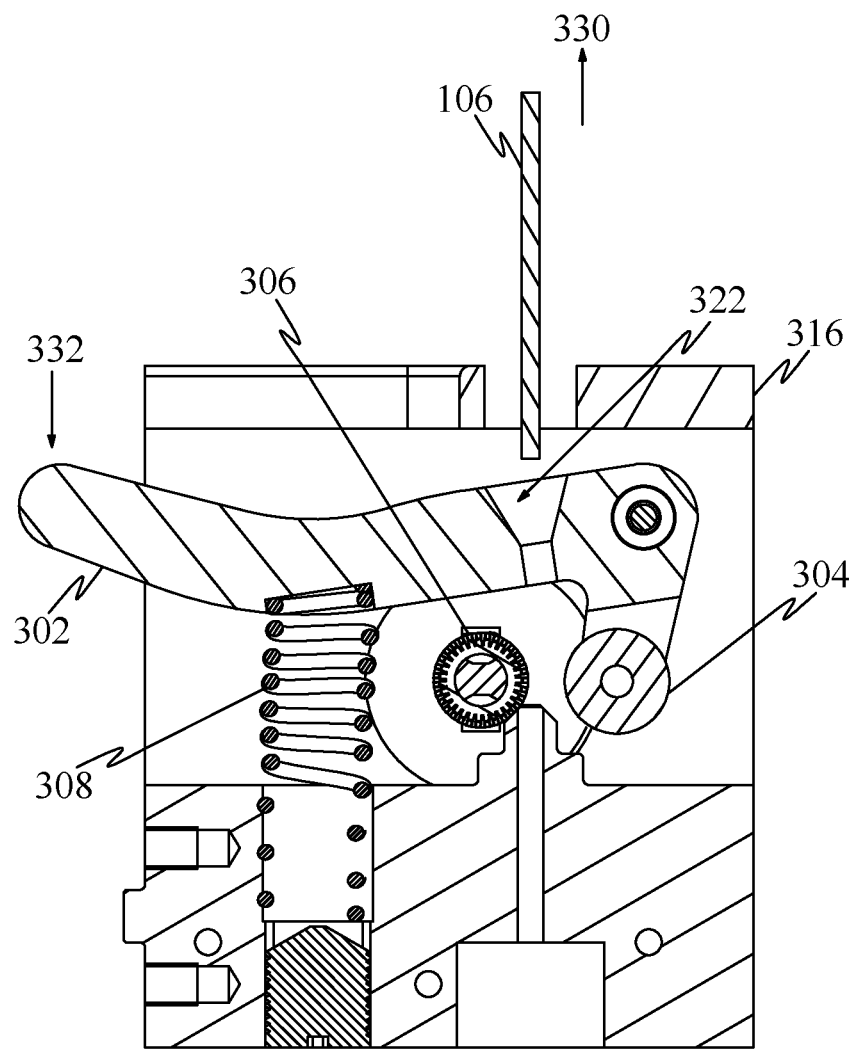
FIG. 3D is a section view of retracting the filament 106 from the filament extrusion assembly 202, in accordance with an embodiment.

FIG. 3D is a section view of the filament 106 being retracted from the filament extrusion assembly 202, along the section line A-A (shown in FIG. 2B), in accordance with an embodiment. The extended surface 318 of the pusher arm 302 may be manually or automatically pushed in the direction 332. This may move the bearing 304 away from the gear 306, widening the gap between them as shown in the instant embodiment. The filament 106 may then be retracted from the filament extrusion assembly 202 in the direction 330.

Nozzle Holder 204:

The system 102 may guide the filament 106 from the filament extrusion assembly 202 to the nozzle assembly 206 through the nozzle holder 204. FIG. 4 is a section view of the filament extrusion assembly 202 and the nozzle holder 204 with an enlarged view of the protruded portion 402, along the section line A-A (shown in FIG. 2B), in accordance with an embodiment. The nozzle holder 204 may include the protruded portion 402 that may be located immediately below the intersection of the bearing 304 and gear 306. The nozzle holder 204 may define a through hole 404 that may extend into the protruded portion 402. The nozzle holder 204 may also define a nozzle mount 408 to affix the nozzle assembly 206 to the nozzle holder 204. The nozzle holder 204 may further include threaded studs 406 to support and hold the tension spring 308. The threaded studs 406 may also be used to support the manual adjustment of spring tensions.

The protruded portion 402 may ensure, the filament 106 is properly guided into the nozzle holder 204 and subsequently into the nozzle assembly 206. In an embodiment, the protruded portion 402 may have a chamfer 410 along the top edge with tight tolerance, to interface with the bearing 304 and the gear 306 in close contact. The chamfer 410 on the protruded portion 402 of the nozzle holder 204, and the intersection of the bearing 304 and the gear 306 assembly with the protruded portion 402 of the nozzle holder 204, ensures that the filament extrusion assembly 202 may extrude the filament 106 into the protruded portion 402 of the nozzle holder 204, without much exposure of the filament 106. The protruded portion 402 may also help in easier filament 106 feeding and protection from breakage. For example, if the distance between exit of the filament 106 from the filament extrusion assembly 202 and entry of the filament 106 into the nozzle holder 204 is too much, there is a chance of the filament 106 buckling under force, resulting in breakage. The instant embodiment may provide protection from breakage and may maintain required tension in the filament 106.

Nozzle Assembly 206:

Nozzle assembly 206 is an important part of the system 102, that receives the filament 106 from the filament extrusion assembly 202 via the nozzle holder 204, melts and layers the filament 106 on the print plate 528. FIG. 5A is an exploded view of the nozzle assembly 206 without the filament 106, in accordance with an embodiment.

In an embodiment, the nozzle assembly 206 may include a cooling chamber 502 that may receive the filament 106 from the nozzle holder 204. The nozzle assembly 206 may further include a filament tube 504, a filament tube insulation 506 and a nozzle 508.

FIG. 5B is an exploded section view of the nozzle assembly 206 without the filament 106, in accordance with an embodiment. The cooling chamber 502 may define a through hole 510, such that the axis of the through hole 510 may be in alignment with the axis of the through hole 404 of the nozzle holder 204, to let the filament 106 pass through and reach nozzle 508. The cooling chamber 502 may further define at least one groove 512 to accommodate a sealing member 514, that may be coaxial with the through hole 510 of the cooling chamber 502.

In an embodiment, the groove 512 may be defined where the nozzle holder 204 interfaces with the cooling chamber 502, when the nozzle assembly 206 is affixed to the nozzle holder 204. The groove 512 may be bored into the cooling chamber 502 to a predefined depth to accommodate at least one sealing member 514 (FIG. 5C). Further, the groove 512 may be defined such that the diameter of the groove 512 may be larger than the diameter of the through hole 510 defined by the cooling chamber 502 but smaller than the outer diameter of the at least one sealing member 514. The sealing member 514, being larger in diameter than the groove 512, when placed within the groove 512 pushes itself against the surface of the groove 512. This provides for a tight fitting of the sealing member 514 within the groove 512.

In the instant embodiment, the groove 512 may receive two sealing members 514. The sealing member 514 may be accommodated within the groove 512 in a way that, when the nozzle assembly 206 is affixed to the nozzle holder 204 and when the filament 106 is passed through the through hole 404 of the nozzle holder 204 and the through hole 510 of the cooling chamber 502, an air tight path may be formed for the filament 106 to pass through. This maintains a constant tension in the filament 106 till it reaches a nozzle tip 544 (shown in FIG. 5A) and avoids any slack in the filament 106.

In an embodiment, the sealing member 514 may be made of a flexible elastic material. In an embodiment, the sealing member 514 may be an O-ring seal as shown in the FIG. 5C.

The cooling chamber 502 may include a protruded portion 516, to affix the nozzle assembly 206 into the nozzle mount 408 of the nozzle holder 204. The protruded portion 516 may define a threaded outer surface, wherein the nozzle assembly 206 may be screwed to the nozzle mount 408 of the nozzle holder 204 or may be one of the several snap fit mechanisms available or that may be made available in near future.

In another embodiment, the cooling chamber 502 may define a hole 518 to accommodate the filament tube 504. Further the cooling chamber 502 may define a threaded hole 520 to screw a threaded protrusion 522 of the filament tube insulation 506. The cooling chamber 502 may further define a hole 524 to accommodate a part of the filament tube insulation 504 other than the threaded protrusion 522.

The filament tube 504 may define a through hole 526, such that the through hole 526 may be coaxial with the through hole 404 of the nozzle holder 204, for the filament 106 to pass through and reach the nozzle 508. In another embodiment, the filament tube insulation 506 may define a through hole 528 for the filament tube 504 to pass through. Further, the filament tube insulation 506 may define a threaded hole 530 to screw a threaded protrusion 532 of the nozzle 508. The nozzle 508 may define a hole 534 to accommodate the filament tube 504. Further, the nozzle 508 may include the nozzle tip 544, through which the molten filament 106 passes through to the print plate 528.

Figure 5D:
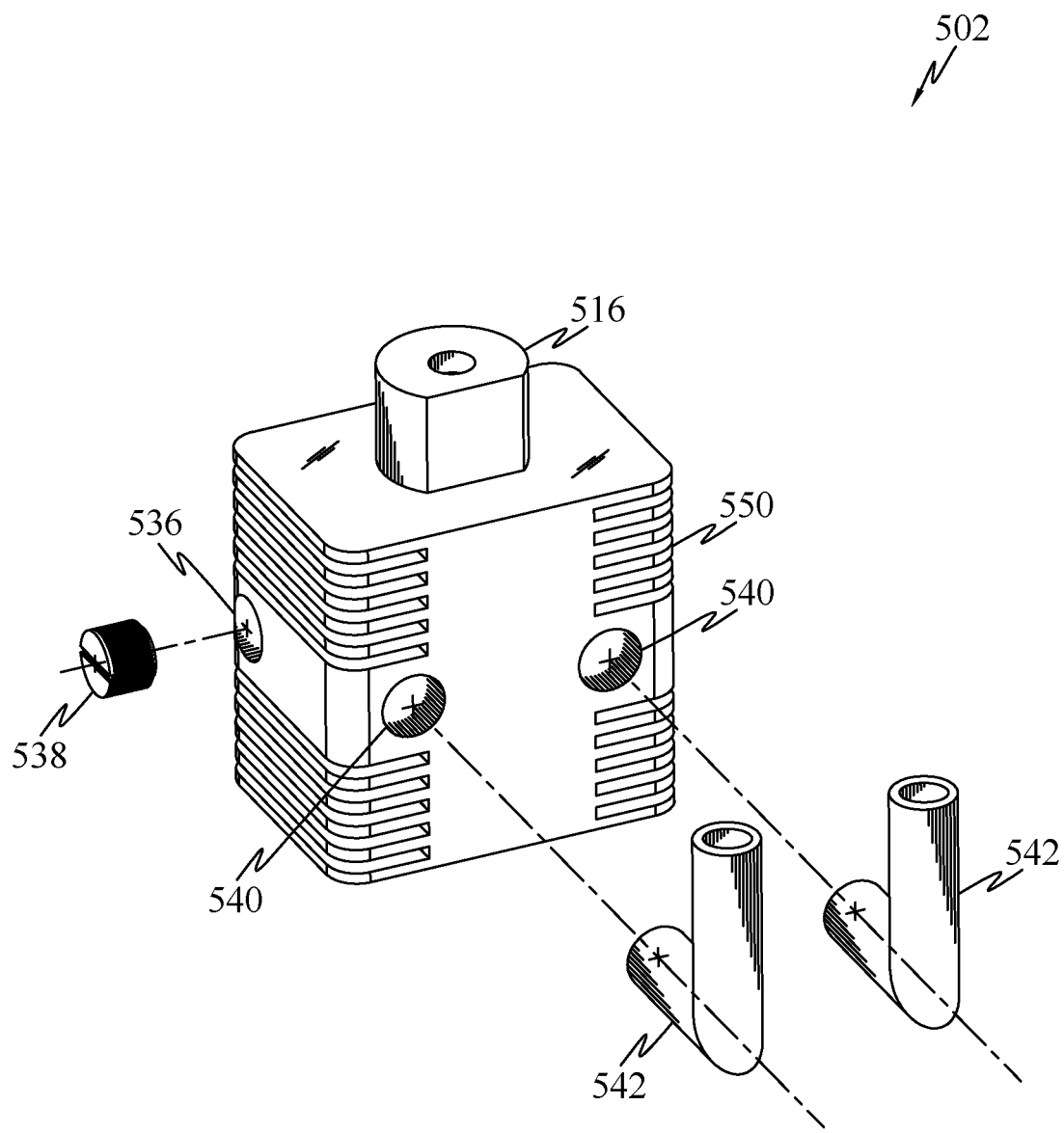
FIG. 5D is an exploded view of a cooling chamber 502, in accordance with an embodiment.

FIG. 5D is an exploded view of the cooling chamber 502, in accordance with an embodiment. The cooling chamber 502 may define a hole 536 that may be drilled to a predefined length for cool fluid to flow through. The hole 536 may be closed or sealed using a seal 538. Further, the cooling chamber 502 may define two more holes 540 such that the axis of the two holes 540 are perpendicular to the axis of the hole 536. The two holes 540 may be drilled up to a point wherein the holes 540 extend into the hole 536, thus forming a path for the cool fluid to pass through. Each hole 540 may be connected to a cooling duct 542, wherein the cooling duct may be attached to a cooling mechanism, which is explained in detail under integrated cooling system.

During the working of the additive manufacturing machine, it is required that the nozzle 508 be at a temperature wherein the filament melts. The nozzle 508 being made of brass, which has a good thermal conductivity property, may transfer the heat to the nozzle assembly 206. This is undesirable, as the heat may melt the filament 106 before reaching the nozzle 508. The cool fluid circulating within the cooling chamber 502 may absorb heat that may be acquired by the filament tube 504 and the filament tube insulation 506, keeping the filament tube 504 and the filament tube insulation 506 cool. This helps in keeping the filament 106, within the filament tube 504, solid and not melt before it reaches the nozzle 508.

Further, the cooling chamber 502 may include a plurality of fins 550 to cool the nozzle assembly 206. This may additionally dissipate heat from the cooling chamber 502.

Figure 5E:
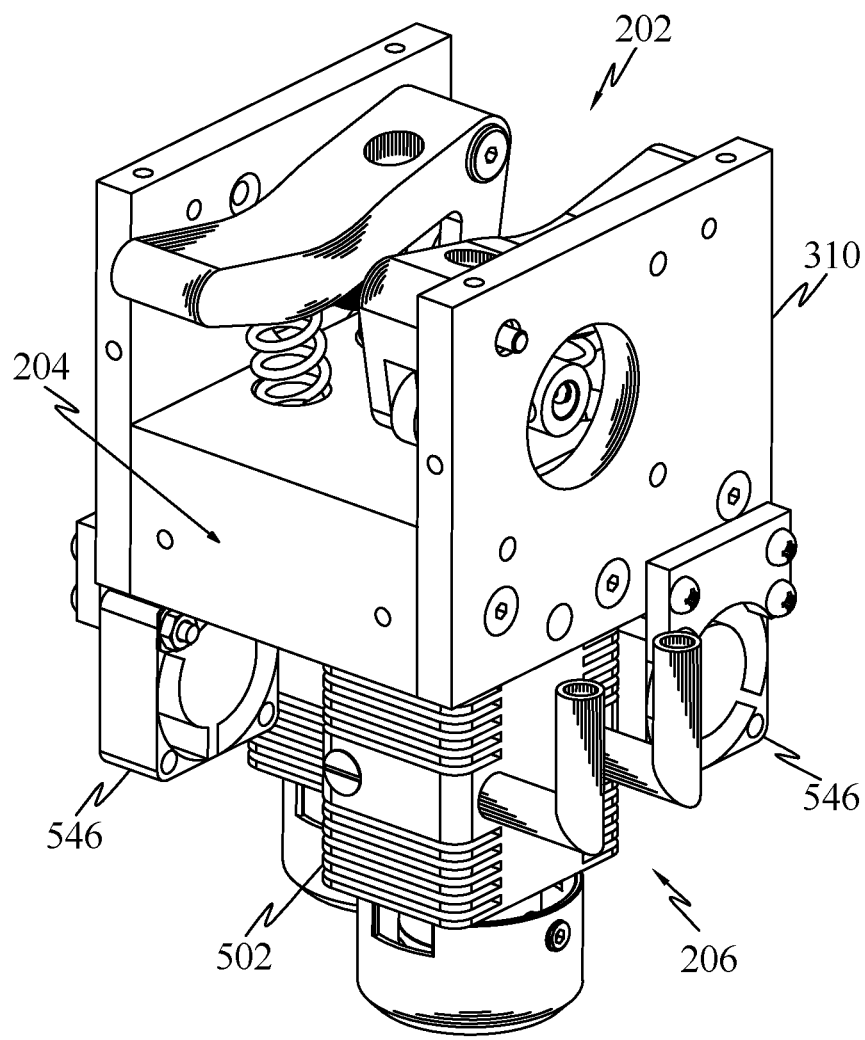
FIG. 5E is an isometric view of the filament extrusion assembly 202, nozzle holder 204 and nozzle assembly 206, in accordance with an embodiment.

FIG. 5E is an isometric view of the filament extrusion assembly 202, nozzle holder 204 and nozzle assembly 206, in accordance with an embodiment. An exhaust fan 546 may be attached to the mounting block 310 to cool the cooling chamber 502. This helps in improved cooling and better printing.

Figure 6:
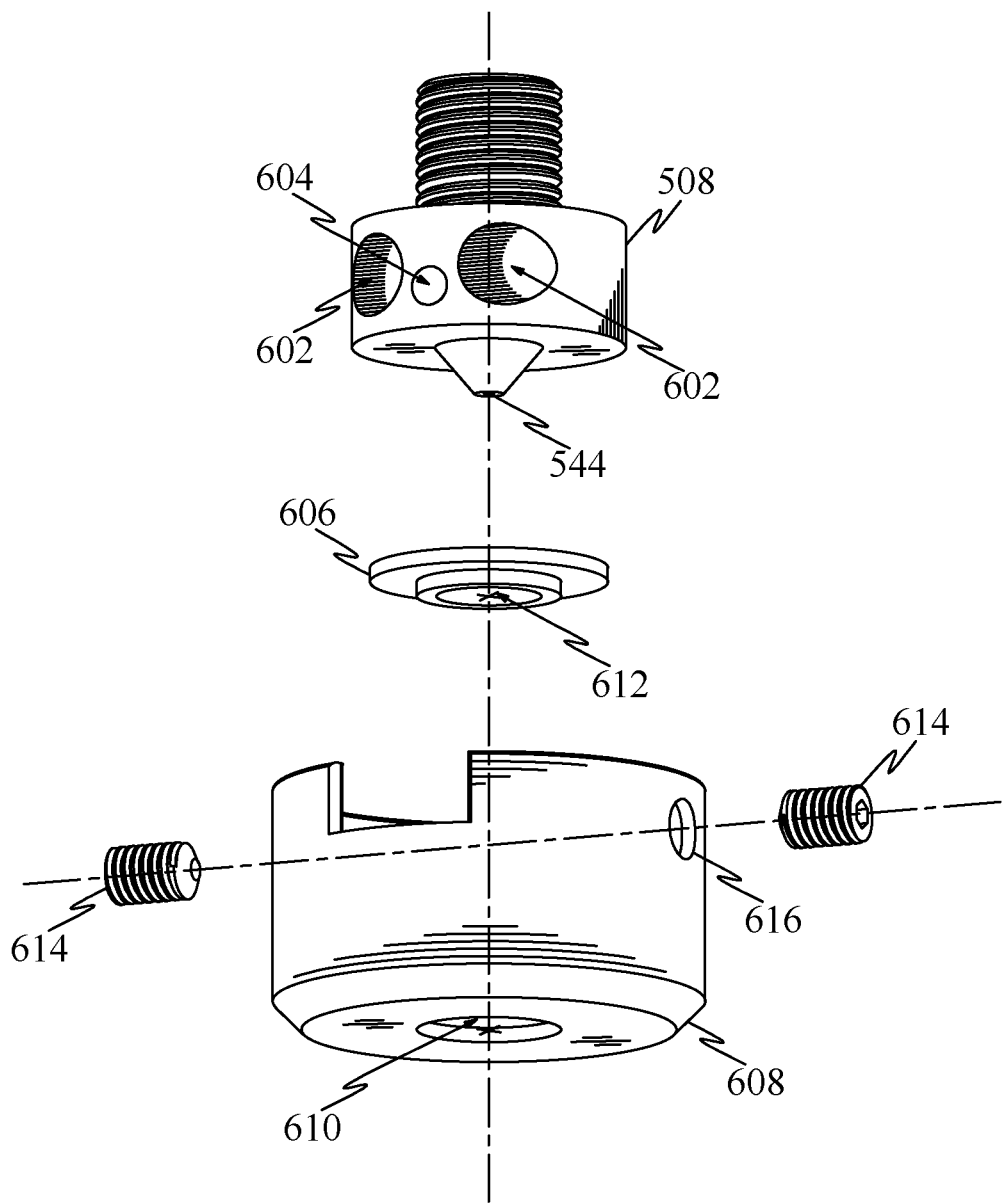
FIG. 6 is an exploded view of a nozzle 508, in accordance with an embodiment.

FIG. 6 is an exploded view of the nozzle 508, in accordance with an embodiment. The nozzle 508 may include a dual heater 602 that may be used to generate sufficient heat to melt filament 106 within the nozzle 508. Additionally, the nozzle 508 may also include a thermistor 604. Thermistor 604 may be used to sense the temperature at the nozzle 508 and vary the temperature according to the need. The nozzle 508 may be made up of brass or bronze or any material that has a high thermal conductivity.

In another embodiment, a nozzle cap 608 may surround the nozzle 508. The nozzle cap 608 may act as a shield by preventing heat being transferred from the hot nozzle 508 to the surrounding area and in the process maintaining the heating temperature at the nozzle 508. The nozzle cap 608 may also act as a barrier for cool air, used to cool the filament 106 getting deposited on the print plate 528, from reaching the nozzle 508. In another embodiment, the nozzle cap 608 may be used to dissipate excess heat generated at the nozzle 508. The nozzle cap 608 may also be used to deny direct access to the nozzle 508, thus may be used as a safety measure for personnel operating the additive manufacturing machine 100.

In another embodiment, the nozzle cap 608 may surround the area of the nozzle assembly 206 below the cooling chamber 502. The nozzle cap 608 may be affixed to the nozzle 508 using two screws 614. The screws 614 may pass through holes 616 defined by the nozzle cap 608, and press against the surface of the nozzle 508 and in the process holding the nozzle 508 and the nozzle cap 608 together. The nozzle cap 608 may define a through hole 610 for the nozzle tip 544 to pass through.

In yet another embodiment, the nozzle 508 may further include a washer 606 that may be used to even out the pressure at the contact area between the nozzle 508 and the nozzle cap 608.

In an embodiment, at least a part of the filament tube 504 may be received by the cooling chamber 502 and at least another part of the filament tube 504 may be received by the nozzle 508. The filament 106 may pass through the filament tube 504 to reach the nozzle 508. The filament 106 is heated and melted in the nozzle 508.

In an embodiment, the filament tube 504 has lower thermal conductivity compared to the nozzle 508, and the cooling chamber 502 has higher thermal conductivity compared to the filament tube 504. As an example, the cooling chamber 502 may be made of aluminium, the filament tube 504 and the filament tube insulation 506 may be made of stainless steel. Further, the nozzle may be made of brass.

Figure 7A:
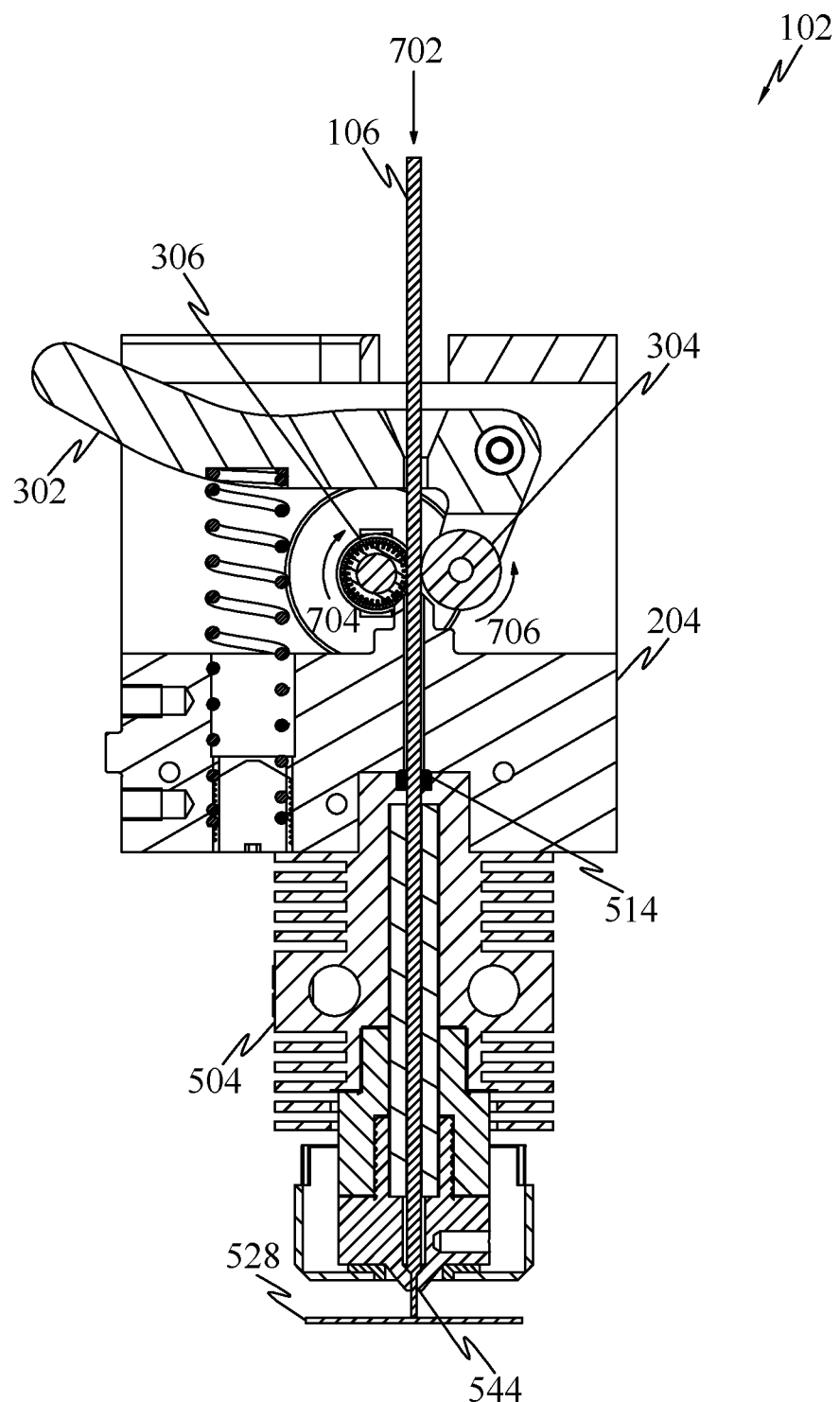
FIGS. 7A and 7B represent an exemplary illustration of the system 102 of the additive manufacturing machine 100, in accordance with an embodiment.
Figure 7B:
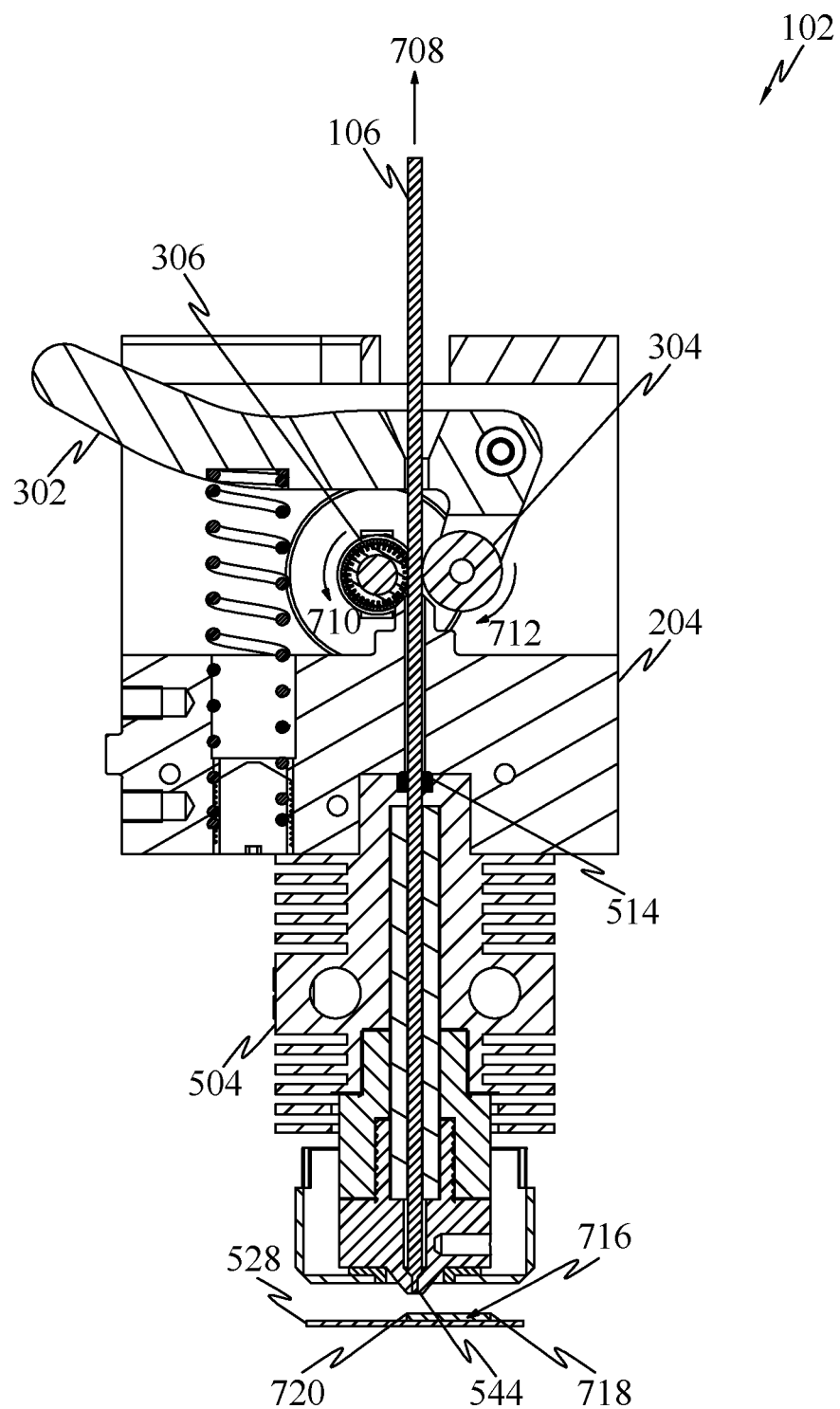

FIGS. 7A and 7B illustrates an exemplary system 102, to extrude and retract the filament 106 in the additive manufacturing machine 100, in accordance with an embodiment. As shown in the FIG. 7A, the filament 106 may be inserted into the system 102 in the direction 702. The personnel, operating the additive manufacturing machine 100, may turn on the motor 312 for the gear 306 to rotate in clockwise direction 704. This may rotate the bearing 304 in anti-clockwise direction 706. The rotation of the bearing 304 and the gear 306, may facilitate the filament extrusion assembly 202 to extrude the filament 106 in the direction 702 into the protruded portion 402 of the nozzle holder 204. Since the protruded portion 402 is close to the intersection of the bearing 304 and the gear 306, the filament 106 may have the smallest possible exposure, going, from the filament extrusion assembly 202, into the protruded portion 402 of the nozzle holder 204. This helps in maintaining tension in the filament 106 and eliminates any kind of slackness in the filament 106. The continuous rotation of the motor 312, may keep extruding the filament 106 into the cooling chamber 502 of the nozzle assembly 206. The filament 106 may pass through the O-ring seal 514 and into the hole 510 of the cooling chamber 502. This arrangement of the protruded portion 402, close to the intersection of the bearing 304 and the gear 306, through hole 404 (of the nozzle holder 204), O-ring seal 514 and the hole 510 (of the cooling chamber 502) provides an air tight path for the filament 106 to pass through. The heater 602 of the nozzle assembly 206 may melt the filament 106. Molten filament 106 may pass through the nozzle tip 544 and may get deposited on the print plate 528.

The depositing of the molten filament 106 on the print plate 528, may at some point of time, needs to be stopped momentarily, for the system 102 to move from one point to another, or the molten filament 106 deposition needs to be ceased, if the required shape of an object is obtained. For example, as shown in the FIG. 7B, the system 102 may have deposited a layer 716 of the molten filament 106 on the print plate 528 from a point 718 to another point 720. For the system 102 to deposit another layer of molten filament 106, the system 102 may need to move back to the point 718 from the point 720. During the process, for effective and efficient printing, it may be required for the system 102 to move from point 720 back to the point 718 without spilling or leaking the molten filament 106 from the nozzle tip 544 onto the print plate 528. The sealed air tight arrangement of the system 102 provides for a minimum pull-back of the filament 106 in the direction 708. At this point, the gear 306 may rotate in an anti-clockwise direction 710 and subsequently the bearing 304 may rotate in clockwise direction 712. The air tight arrangement of the system 102 may reduce the quantum of filament 106 pull-back required, resulting in reduction of print time and in the process improving the mechanical efficiency of the additive manufacturing machine 100. The sealed air tight arrangement of the system 102 further eliminates the chances for leakage and spillage of molten filament 106 at the nozzle tip 512. The sealed air tight arrangement of the system 102 may further maintain a constant tension in the filament 106.

Cooler 802:

The integrated cooling system 108 and the associated parts will now be described in detail.

Figure 9A:
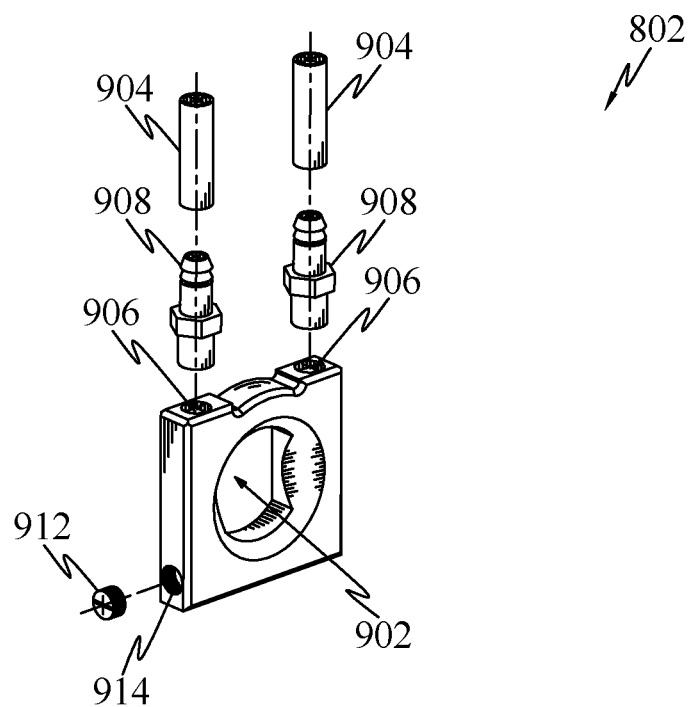
FIG. 9A is an exploded view of the cooler 802, in accordance with an embodiment.

The integrated cooling system 108 of the additive manufacturing machine 100 may introduce cool air to solidify the molten filament 106 depositing on the print plate 528 of the additive manufacturing machine 100, using the cooler 802. FIG. 9A is an exploded view of the cooler 802, in accordance with an embodiment. The cooler 802 may define at least one opening 902 for atmospheric air to pass through. In an embodiment, the opening may be a through hole 902. The atmospheric air may be sucked into the opening 902 using the blower 804 (explained in detail under blower 804). The cooler 802 may further define two openings 906 to receive a plurality of cooling ducts 904. The cooling ducts 904 may be attached to the blower 802 using one of the several attachment mechanisms available. In the instant embodiment, a connecting hose 908 may be used to attach the cooling ducts 904 to the cooler 802.

In an embodiment, the cooler 802 may be attached to a cooling mechanism (not shown in the figure) using the cooling ducts 904. The cooling mechanism may be used to cool a fluid and introduce the cool fluid to the cooler 802 using one of the two cooling ducts 904. The cooling mechanism may further receive hot fluid from the cooler 802 through the other cooling duct 904, cool it and send it back using the cooling duct 904. That is, the cooling mechanism may recirculate the fluid.

In another embodiment, the cooling mechanism may dispose of the hot fluid that it received from the cooler 802 and may circulate fresh cool fluid into the cooler 802.

In an embodiment, the cooling mechanism may be any one of, but not limited to, a thermoelectric cooler, an evaporative cooler or any other means that may be employed to cool fluids. The fluid may be gaseous or liquid. For example, the fluid used may be coolant, liquid nitrogen, etc.

Figures 9B, 9C:
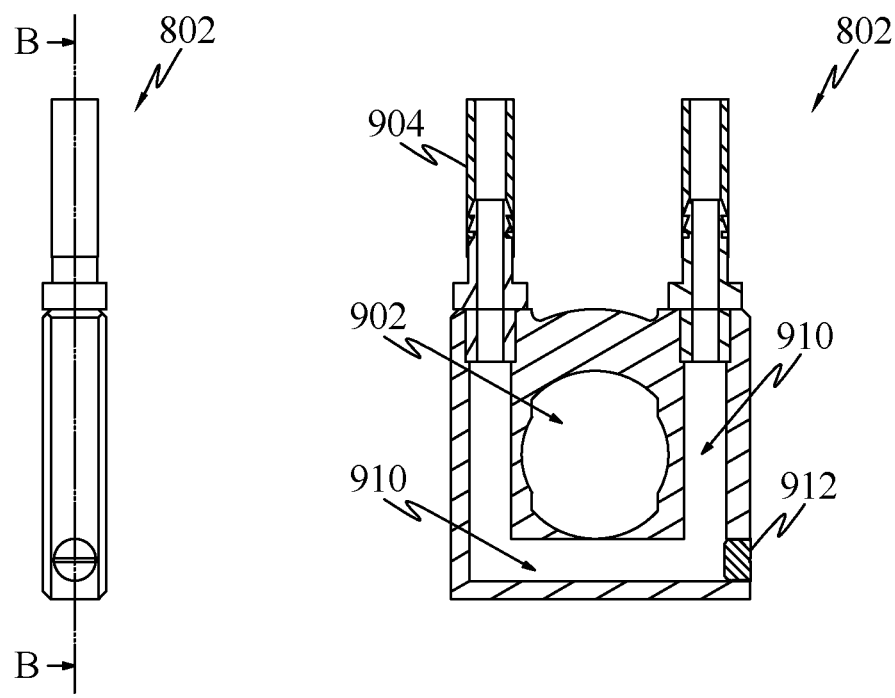
FIG. 9B is an orthographic projection of the cooler 802 depicting a section line B-B, in accordance with an embodiment.
FIG. 9C is a section view of the cooler 802, in accordance with an embodiment.

FIG. 9B is an orthographic projection of the cooler 802 depicting section line B-B, in accordance with an embodiment.

FIG. 9C is a section view of the cooler 802, along the section line B-B (shown in FIG. 9B), in accordance with an embodiment. The cooler 802 may define the cavity 910 for the cool fluid to pass through. In an embodiment, the cavity 910 may be drilled and the resulting hole 914 (shown in FIG. 9A) may be plugged using the stopper 912 (also shown in FIG. 9A).

In an embodiment, the cool fluid circulating through the cavity 910 of the cooler 802 may absorb heat from the cooler 802 and may cool the cooler 802. In an embodiment, the cooler 802 may be made of aluminium or any another material that may provide more efficient and quicker cooling of the cooler 802.

Figure 10A:
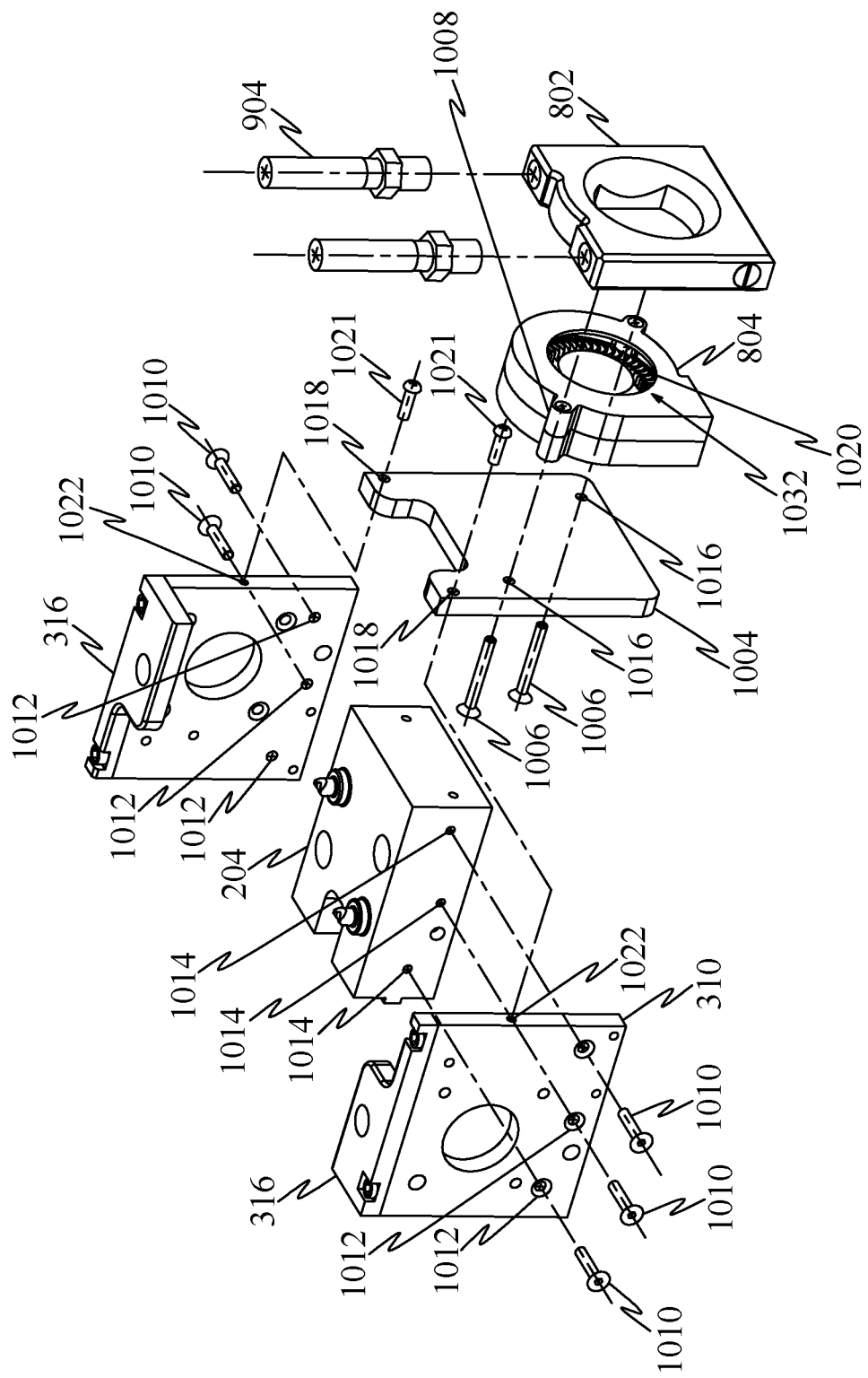
FIGS. 10A and 10B are an exploded view of the cooler 802 and the blower 804 connected to a mounting block 310 using a back plate 1004, in accordance with an embodiment.
Figure 10B:
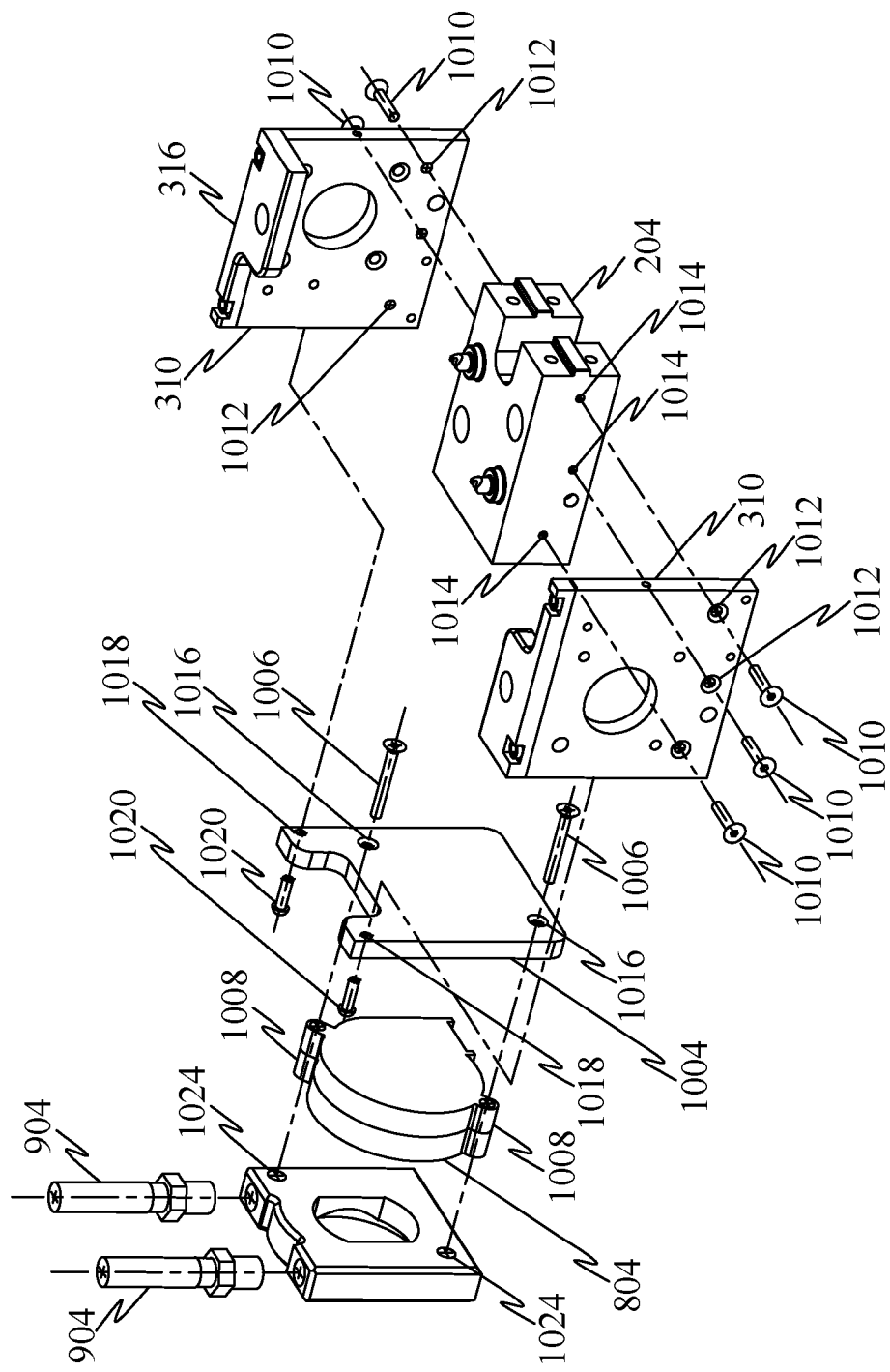

Blower 804:

The integrated cooling system 108 may suck in atmospheric air through the opening 902 of the cooler 802, and circulate it to the delivery duct 806 using the blower 804. FIGS. 10A and 10B are exploded views of the cooler 802 and the blower 804 connected to a mounting block 310 using a back plate 1004, in accordance with an embodiment. The blower 804 may include a fan 1020 (also shown in FIG. 10D), to suck in atmospheric air through the cooler 802 and blow the cool air to the delivery duct 806. The back plate 1004 may be used to attach the blower 804 and the cooler 802 to the nozzle holder 204 using the mounting block 310.

In an embodiment, the blower 804 may include two protrusions 1008 disposed diametrically opposite to each other. Each of the two protrusions 1008 may define a threaded hole. The back plate 1004 and the cooler 802 may define threaded holes 1016 and 1024 respectively, such that the threaded holes 1016 1024 are aligned along the same axis as that of the axis of the protrusions 1008. The protrusions 1008 and the threaded holes 1016 1024 may be configured for screws 1006 to pass through. The back plate 1004, the cooler 802 and the blower 804 may be held together by tightening the screws 1006.

In an embodiment, each of the mounting block 310 may define a set of three threaded through holes 1012 for screws 1010 to pass through. The nozzle holder 204 may define two sets of three holes 1014 such that the axis of the holes 1014 is along the same line as that of the through holes 1012. The threaded through holes 1012 and the holes 1014 may be configured for screws 1010 to pass through. The mounting block 310 may be attached to the nozzle holder 204 using the screws 1010.

In an embodiment, the back plate 1004 may further define two threaded through holes 1018 for screws 1021 to pass through. Each mounting block 310 may define a hole 1022 such that the axis of the hole 1022 is along the same line with one of the through hole 1018 of the back plate 1004. The back plate 1004 and the mounting block 310 may be attached together using the screws 1021.

Figure 10C:
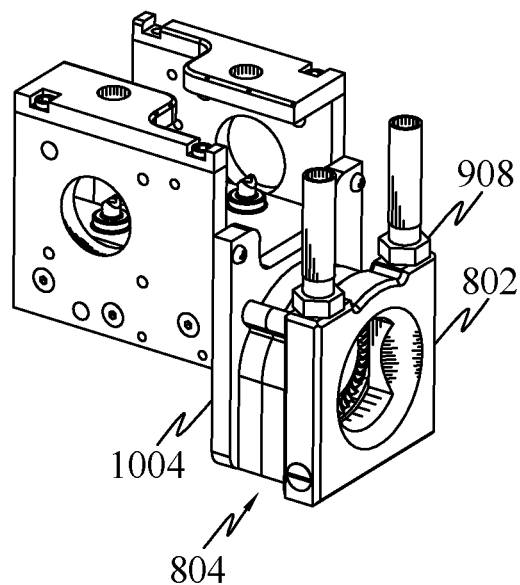
FIG. 10C is an assembled isometric view of the cooler 802 and the blower 804 attached to the mounting blocks 310 using the back plate 1004, in accordance with an embodiment.

FIG. 10C is an assembled isometric view of the cooler 802 and the blower 804 attached to the nozzle holder 204 and the mounting blocks 310 using the back plate 1004, in accordance with an embodiment.

Figure 10D:
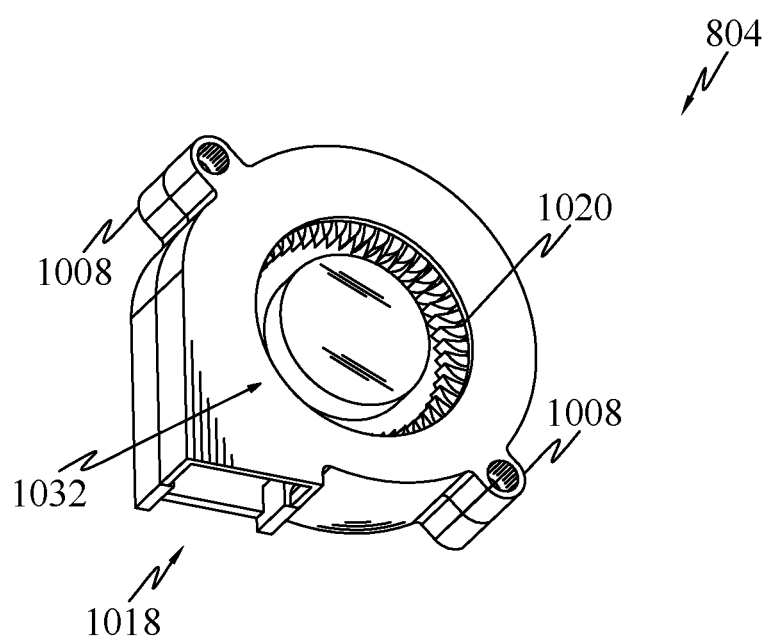
FIG. 10D is an isometric view of the blower 804, in accordance with an embodiment.

FIG. 10D is an isometric view of the blower 804, in accordance with an embodiment. The blower 804 may include a fan 1020 to suck in atmospheric air. In an embodiment, the fan 1020 may suck atmospheric air into the blower 804 through the opening 902 of the cooler 802. The cooler 802 may get cooled by dissipating heat to the cool fluid circulating within it. The atmospheric air passing through the opening 902 of the cooler 802 may dissipate heat to the cooler 802 and may get cooled. The cool air passes onto the blower 804. The blower 804 may direct the cool air into the delivery duct 806 through an opening 1018. The heat absorbed from the atmospheric air is carried away by the cool fluid through the cooling duct 904 back to the cooling mechanism.

In an embodiment, the blower 804 may be made up of a material that has a high thermal conductivity so that the heat is transferred to the cooler 802 and is already cool when the air enters the blower 804.

Figure 11A:
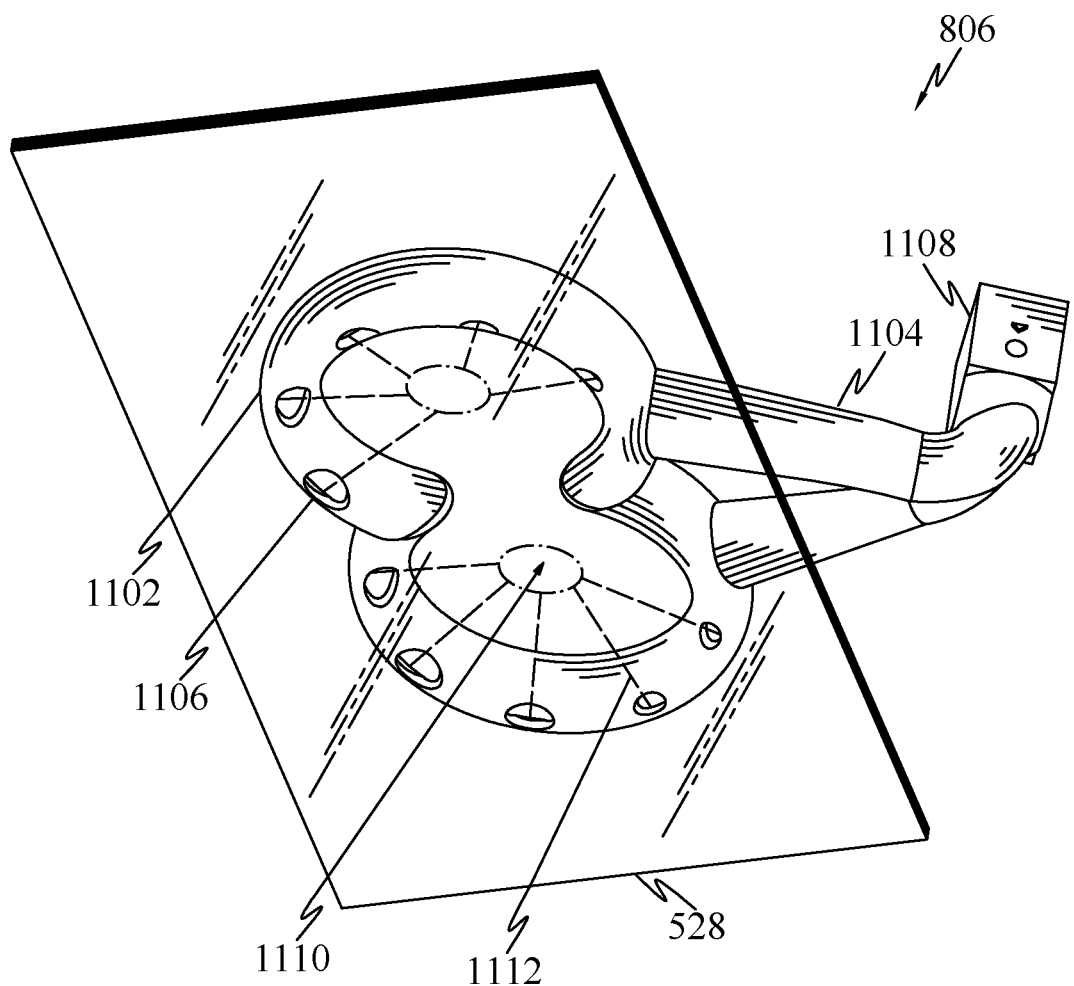
FIG. 11A is an isometric view of the delivery duct 806, in accordance with an embodiment.

Delivery Duct 806:

The integrated cooling system 108 may deliver the cool air onto the print plate 528 of the additive manufacturing machine 100, to solidify the molten filament 106, using the delivery duct 806. FIG. 11A is an isometric view of the delivery duct 806, in accordance with an embodiment. The delivery duct 806 may include a connecting duct 1104 to connect the delivery duct 806 to the blower 804. The connecting duct 1104 may further include an opening 1108 that may be attached to the opening 1018 of the blower 804.

In an embodiment, the delivery duct 806 may define an arch 1102 that may circumferentially surround the nozzle assembly 206 of the additive manufacturing machine 100. The delivery duct 806 may define a plurality of vents 1106 for the cool air to exit the delivery duct 806.

In an embodiment, the plurality of vents 1106 may be angled such that cool air exiting the plurality of vents 1106 may converge to an area 1110 on the print plate 528 (shown transparent to facilitate understanding), of the additive manufacturing machine 100, where the molten filament 106 is getting deposited. In the instant embodiment, the cool air exits the plurality of vents 1106 in the direction 1112 to form an area 1110, within which the molten filament 106 is getting deposited on the print plate 528.

Figure 11B:
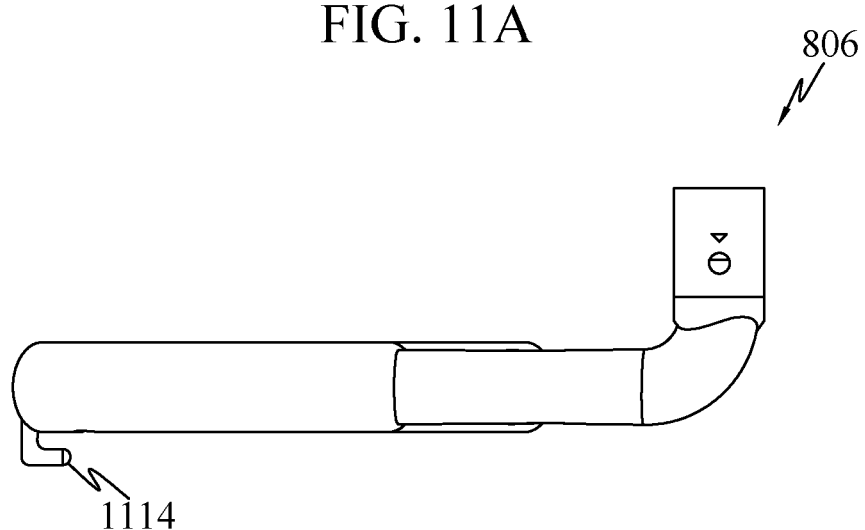
FIG. 11B is an orthographic projection of the delivery duct 806, including a temperature sensor 1114, in accordance with an embodiment.

In an embodiment, the delivery duct 806 may include a temperature sensor 1114, as shown in the orthographic projection in FIG. 11B. The temperature sensor 1114 may determine the temperature of the cool air exiting the delivery duct 806 via the vents 1106.

In another embodiment, a controller 110 (shown in FIG. 1) of the additive manufacturing machine 100 may receive signals indicating the temperature of the cool air, exiting the delivery duct 806, determined by the temperature sensor 1114. The controller 110 may control the cooling mechanism and in the process, vary the temperature of the cool air, exiting the vents 1106, to the desired level.

In an embodiment, in the process of solidifying the molten filament 106, the cool air may have gained some heat. However, the temperature of the cool air, even after absorbing the heat from the molten filament 106, may be much lesser than the temperature of the atmospheric air. Therefore, electricity usage may be reduced by cooling the cool air exiting the vents 1106, when compared to cooling the atmospheric air.

Figure 12A:
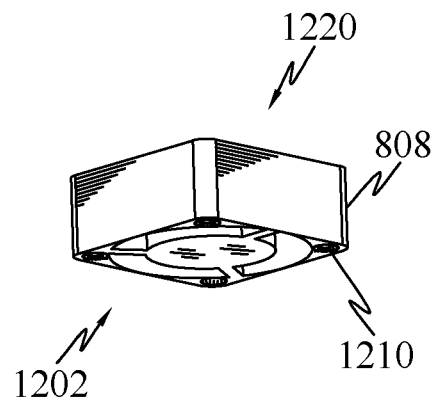
FIG. 12A is an isometric view of a cooling fan 808, in accordance with an embodiment.

Therefore, in an embodiment, the integrated cooling system 108 of the additive manufacturing machine 100 may deploy a suction fan 808, as shown in FIG. 12A, to suck the cool air that may be directed by the delivery duct 806 onto the print plate 528. The suction fan 808 may be positioned adjacent to the cooler 802 such that the suction side 1202 of the suction fan 808 may be facing the print plate 528 to suck the cool air blown onto the print plate 528 by the delivery duct 806. The suction fan 808 may discharge the cool air through the discharge side 1220. The cool air may be discharged by the suction fan 808 in front of the cooler 802, whereby the blower 804 sucks the air. In doing so, the workload to cool the atmospheric air may be reduced.

Figure 12B:
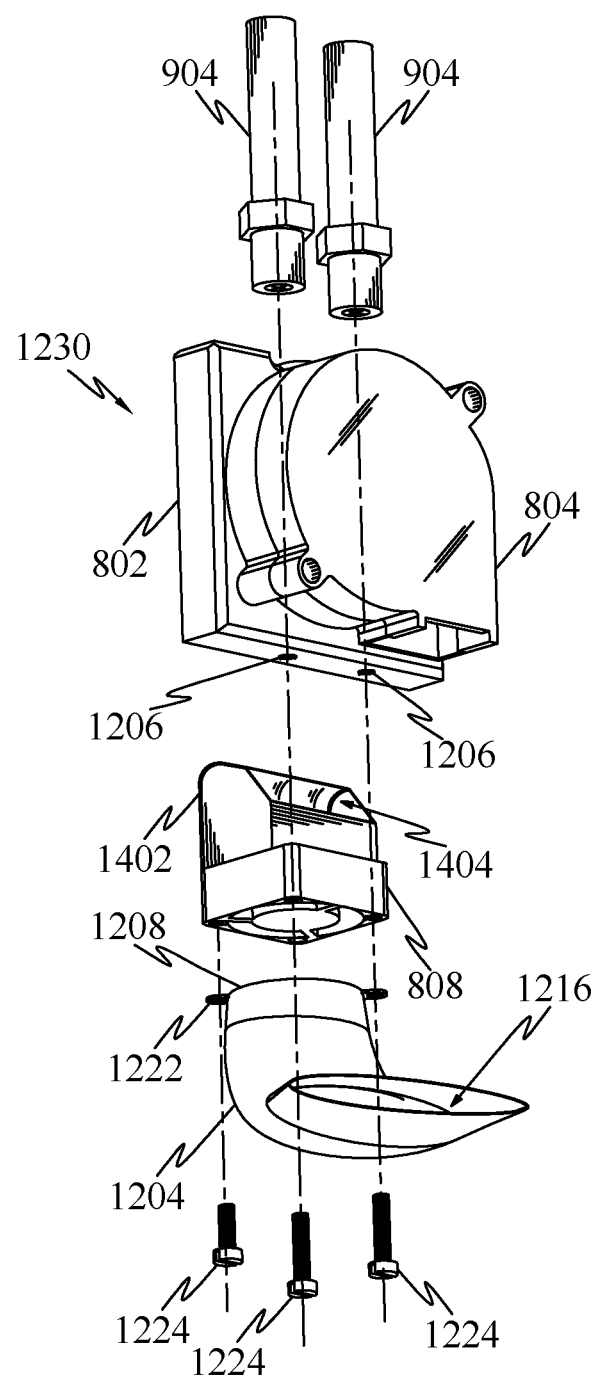
FIG. 12B is an exploded view of the cooler 802, the blower 804, a cooling fan 808 and a conduit 1204, in accordance with an embodiment.

FIG. 12B is an exploded view of the cooler 802, blower 804, suction fan 808 and a conduit 1204, in accordance with an embodiment. In sucking the cool air blown to the print plate 528, the suction fan 808 may also suck air at room temperature. Therefore, a conduit 1204 may be used to direct the cool air blown towards the print plate 528 to the suction fan 808 for effective cooling.

Connecting end 1208 of the conduit 1204 may be used to attach the conduit 1204 to the suction fan 808. The other end 1216 of the conduit 1204 may open to the print plate 528.

The connecting end of the conduit 1204 may include protrusions 1222 that may define a hole for screws 1224 to pass through. The cooling fan 808 may define holes 1210 (shown in FIG. 12A) such that the axis of the holes 1210 may be in line with that of the holes defined by the protrusions 1222. Further, the cooler 802 may define holes 1206, such that the axis of the hole 1206 is in line with that of the hole 1210 defined by the cooling fan 808.

Figure 13:
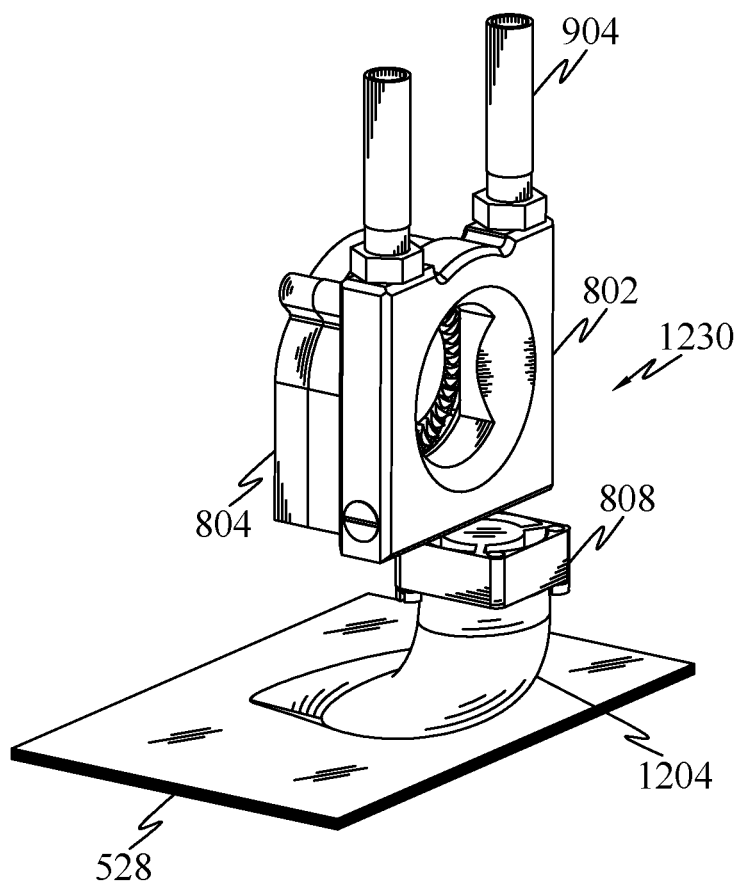
FIG. 13 is an assembled view of the cooling fan 808 and the conduit 1204 attached to the cooler 802, in accordance with an embodiment.

FIG. 13 is an assembled view of the cooling fan 808, conduit 1204 attached to the cooler 802, in accordance with an embodiment. The cooling fan 808 may be fastened to the cooler 802 using the set of screws 1224.

Figure 14A:
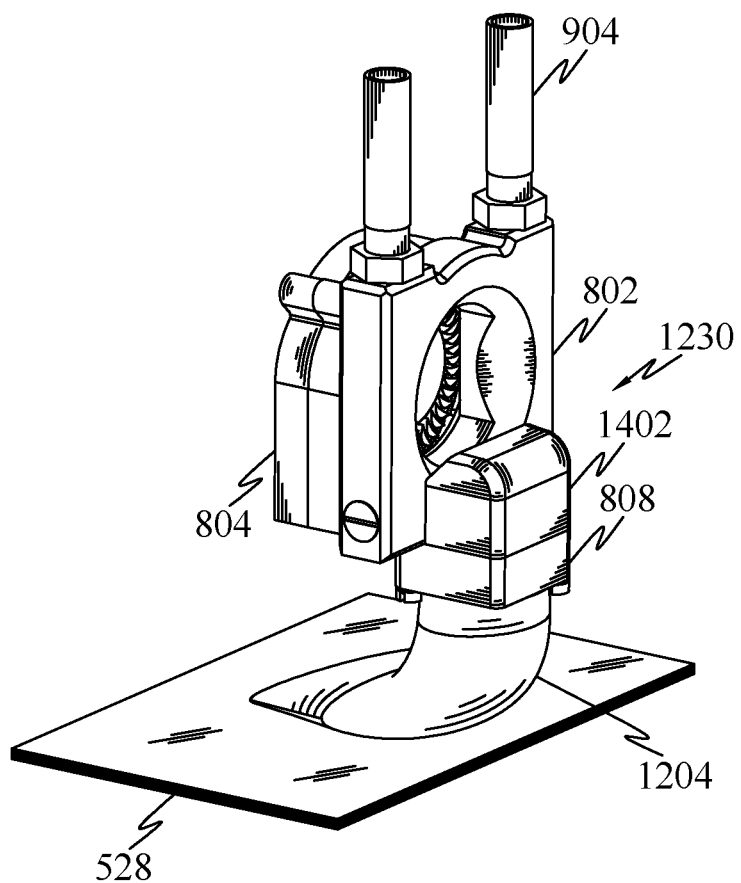
FIG. 14A is an assembled view of the cooling fan 808 with a cowl 1402, the conduit 1204 attached to the cooler 802, in accordance with an embodiment.

FIG. 14A is an assembled view of the cooling fan 808 with a cowl 1402, the conduit 1204 attached to the cooler 802, in accordance with an embodiment. The cowl 1402 may be attached to the cooling fan 808 to direct the cool air sucked in by the cooling fan 808 into the opening 902 of the cooler 802 using the opening 1404 (shown in FIG. 12B).

Figure 14B:
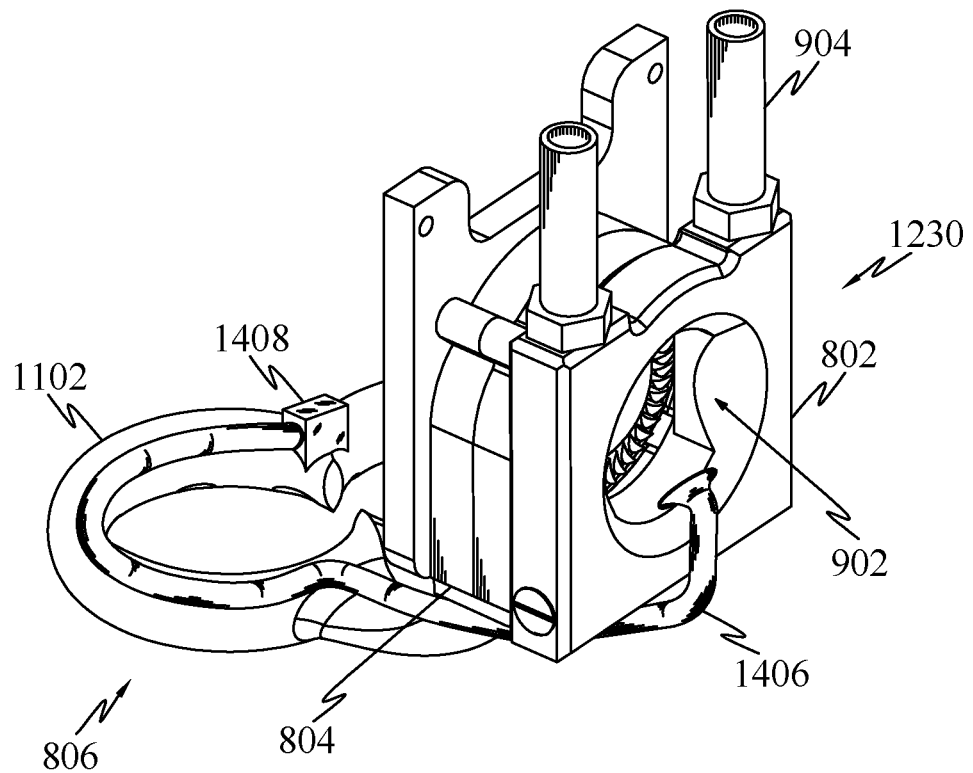
FIG. 14B is an assembled view of a recycling duct 1406 attached to the delivery duct 806, in accordance with an embodiment.

FIG. 14B is an assembled view of a recycling duct 1406 attached to the delivery duct 806, in accordance with an embodiment. The recycling duct 1406 may be attached to the arch 1102 defined by the delivery duct 806 using a connector 1408. The connector 1408 may open into the delivery duct 806 such that a portion of the cool air passing through the delivery duct may enter the recycling duct 1406, through the connector 1408. The recycling duct 1406 may be arranged in a way such that, one end is attached to the connector 1408 and other end opens into the opening 902 defined by the cooler 802. The portion of the cool air passing through the recycling duct 1406 may be directed to the opening 902 of the cooler 802, for the blower 804 to suck in.

Figure 15:
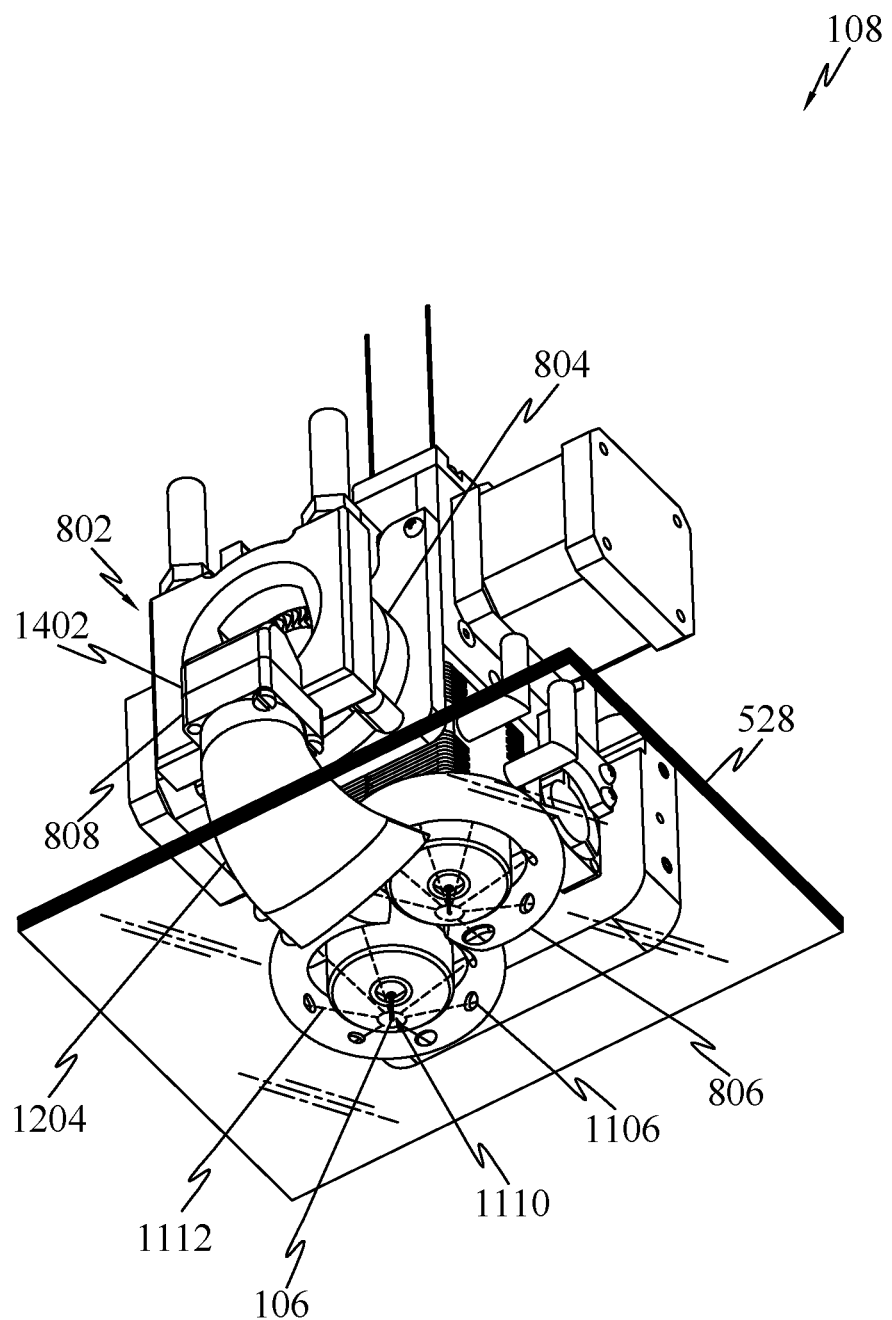
FIG. 15 illustrates an exemplary integrated cooling system 108, to cool and instantly solidify the molten filament 106 getting deposited on the print plate 528 of the additive manufacturing machine 100, in accordance with an embodiment.

FIG. 15 illustrates an exemplary integrated cooling system 108, to cool and instantly solidify the molten filament 106 getting deposited on the print plate 528 of the additive manufacturing machine 100, in accordance with an embodiment. The blower 804 may suck the atmospheric air through the cooler 802. The air passing through the cooler 802 may get cooled due to the cool fluid circulating within the cooler 802. The blower 804 may blow the air cooled by the cooler 802 into the delivery duct 806 through the connecting duct 1104. The cool air may exit the delivery duct 806 through the vents 1106, wherein the vents 1106 are angled such that the cool air converges to form an area 1110 around the molten filament 106 getting deposited on the print plate 528. In the instant embodiment, the cool air may exit the vents 1106 along the direction 1112. The cool air after solidifying the molten filament 106 may be sucked in back by the cooling fan 808 using the conduit 1204.

Figure 16A:
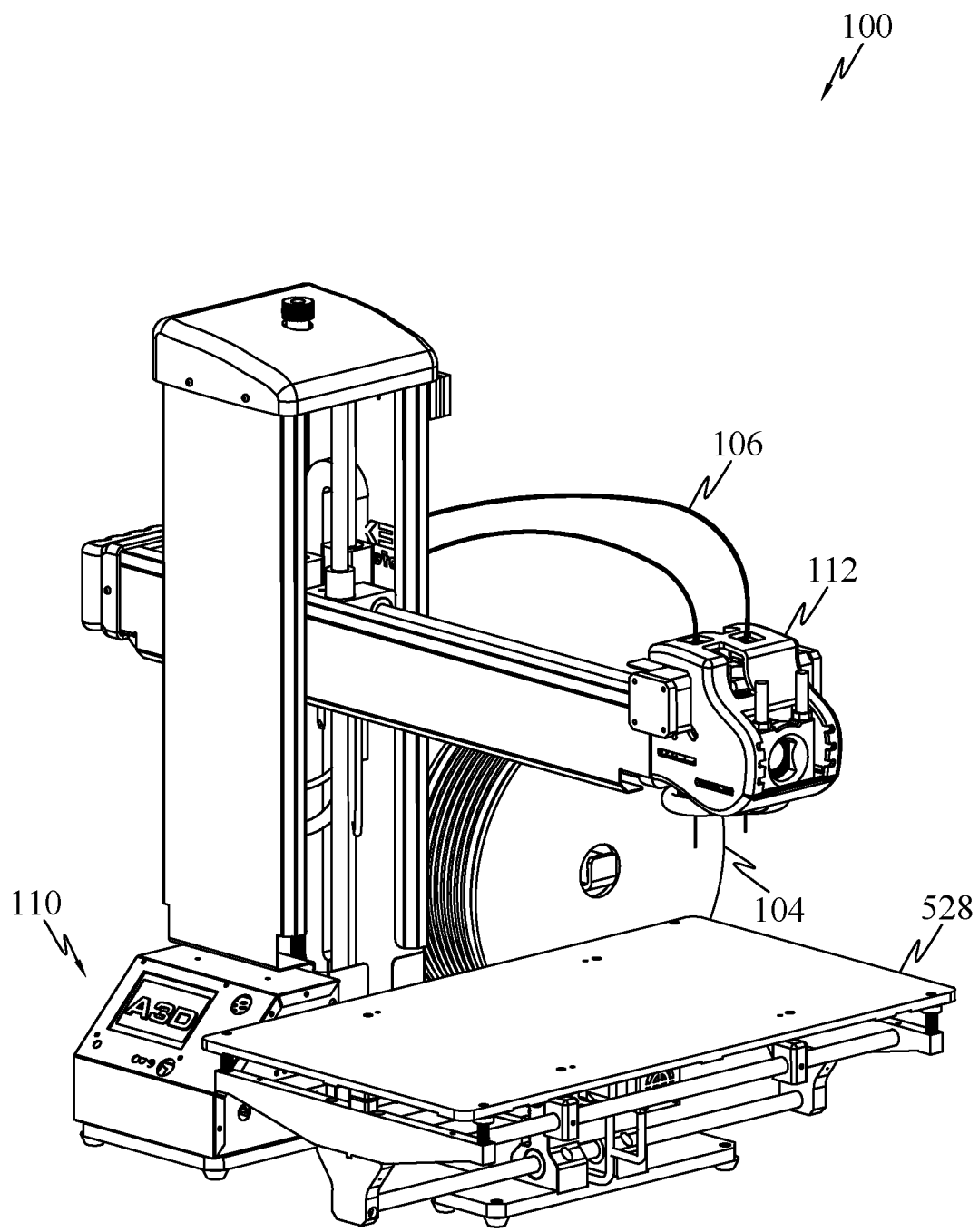
FIG. 16A is an isometric view of the additive manufacturing machine 100 depicting a housing 112 to cover the system 102 and the integrated cooling system 108, in accordance with an embodiment.

FIG. 16A is an isometric view of the additive manufacturing machine 100, in accordance with an embodiment. In an embodiment, the additive manufacturing machine 100 may further include a housing 112. The housing 112 may be a rigid casing that may enclose and protect the system 102 and the integrated cooling system 108.

Figure 16B:
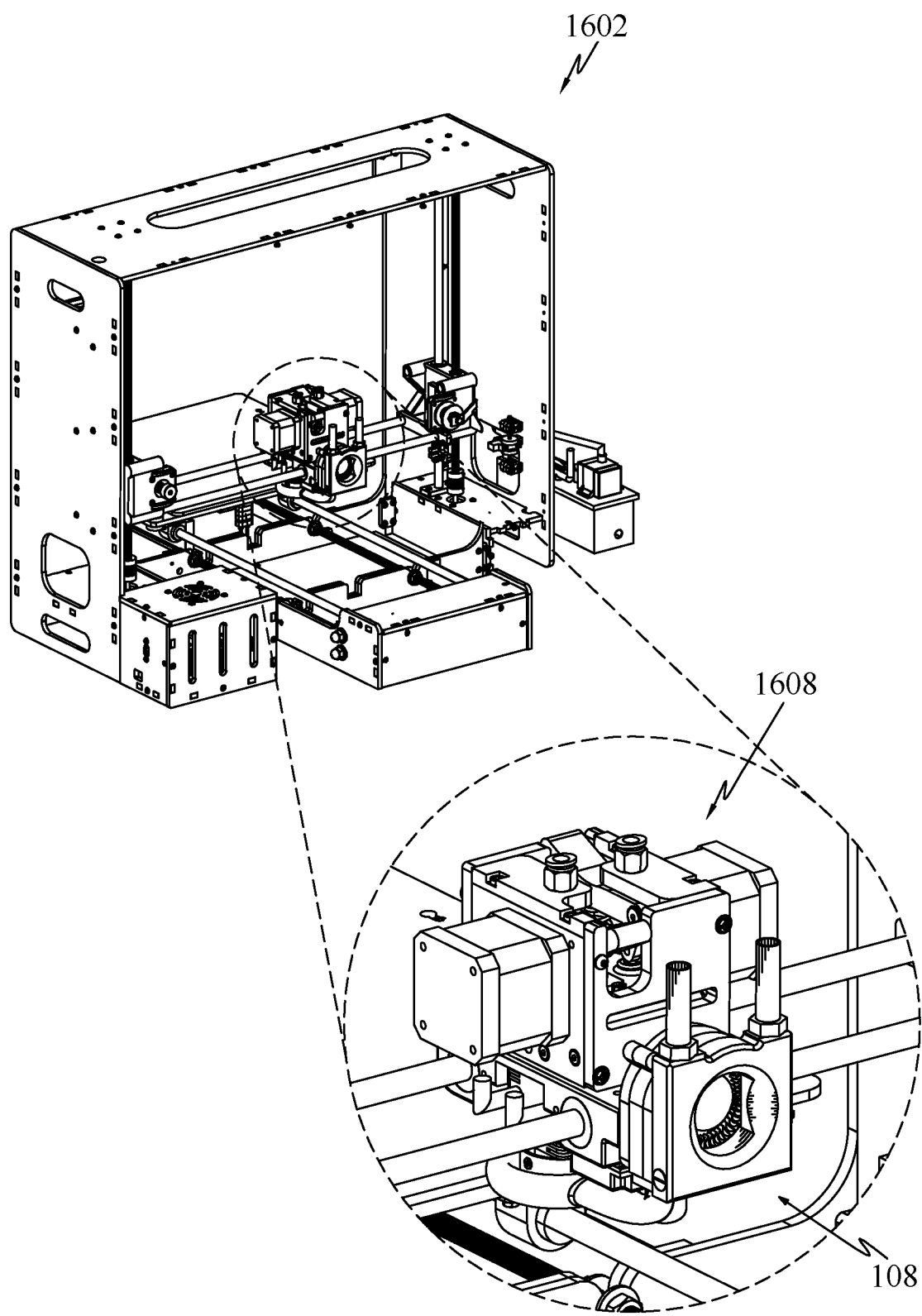
FIG. 16B is an isometric view of an additive manufacturing machine 1602, in accordance with an embodiment.

FIG. 16B is an isometric view of an additive manufacturing machine 1602, in accordance with an embodiment. The integrated cooling system 108 may be attached to any existing additive manufacturing machines or the conventional additive manufacturing machine 1602 as shown in the FIG. 16B. The conventional additive manufacturing machine 1602 shown here has a fixed frame within which nozzle assembly 1608 traverses.

Therefore, in an embodiment, the integrated cooling system 108 may be a universally adaptable system that may be attached to any additive manufacturing machines, existing or that may be made available in near future, to cool molten filament getting deposited on a print plate of the additive manufacturing machines.

Also, present additive manufacturing machines lack universally adaptable cooling mechanism to cool the molten filament getting deposited on the print plate.

First Tower 1702:

The movement system 112 for achieving movement of at least a nozzle assembly 206 and the print plate 528 and their associated parts will now be described in detail.

The movement system 112 may move at least the nozzle assembly 206 in a required axis using the first tower 1702. In an embodiment, the required axis may be y-axis, or any axis that may be parallel to the surface of the print plate 528. Any axes mentioned thus far or that may be mentioned hereinafter are only for illustrative purposes and shall not be considered as limiting. For illustrative purposes, the required axis or the y-axis may be referred to as first axis 1708 (shown in FIG. 17), hereinafter. FIG. 18 is an exploded view of the first tower 1702, in accordance with an embodiment. The first tower 1702 may include a belt assembly 1802, a carriage system 1804 and at least three primary rods 1806. The three primary rods 1806 may be arranged such that the axis of the three primary rods 1806 may be parallel to the first axis 1708 and the three primary rods 1806 may define a triangular cross section. The three primary rods 1806 may be held in place using the first holding plate 534 and a second holding plate 1808.

Further, FIG. 17 shows three mutually perpendicular axes with respect to the additive manufacturing machine 100, namely, first axis 1708, second axis 1710 and third axis 1712.

Figure 19A:
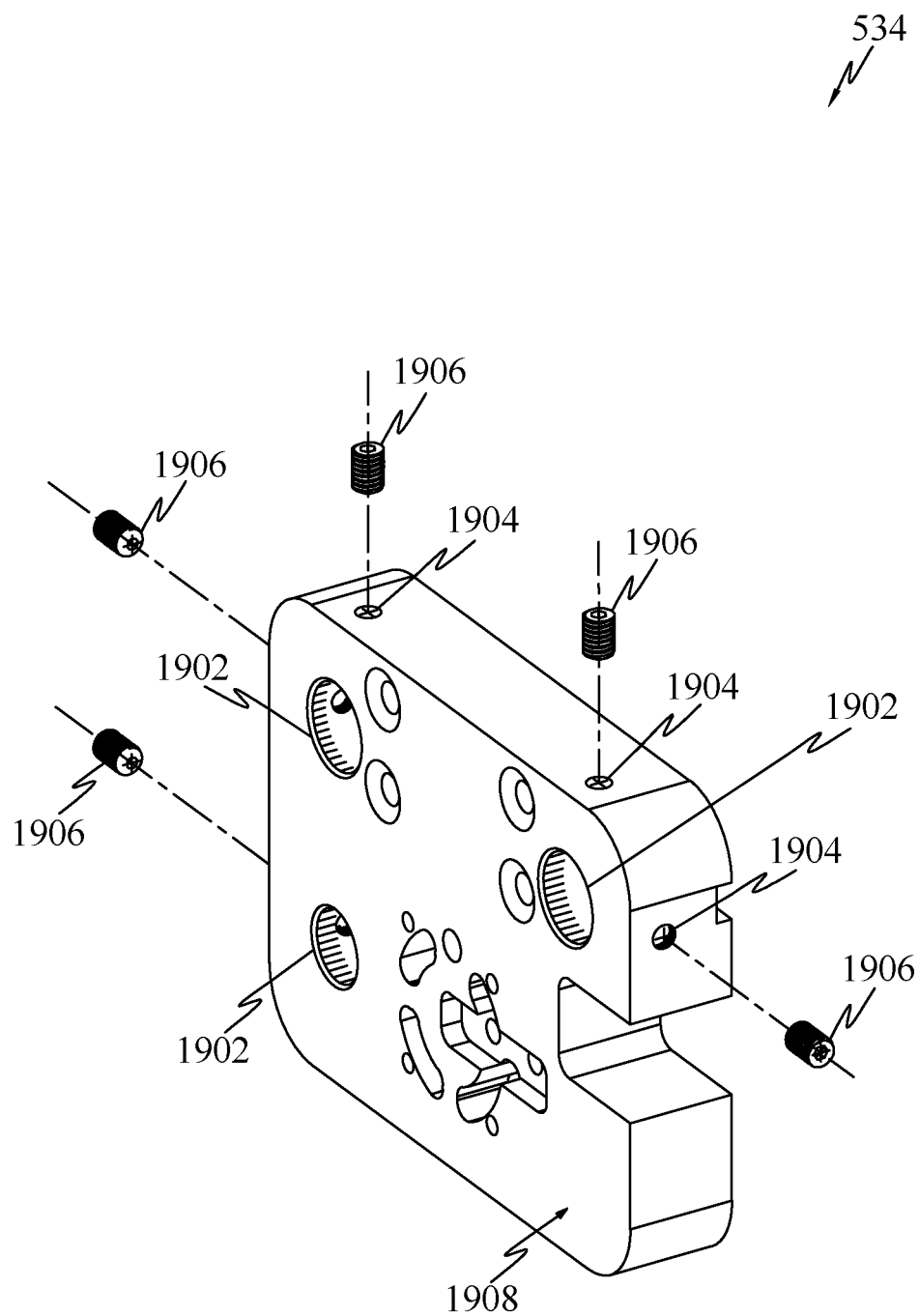
FIG. 19A is an exploded view of a first holding plate 534, in accordance with an embodiment.

FIG. 19A is an exploded view of the first holding plate 534, in accordance with an embodiment. Front face 1908 of the first holding plate 534 may define at least three holes 1902 for one end of the three primary rods 1806 to fit in. Additionally, the first holding plate 534 may define three through holes 1904 along the edge, such that the axes of the three through holes 1904 may be perpendicular to the axes of the three holes 1902 and each of the three through holes 1904 may extend into each of the three holes 1902 defined on the front face 1908 of the first holding plate 534. Three pins 1906, that may pass through the three through holes 1904 defined on the first holding plate 534, may be used to tighten the three primary rods 1806 when the three primary rods 1806 may be placed within the three holes 1902.

Figure 19B:
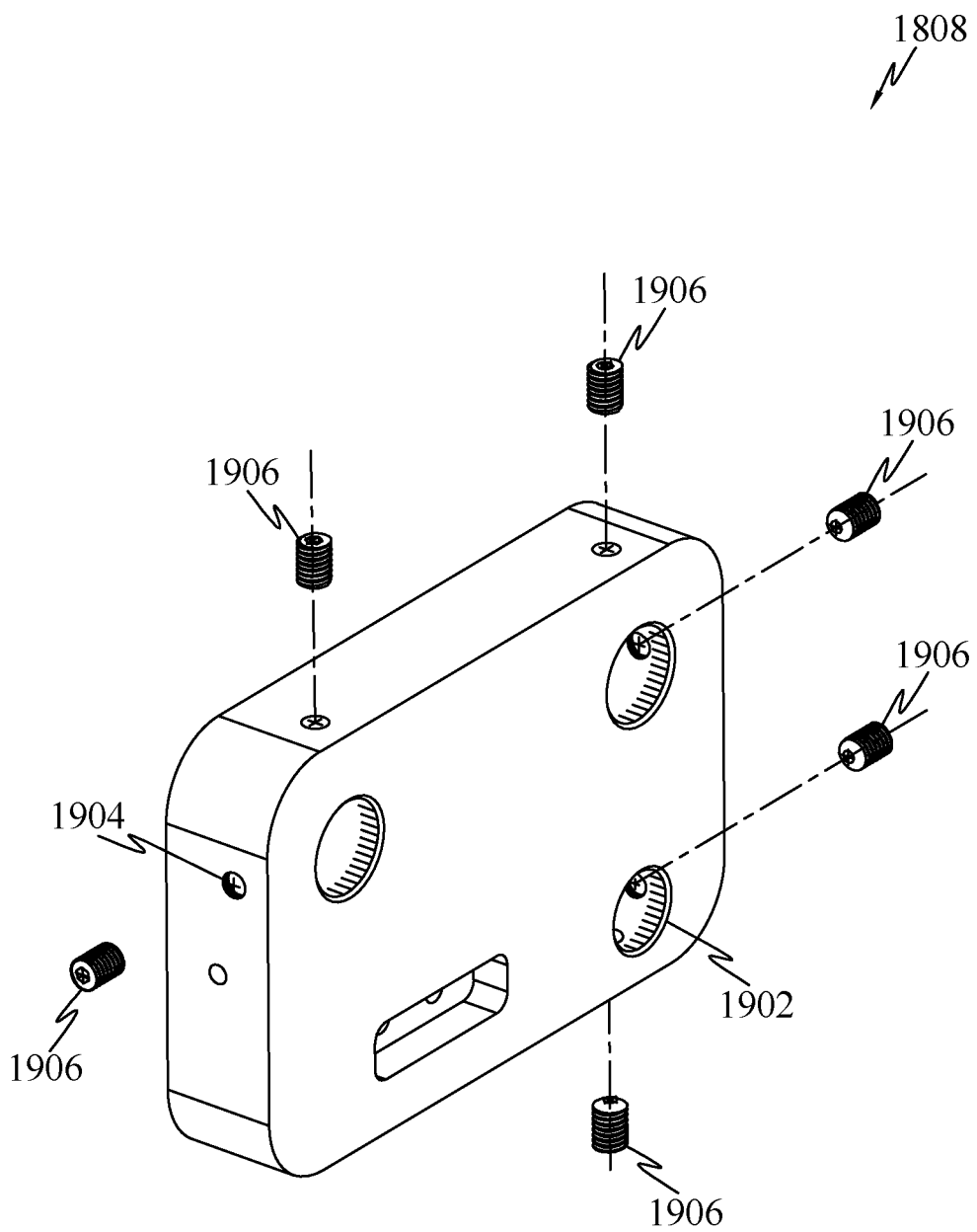
FIG. 19B is an exploded view of a second holding plate 1808, in accordance with an embodiment.

FIG. 19B is an exploded view of the second holding plate 1808, in accordance with an embodiment. The second holding plate 1808 may define at least three holes 1902 for other end of the three primary rods 1806 to fit in. Additionally, the second holding plate 1808 may define three through holes 1904 along the edge, such that the axes of the three through holes 1904 may be perpendicular to the axes of the three holes 1902 and each of the three through holes 1904 may extend into each of the three holes 1902 defined on the second holding plate 1808. Three pins 1906, that may pass through the three through holes 1904 defined on the second holding plate 1808, may be used to tighten the three primary rods 1806 when the three primary rods 1806 may be placed within the three holes 1902.

The three primary rods 1806 may be positioned and tightened between the holes 1902 defined on the first holding plate 534 and the second holding plate 1808. The triangular position of the three primary rods 1806 may provide stability to the first tower 1702 and may also prevent twisting of the first tower 1702. Additionally, the combined mass of the system 102 and the integrated cooling system 108 at one end of the first tower 1702 may result in sagging of the first tower 1702. Even a slight sag in the first tower 1702 may reduce the efficiency of the additive manufacturing machine 100. The triangular position of the three primary rods 1806 may reduce the sagging of the first tower 1702 by providing the required stability to remain parallel to the print plate 528 at all times.

In another embodiment, the first tower 1702 may include more than three primary rods 1806. These more than three primary rods 1806 may be arranged parallel to the first axis 1708 and the primary rods 1806 may define a triangular cross section.

Figure 20:
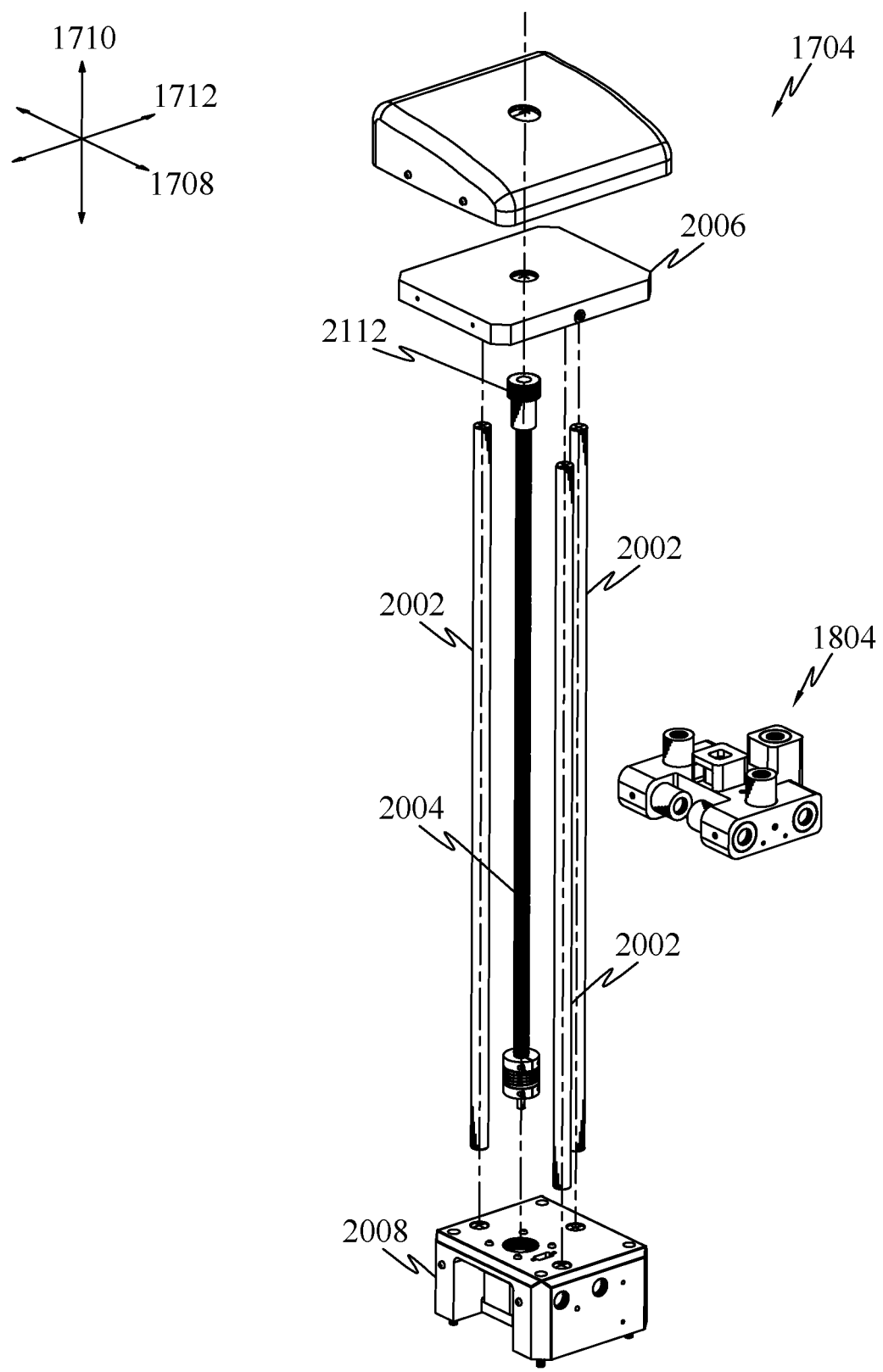
FIG. 20 is an exploded view of the second tower 1704, in accordance with an embodiment.

Second Tower 1704:

The movement system 112 may move at least the nozzle assembly 206 in a required axis using the second tower 1704. In an embodiment, the required axis may be a z-axis, or any axis that may be perpendicular to the surface of the print plate 528. For illustrative purposes, the required axis or the z-axis may be referred to as second axis 1710, hereinafter. FIG. 20 is an exploded view of the second tower 1704, in accordance with an embodiment. The second tower 1704 may include the carriage system 1804, at least three secondary rods 2002 and a screw rod 2004. The three secondary rods 2002 may be arranged such that the axes of the three secondary rods 2002 may be parallel to the second axis 1710 and the three secondary rods 2002 may define a triangular cross section. The three secondary rods 2002 may be held in place using a holding plate 2006 and a motor mount 2008.

Figure 21:
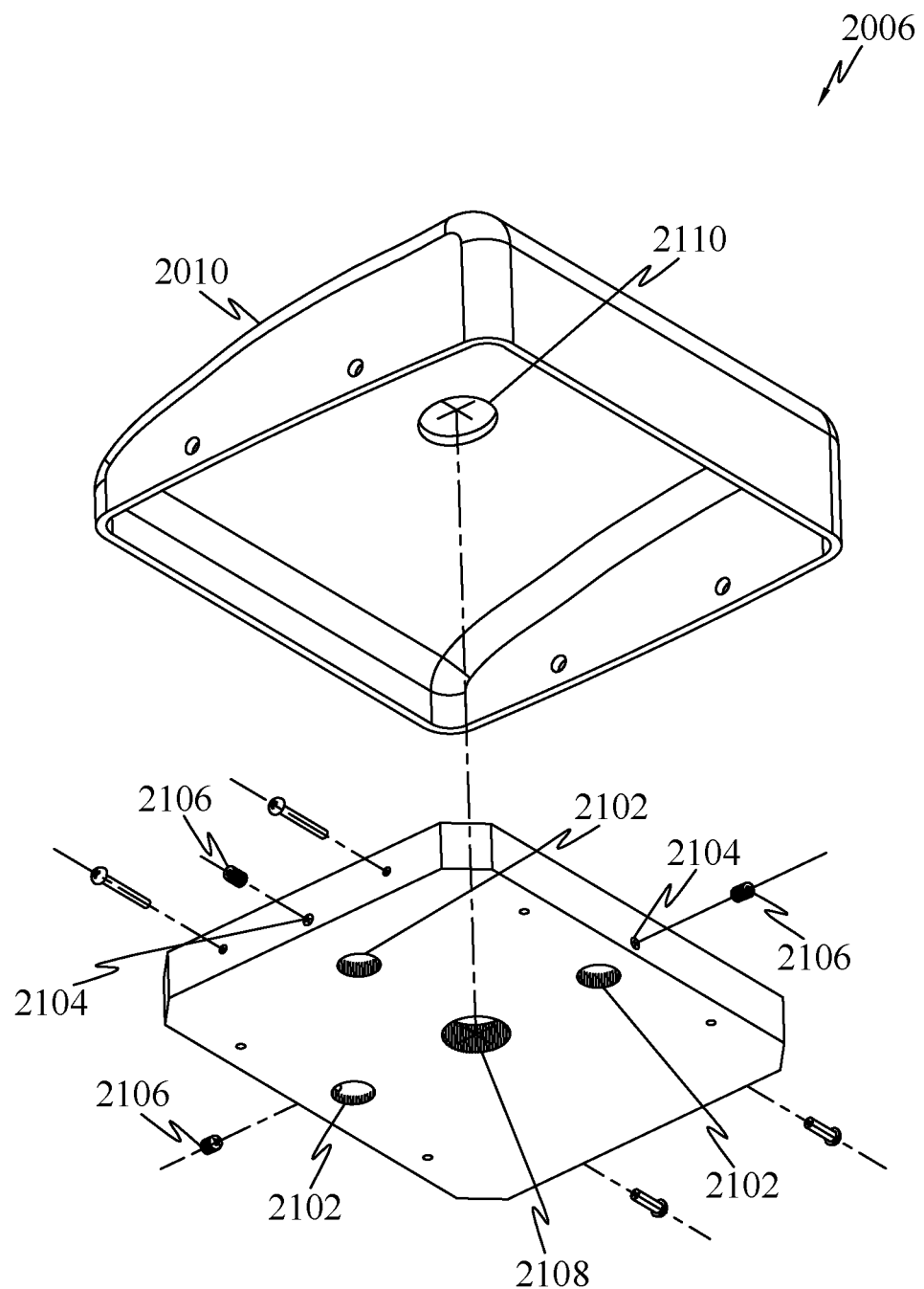
FIG. 21 is an exploded view of a holding plate 2006, in accordance with an embodiment.

FIG. 21 is an exploded view of the holding plate 2006, in accordance with an embodiment. The holding plate 2006 may define at least three holes 2102 for one end of the three secondary rods 2002 to fit in. Additionally, the holding plate 2006 may define three through holes 2104 along the edge, such that the axes of the three through holes 2104 may be perpendicular to the axes of the three holes 2102 and each of the three through holes 2104 may extend into each of the three holes 2102 defined by the holding plate 2006. Three pins 2106, that may pass through the three through holes 2104 defined by the holding plate 2006, may be used to tighten the three secondary rods 2002 when the three secondary rods 2002 fit into the three holes 2102. The holding plate 2006 may further define a through hole 2108 for one end of the screw rod 2004 to pass through. Additionally, the second tower 1704 may further include a cap 2010 that may cover the holding plate 2006. The cap 2010 may define a through hole 2110 for the screw rod 2004 to pass through. A nut 2112 (shown in FIG. 20) may be used to screw the screw rod 2004 to the cap 2010.

Figure 22:
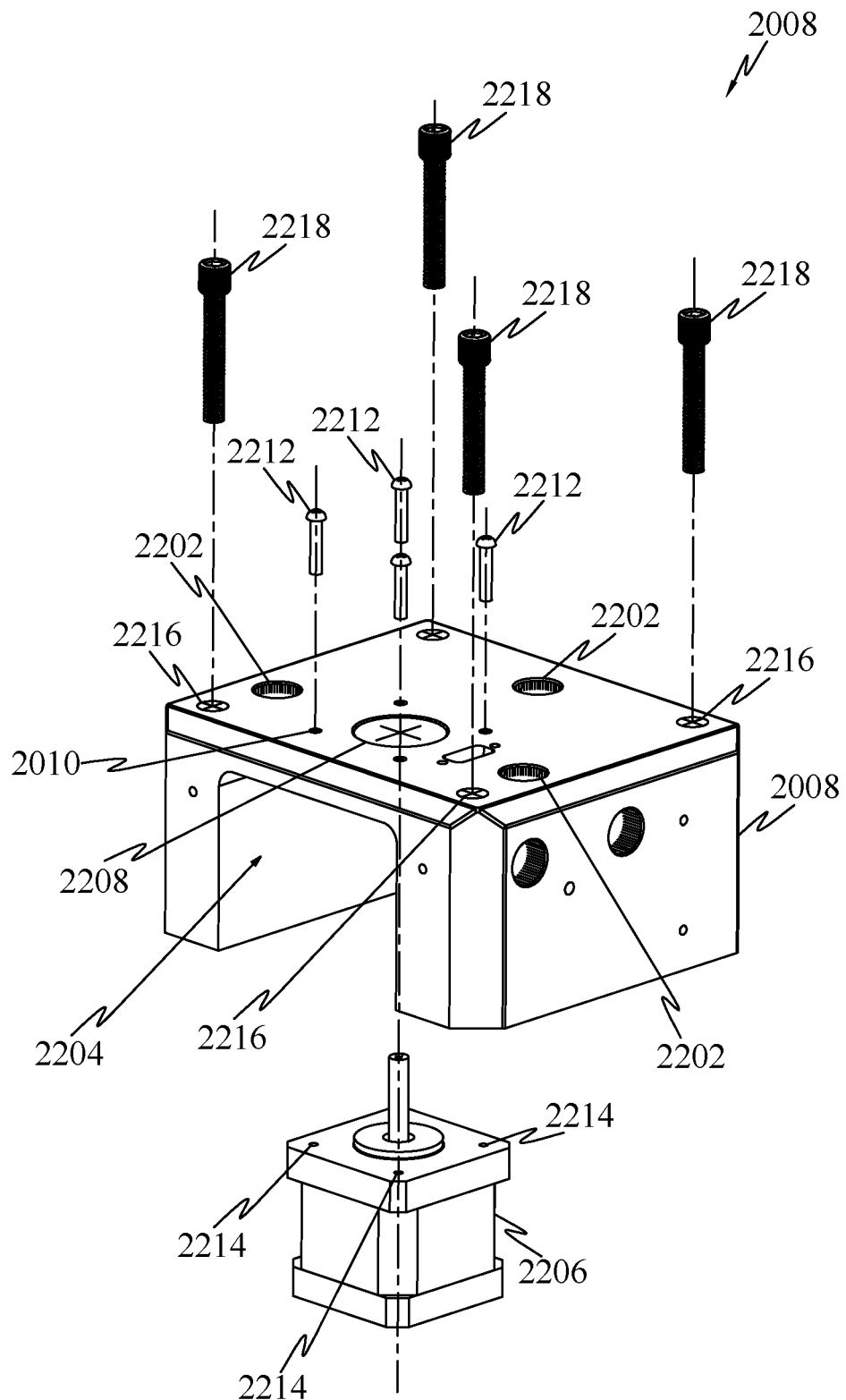
FIG. 22 is an exploded view of a motor mount 2008, in accordance with an embodiment.

FIG. 22 is an exploded view of the motor mount 2008, in accordance with an embodiment. The motor mount 2008 may define three holes 2202 for other end of the three secondary rods 2002 to fit in. The motor mount 2008 may also define a cavity 2204 to accommodate a motor 2206. Additionally, the motor mount 2008 may define a through hole 2208 that may open into the motor 2206. Other end of the screw rod 2004 may pass through the through hole 2208 and may be connected to the motor 2206. The motor mount 2008 may further define four through holes 2210 for screws 2212 to pass through. The motor 2206 may define four holes 2214, wherein the axis of the four holes 2214 may be in line with the axis of the four through holes 2210 defined by the motor mount 2008. The motor 2206 may be attached to the motor mount 2008 using the screws 2212. Additionally, the motor mount 2008 may define four through holes 2216 along the edge for four screws 2218 to pass through.

The three secondary rods 2002 may be positioned and tightened between the holes 2102 defined on the holding plate 2006 and the holes 2202 defined on the motor mount 2008. The triangular position of the three secondary rods 2002 may ensure that there is no yawing moment due to twist about the second axis 1710. This may help in reducing the twist on the secondary rods 2002. This may also help in reducing the twisting of the primary rods 1806.

Figure 23A:
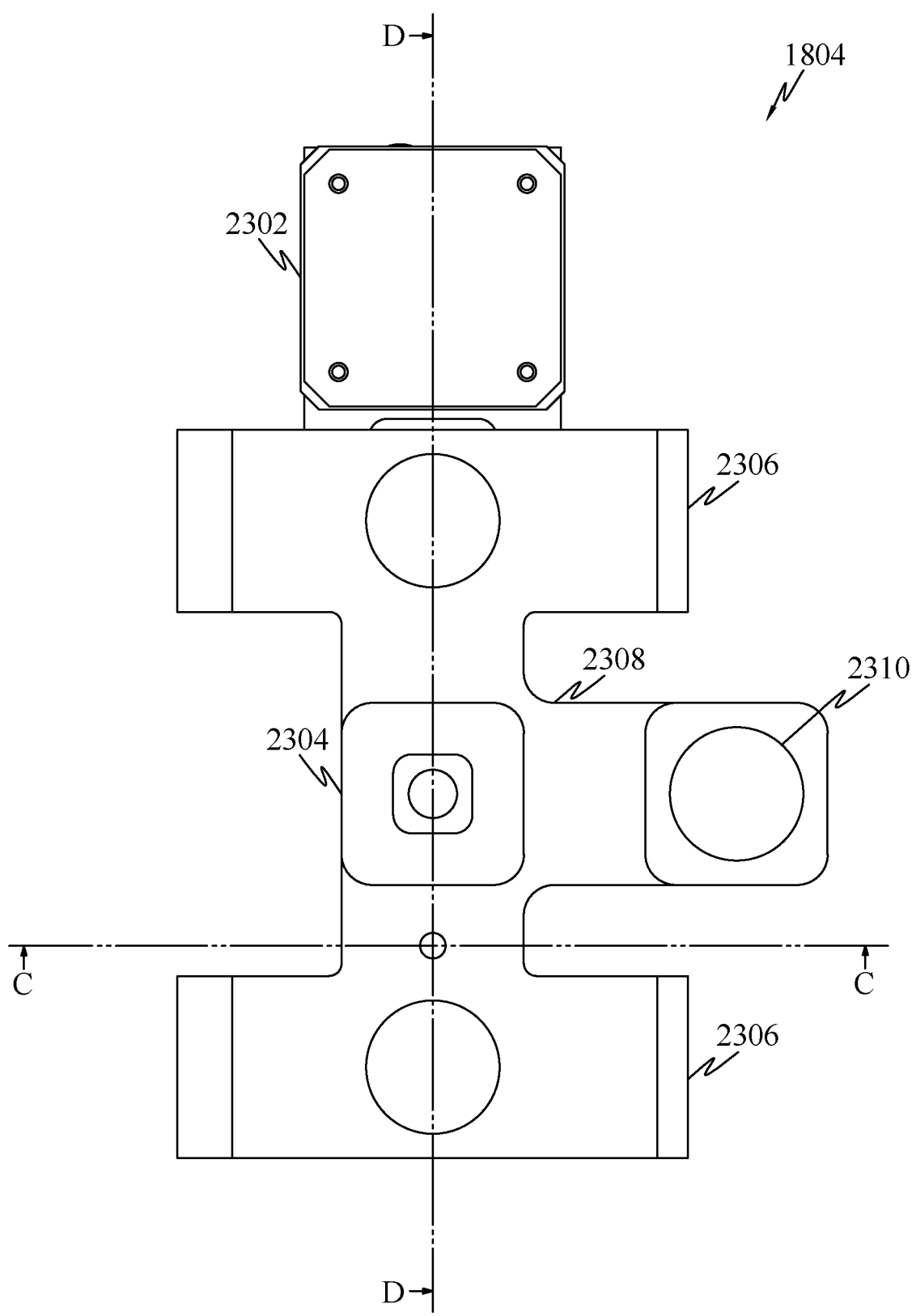
FIG. 23A is an orthographic projection of the carriage system 1804 depicting section lines C-C and D-D, in accordance with an embodiment.

Carriage System 1804:

The movement system 112 may enable the first tower 1702 to move back and forth, along the first axis 1708 and to enable the first tower 1702 to move up and down the second tower 1704 along the second axis 1710 using the carriage system 1804. FIG. 23A is an orthographic projection of the carriage system 1804, depicting section line C-C and section line D-D, in accordance with an embodiment. The carriage system 1804 may be an H-shaped or an I-shaped structure, and may include a motor 2302. The carriage system 1804 may be arranged such that the web 2304 of the carriage system 1804 may be along the first axis 1708 and the two flanges 2306 may be perpendicular to the first axis 1708 and along third axis 1712. In an embodiment, one side of the web 2304 may include a protrusion 2308, wherein the protrusion 2308 may be a L-shaped protrusion 2308 defining a hole 2310 such that the axis of the hole 2310 may be along the second axis 1710. In some embodiments, the hole 2310 may be a through hole 2310.

Figure 23B:
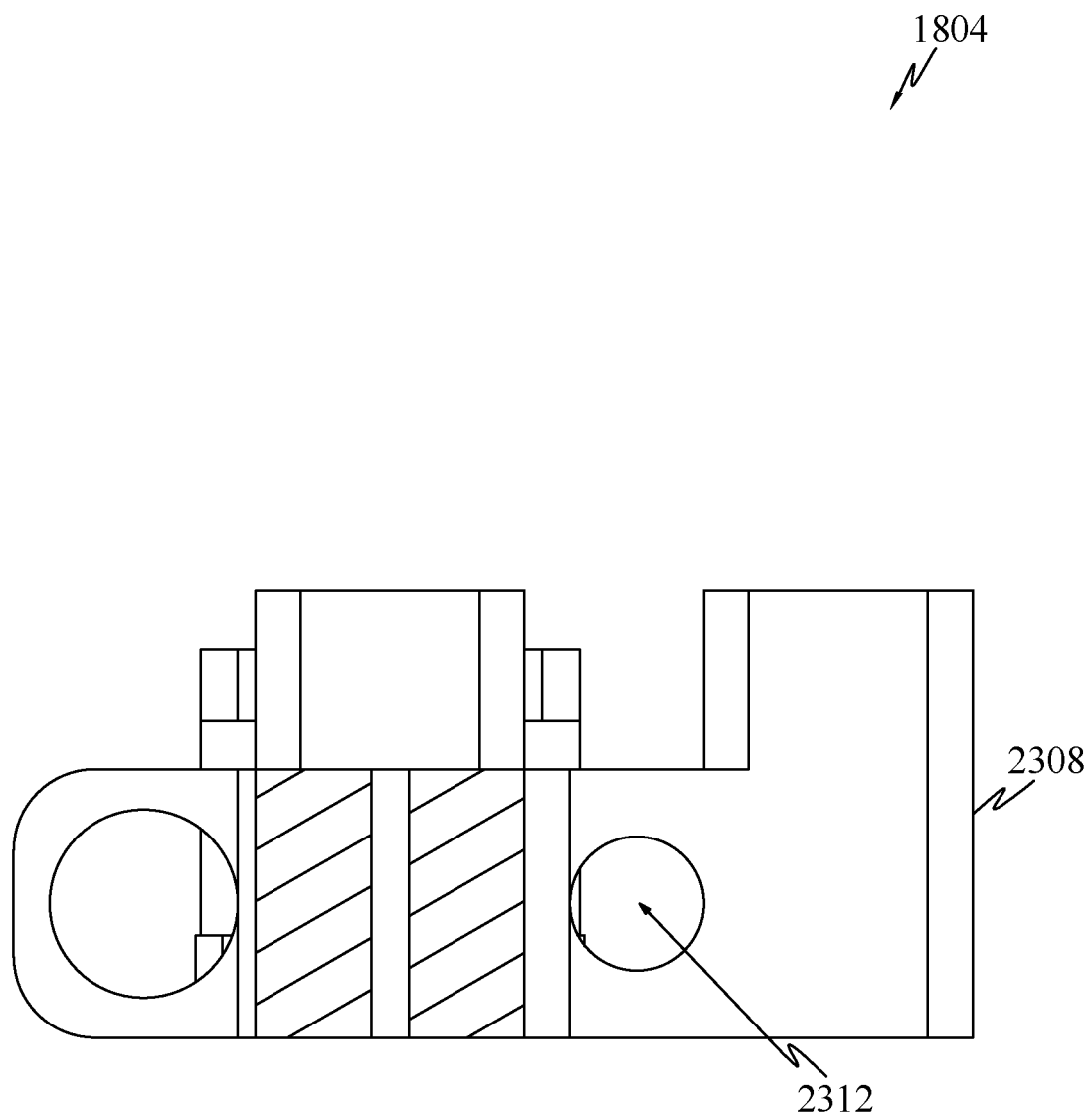
FIG. 23B is a section view of the carriage system 1804, in accordance with an embodiment.

FIG. 23B is a section view of the carriage system 1804, along the section line C-C, (shown in FIG. 23A), in accordance with an embodiment. The L-shaped protrusion 2308 of the carriage system 1804 may define a hole 2312 such that the axis of the hole 2312 may be along the first axis 1708. In some embodiments, the hole 2312 may be a through hole 2312.

Figure 24A:
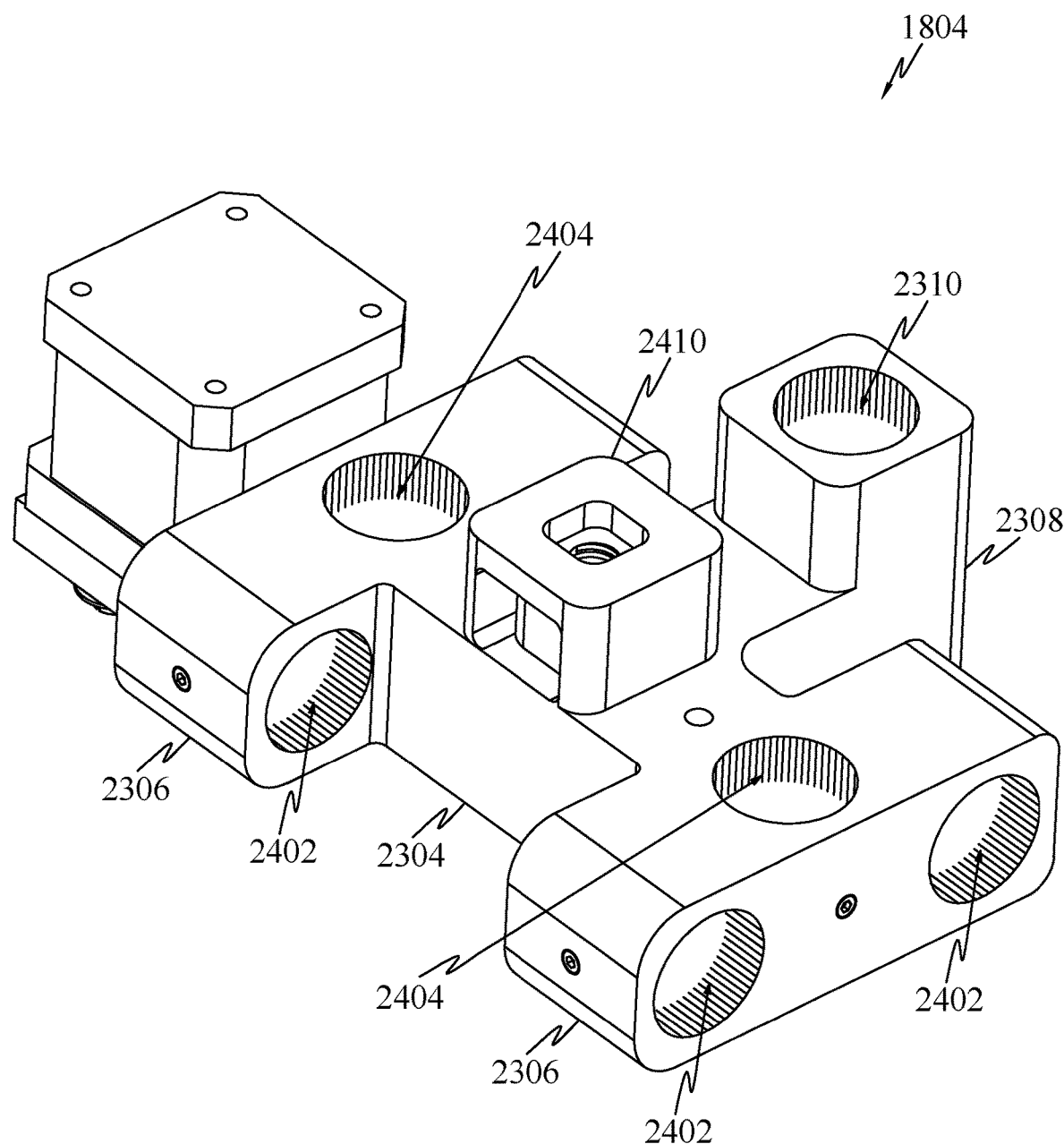
FIG. 24A is an isometric view of the carriage system 1804, in accordance with an embodiment.

FIG. 24A is an isometric view of the carriage system 1804, in accordance with an embodiment. Each flange 2306 of the carriage system 1804 may define two holes 2402 for two of the three primary rods 1806 to pass through. Additionally, the two flanges 2306 may define a hole 2404 each, such that the two holes 2404 are perpendicular to the hole 2402. Two of the three secondary rods 2002 may pass through the two holes 2404. The third secondary rod 2002 may pass through the through hole 2310 defined by the protrusion 2308.

Figure 24B:
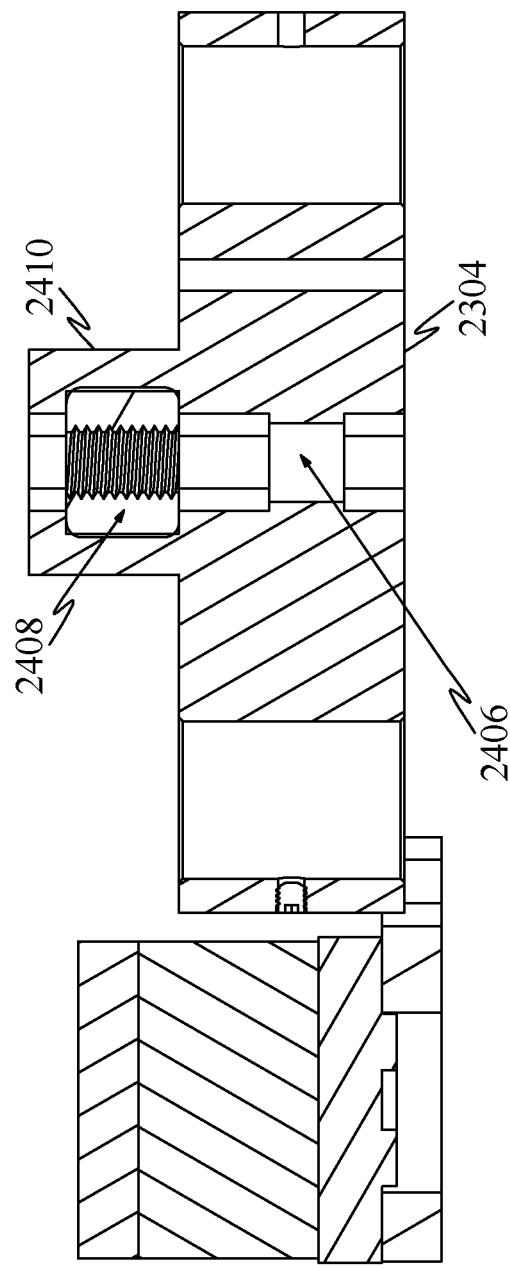
FIG. 24B is a section view of the carriage system 1804, in accordance with an embodiment.

FIG. 24B is a section view of the carriage system 1804, along the section line D-D, (shown in FIG. 23A), in accordance with an embodiment. The web 2304 of the carriage system 1804 may define a hole 2406 for the screw rod 2004 to pass through. In some embodiments, the hole 2406 may be a threaded through hole 2406.

In an embodiment, the web 2304 of the carriage system 1804 may include a protrusion 2408 such that the threaded through hole 2406 may extend into the protrusion 2408. In yet another embodiment, the carriage system 1804 may define a square nut 2410 (also shown in FIG. 24A) covering the protrusion 2408. In some embodiments, the hole 2406

Figure 25:
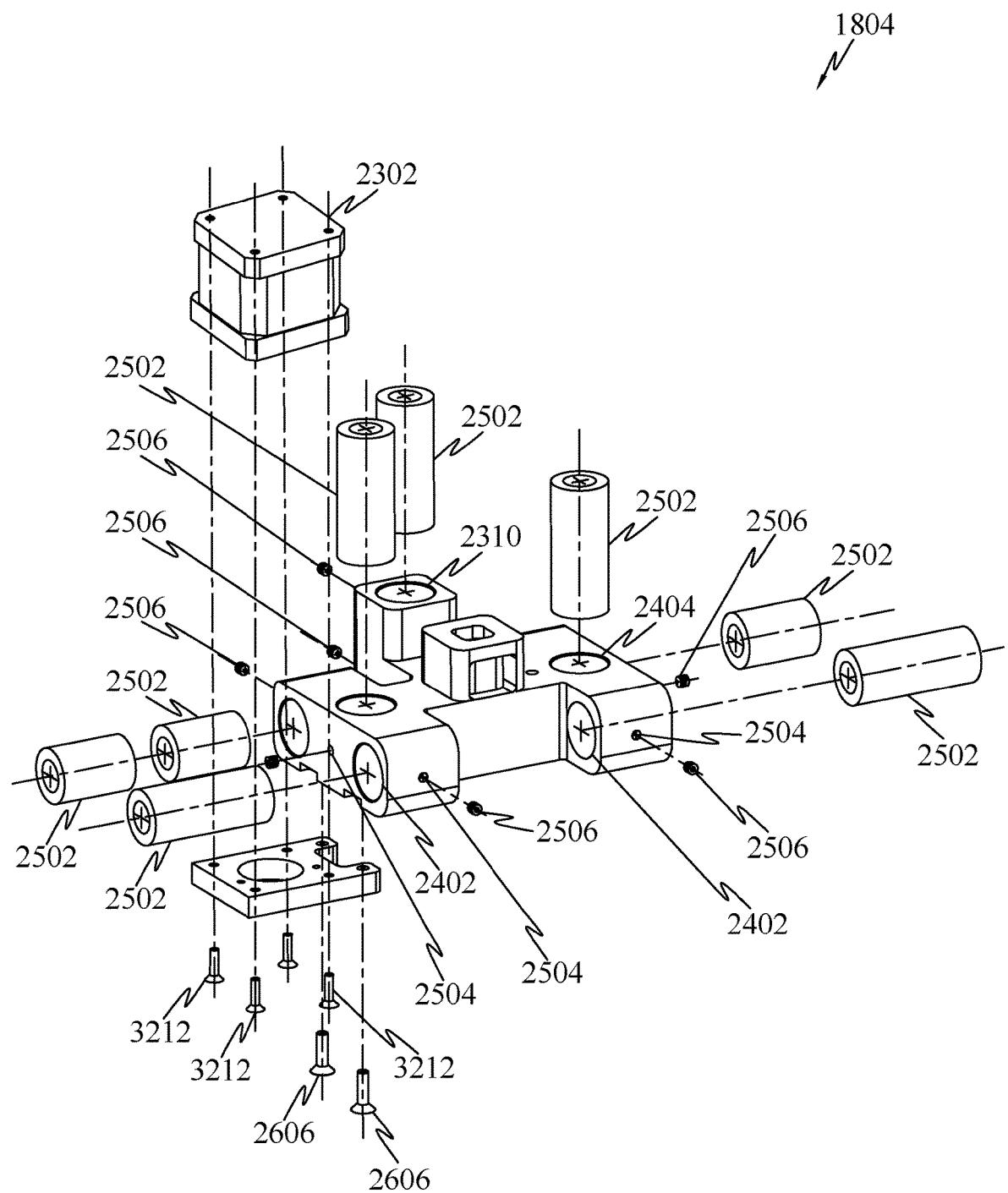
FIG. 25 is an exploded view of the carriage system 1804 along with a motor 2302, in accordance with an embodiment.

FIG. 25 is an exploded view of the carriage system 1804 along with the motor 2302, in accordance with an embodiment. The carriage system 1804 may include eight bushes 2502 wherein each of the eight bushes 2502 may go into each of the eight through holes 2310 2312 2402 2404 defined by the carriage system 1804. The bushes 2502 may define a through hole for one of the primary rods 1804 and the secondary rods 2002 to pass through. In an embodiment, the carriage system 1804 may define eight through holes 2504, such that the axis of the eight through holes 2504 may be perpendicular to the axis of the eight through holes 2310 2312 2402 2404, defined for the bushes 2052 to pass through, and each of the eight through holes 2504 may extend into each of the eight through holes 2310 2312 2402 2404 defined for the bushes 2502 to pass through. Eight pins 2506, that may pass through the eight through holes 2504, may be used to tighten the eight bushes 2502 within the eight through holes 2310 2312 2402 2404.

In an embodiment, the eight through holes 2504 may be threaded through holes and the eight pins 2506 may be allen screws that may be used to tighten the bushes 2502 and as a result to restrict the movement of the bushes 2502.

Figure 26:
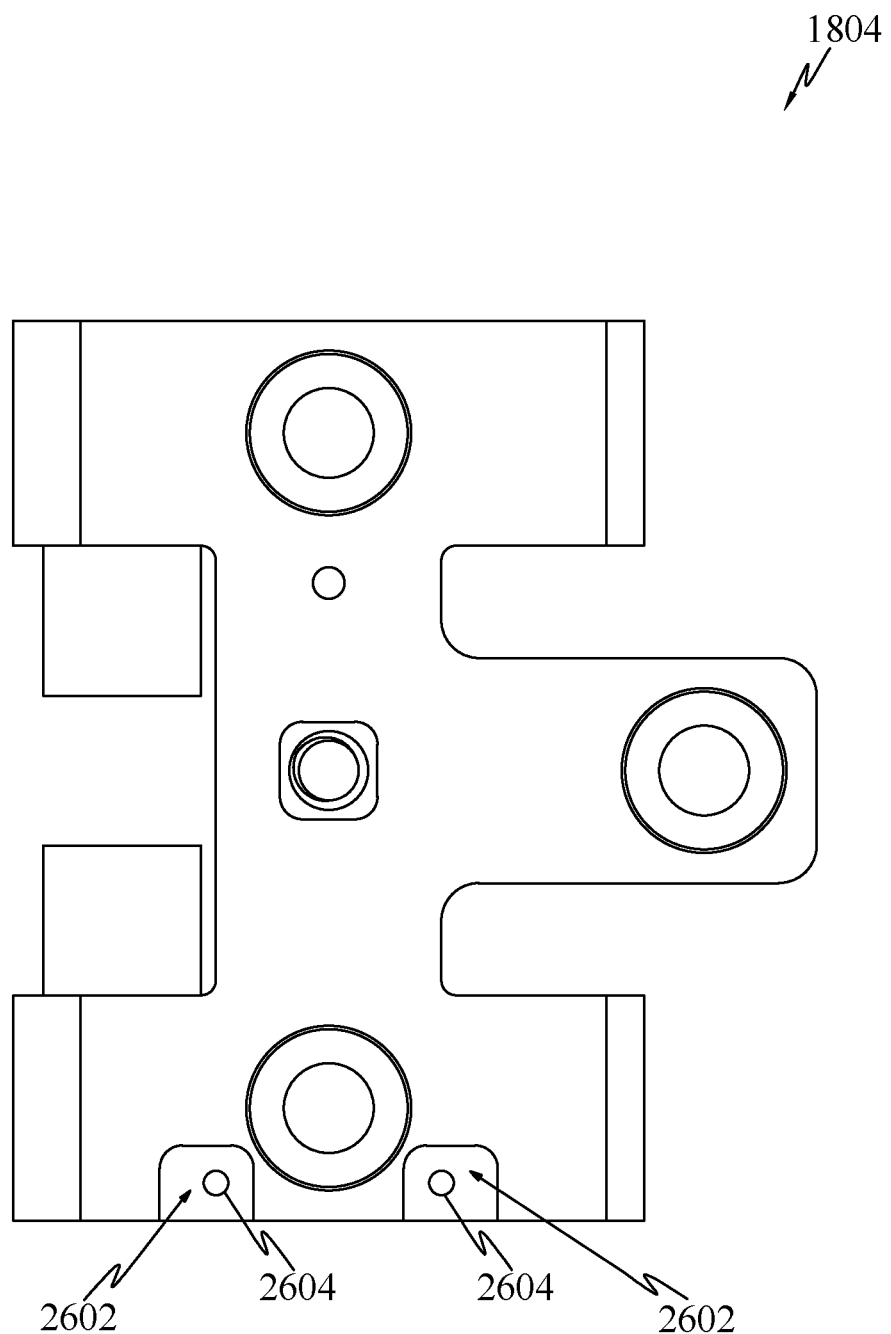
FIG. 26 is an orthographic projection of the carriage system 1804, in accordance with an embodiment.

FIG. 26 is an orthographic projection of the carriage system 1804, in accordance with an embodiment. The carriage system 1804 may define a recess 2602 for the motor 2302 to be attached to the carriage system 1804. The carriage system 1804 may further define a pair of holes 2604 for screws 2606 (explained in FIG. 25) to pass through. A holder plate 3210 (which will be discussed later under belt assembly 1802) may be attached to the recess 2602 using the screws 2606.

In an embodiment, the motor 2206 may rotate the screw rod 2004 which in turn may move the carriage system 1804 up and down along the second axis 1710 based on the direction of rotation of the screw rod 2004. The movement of the carriage system 1804 along the second axis 1710 means that the first tower 1702, along with the system 102 and the integrated cooling system 108, may move along the second axis 1710. The rotation of the screw rod 2004 within the threaded through hole 2406 defined by the carriage system 1804 may have the tendency to rotate the carriage system 1804. The square nut 2410, that surrounds the protrusion 2408, may prevent the rotation of the carriage system 1804.

In an embodiment, the carriage system 1804 may negotiate pitch, rolling, yawing forces and moments within a specified limit and may smoothen the movements along and rotation about the first axis 1708 and the second axis 1710.

In an embodiment, the carriage system 1804 may include an opto sensor, that may generate signals for movement of the primary rods 1806 along the first axis 1708.

Figure 27:
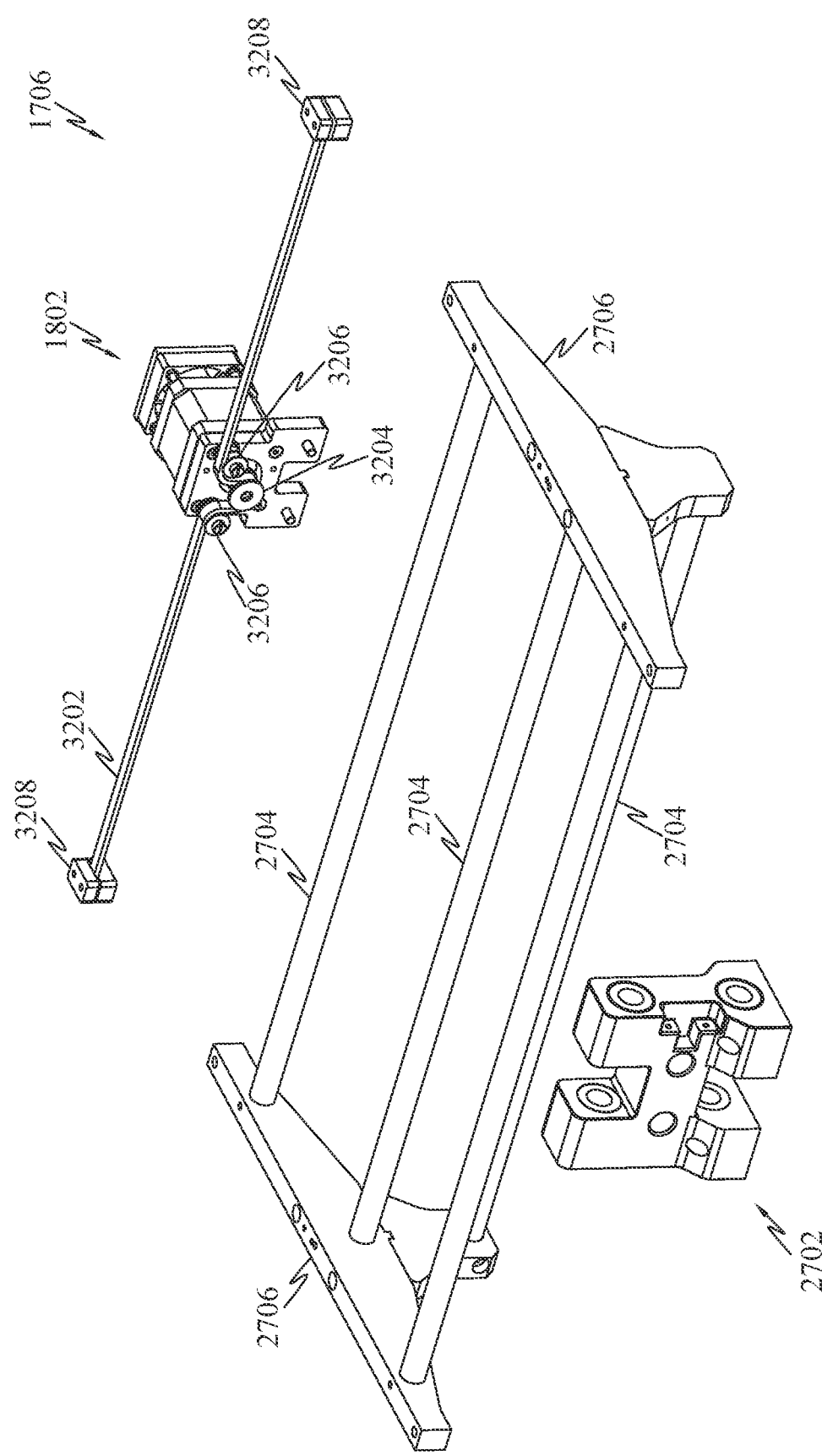
FIG. 27 is an exploded view of the base tower 1706, in accordance with an embodiment.

Base Tower 1706:

The movement system 112 may move the print plate 528 in a required axis, using the base tower 1706. In an embodiment, the required axis may be an x-axis, or any axis that may be parallel to the surface of the print plate 528 and perpendicular to the first axis 1708. For illustrative purposes, the required axis or the x-axis may be referred to as the third axis 1712, hereinafter. FIG. 27 is an exploded view of the base tower 1706, in accordance with an embodiment. The base tower 1706 may include the belt assembly 1802, a base carriage system 2702, and at least three base rods 2704. The three base rods 2704 may be arranged such that the axes of the three base rods 2704 may be parallel to the third axis 1712 and perpendicular to the first axis 1708, and the three base rods 2704 may define a triangular cross section. The three base rods 2704 may be held in place using two print plate support blocks 2706.

Figure 28:
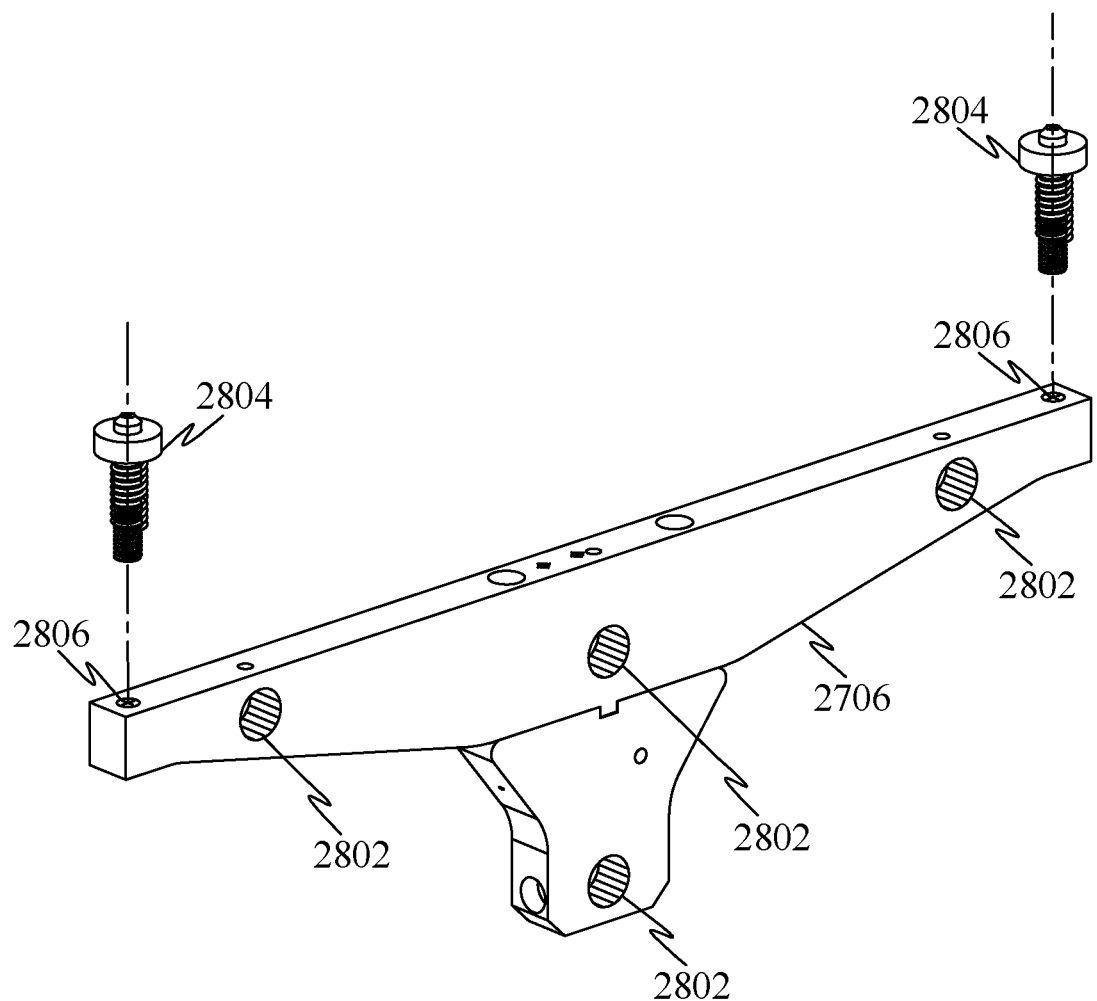
FIG. 28 is an isometric view of a print plate support block 2706, in accordance with an embodiment.

FIG. 28 is an isometric view of the print plate support block 2706, in accordance with an embodiment. Each print plate support block 2706 may define four holes 2802 to support the four base rods 2704. In the instant embodiment, the four base rods 2704 may be arranged such that they form a triangular cross section. The print plate support block 2706 may further define a set of holes 2806 to accommodate structures 2804 to support the print plate 528. The structure 2804 may be a knob that may be threaded and spring loaded to adjust the height and to absorb the shock loads during high speed printing. In another embodiment, the structure 2804 may be a magnetic knob wherein the print plate 528 may be magnetically attached to the print plate support block 2706.

In another embodiment, the base rods 2704 may have a structure attached, similar to the structure 2804 on the print plate support block 2706, to support the print plate 528.

In yet another embodiment, each of the print plate support block 2706 may define four through holes such that the axis of each of the four through holes may be perpendicular to the axis of the holes 2802 and each of the four through holes may extend into each of the four holes 2802. Additionally, four pins that may pass through the four through holes may be used to tighten the four base rods 2704 when the four base rods 2704 may be placed within the four holes 2802.

Figure 29:
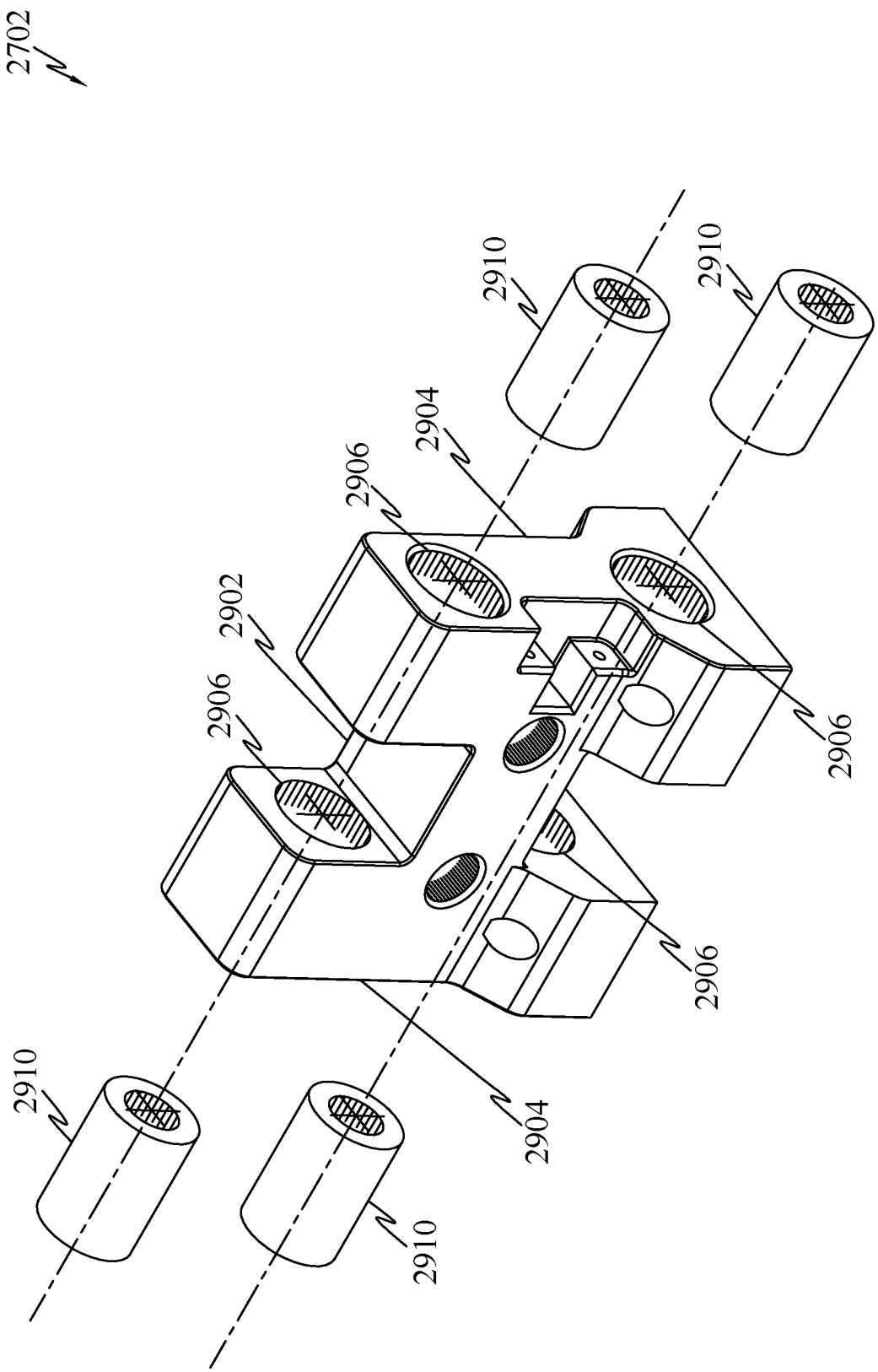
FIG. 29 is an exploded view of a base carriage system 2702, in accordance with an embodiment.

FIG. 29 is an exploded view of the base carriage system 2702, in accordance with an embodiment. The base carriage system 2702 may be an H-shaped or an I-shaped structure. The base carriage system 2702 may be arranged such that the web 2902 of the base carriage system 2702 may be along the third axis 1712 and the two flanges 2904 may be perpendicular to the third axis 1712 and may be parallel to the second axis 1710. Each flange 2904 of the base carriage system 2702 may define two holes 2906 for two of the four base rods 2704 to pass through.

In an embodiment, the base carriage system 2702 may include four bushes 2910 wherein each of the four bushes 2910 may go into each of the four through holes 2906 defined by the base carriage system 2702. The bushes 2910 may define a through hole for the base rods 2704 to pass through.

In an embodiment, the base carriage system 2702 may define four through holes such that the axis of the four through holes may be perpendicular to the axis of the four through holes 2906, defined for the bushes 2910 to pass through, and each of the four through holes may extend into each of the four through holes 2906 defined for the bushes 2910 to pass through. Four pins, that may pass through the four through holes, may be used to tighten the four bushes 2910 and in turn the base rods 2704, within the four through holes 2906.

In an embodiment, the four through holes may be threaded through holes and the four pins may be allen screws that may be used to tighten the bushes 2910 within the through holes 2906 and to restrict the movement of the bushes 2910.

Figure 30:
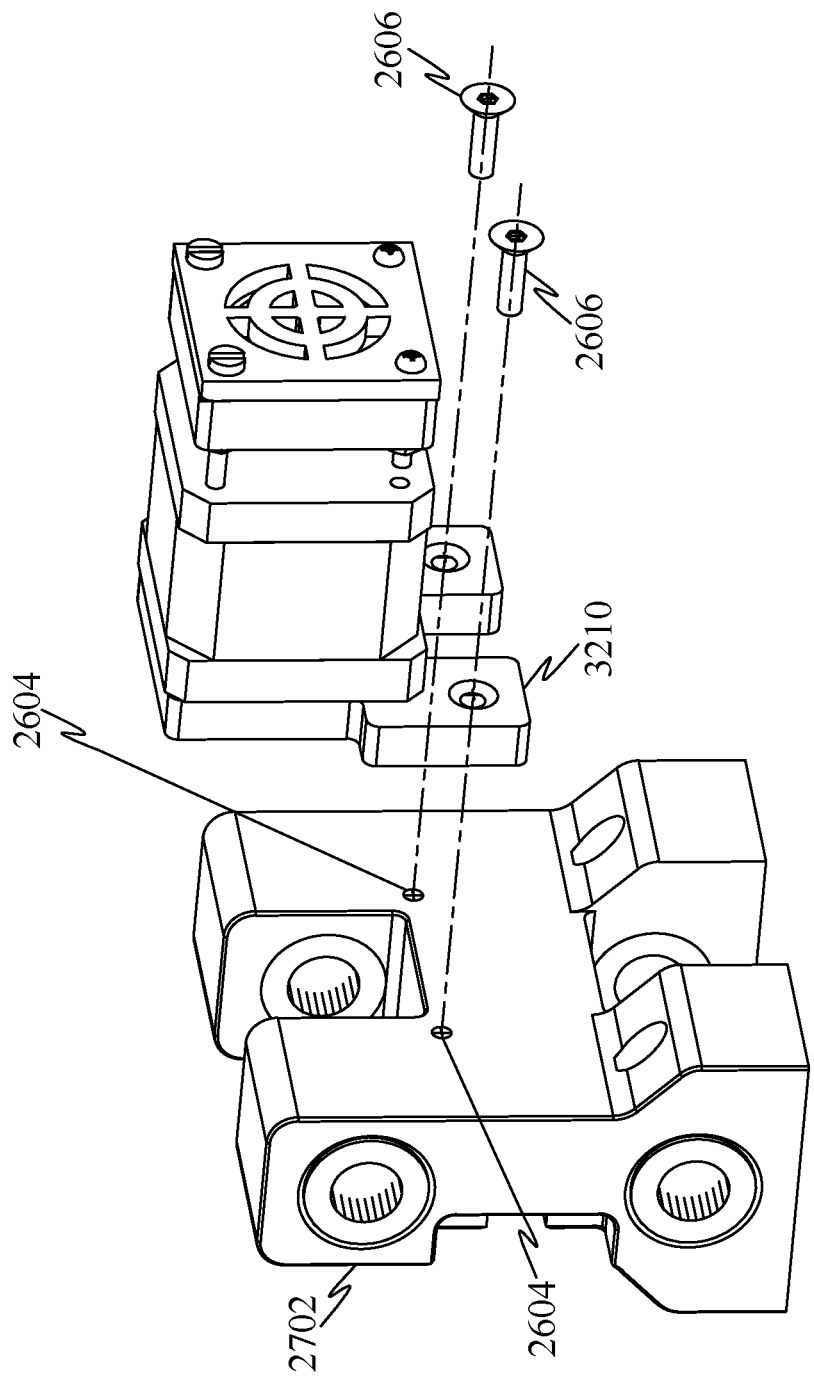
FIG. 30 is an exploded view of the base carriage system 2702 and holder plate 3210, in accordance with an embodiment.

FIG. 30 is an exploded view of the base carriage system 2702 and holder plate 3210, in accordance with an embodiment. The base carriage system 2702 may define a pair of holes 2604 for the screws 2606 to pass through. The holder plate 3210 (which will be discussed later under belt assembly 1802) may be attached to the base carriage system 2702 using the screws 2606.

In an embodiment, the base carriage system 2702 may negotiate pitch, rolling, yawing forces and moments within a specified limit and may smoothen the movements along and about the third axis 1712.

Figure 31A:
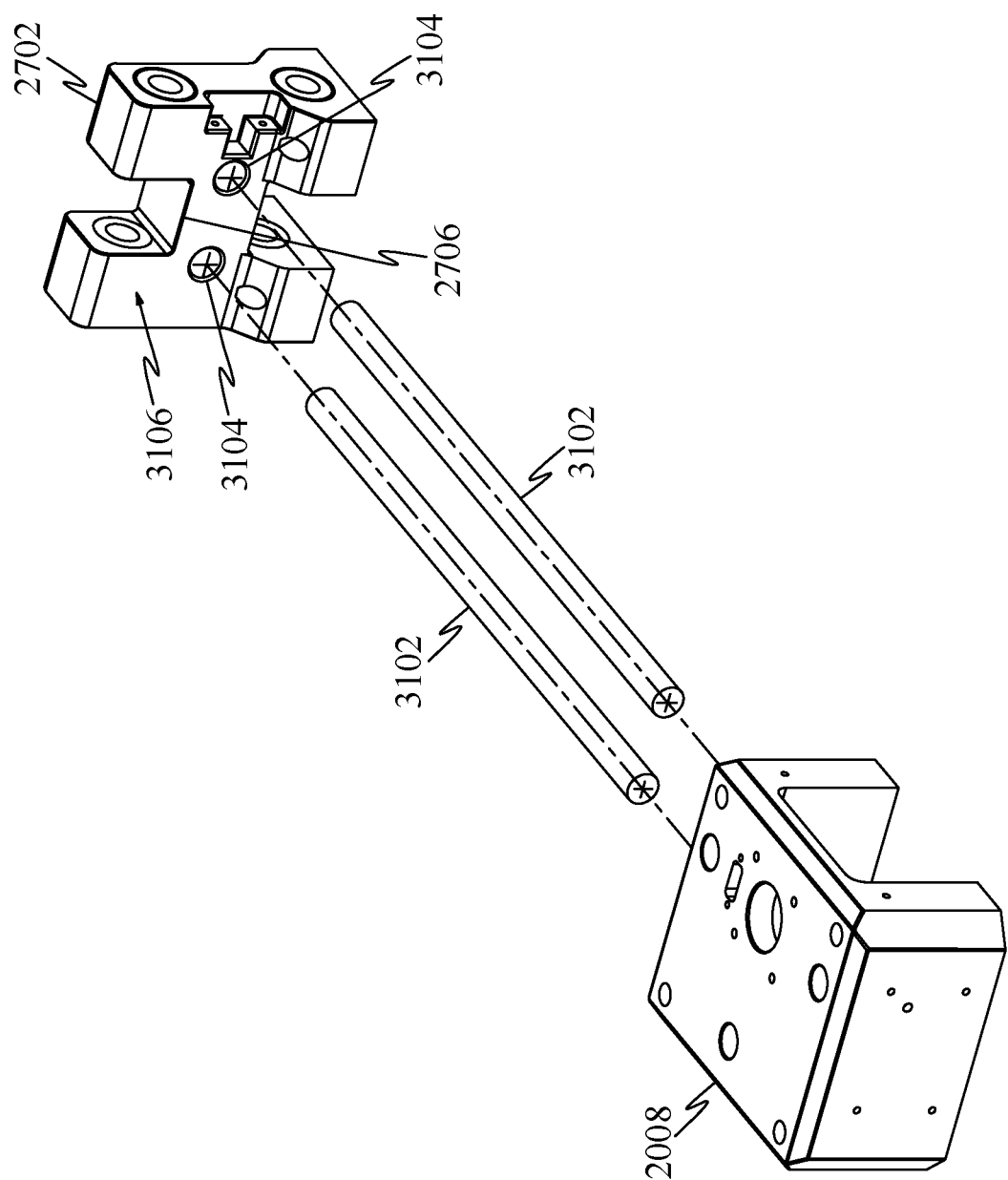
FIGS. 31A and 31B are an exploded view of the base carriage system 2702, support rods 3102 and the motor mount 2008, in accordance with an embodiment.
Figure 31B:
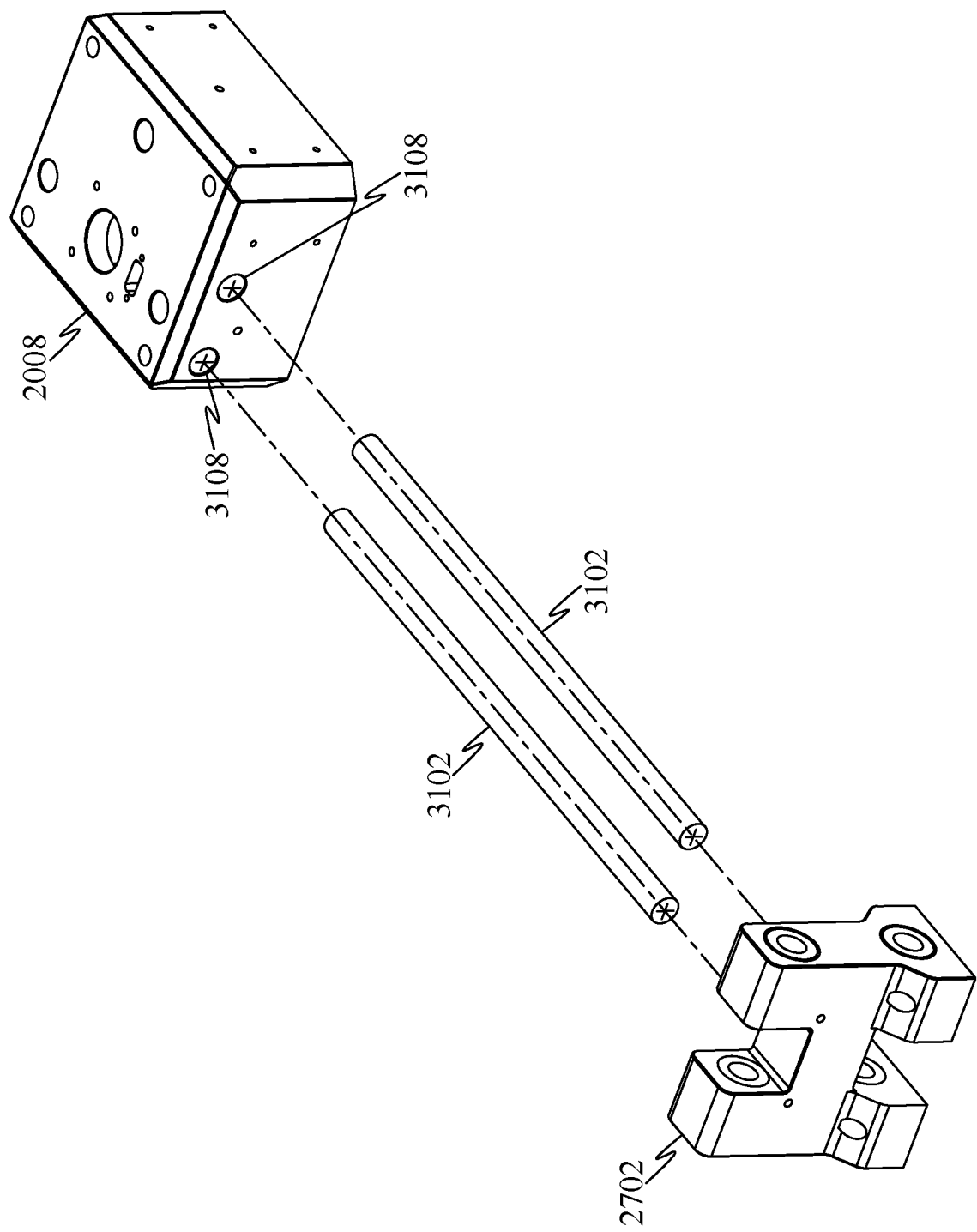

FIGS. 31A and 31B are an exploded view of the base carriage system 2702, support rods 3102 and the motor mount 2008, in accordance with an embodiment. The base carriage system 2702 may define two holes 3104 along front face 3106 of the web 2706 to attach one end of two support rods 3102. The motor mount 2008 may define two holes 3108, such that the axis of the two holes 3108 defined by the motor mount 2008 may be along the same line as that of the axis of the two holes 3104 defined by the base carriage system 2702, to attach the other end of the two support rods 3102. These support rods 3102 may provide stability to the additive manufacturing machine 100 and may prevent the rollover of the base tower 1706 when the print plate 528 moves along the third axis 1712. It may also prevent the toppling of the additive manufacturing machine 100.

Belt Assembly 1802:

The movement system 112 may move the first tower 1702 (and in turn at least the nozzle assembly 206) and the print plate 528 in the required axes using the belt assembly 1802 (a first belt assembly 1802 for moving the first tower 1702 and a second belt assembly 1802 for moving the print plate 528). FIG. 32 is an exploded view of the belt assembly 1802 that may be used to move the first tower 1702 and the print plate 528, in accordance with an embodiment. The belt assembly 1802 may include a belt 3202, a gear 3204, at least two bearings 3206 and a pair of belt holders 3208. The belt 3202 may be attached to the belt holders 3208. In an embodiment, the belt holders 3208 may be belt holding cum tension adjustment mechanism, wherein the belt holder 3208 may define a profiled out split with grooves to hold the belt 3202 in place. This may be used to tighten the belt 3202 and maintain the required tension in the belt 3202. The gear 3204 and the two bearings 3206 may be arranged such that the gear 3204 is placed between the two bearings 3206 and their periphery may be in contact with each other. The belt 3202 may be passed between the gear 3204 and the bearing 3206 assembly such that the belt 3202 may be sandwiched between the gear 3204 and the bearings 3206. The motor 2302 may be attached to the holder plate 3210 using four screws 3212. The motor 2302 may be define four holes 3214 for the screws 3212 to pass through. The holder plate 3210 may define four through holes 3216 such that the axis of the four through holes 3216 are along the same line as that of the axis of the holes 3214 defined by the motor 2302. The holder plate 3210 may also define a through hole 3218 at the centre for the gear 3204 to pass through and affix itself to the motor 2302. The bearings 3206 may be attached to the holder plate 3210 using two pins 3220. The holder plate 3210 may define two holes 3222 for the two pins 3220 to pass through and affix the bearings 3206 to the holder plate 3210.

In another embodiment, the holder plate 3210 may define another set of through holes 3224 for the screws 2606 to pass through. The axis of the set of through holes 3224 defined by the holder plate 3210 may be in line with the axis of the pair of holes 2604 defined by the carriage system 1804 and the base carriage system 2702. A part of the holder plate 3210 may be placed in the recess 2602 defined by the carriage system 1804. The screws 2606 may be used to affix the holder plate 3210 to the carriage system 1804 and the holder plate 3210 to the base carriage system 2702.

Figure 33A:
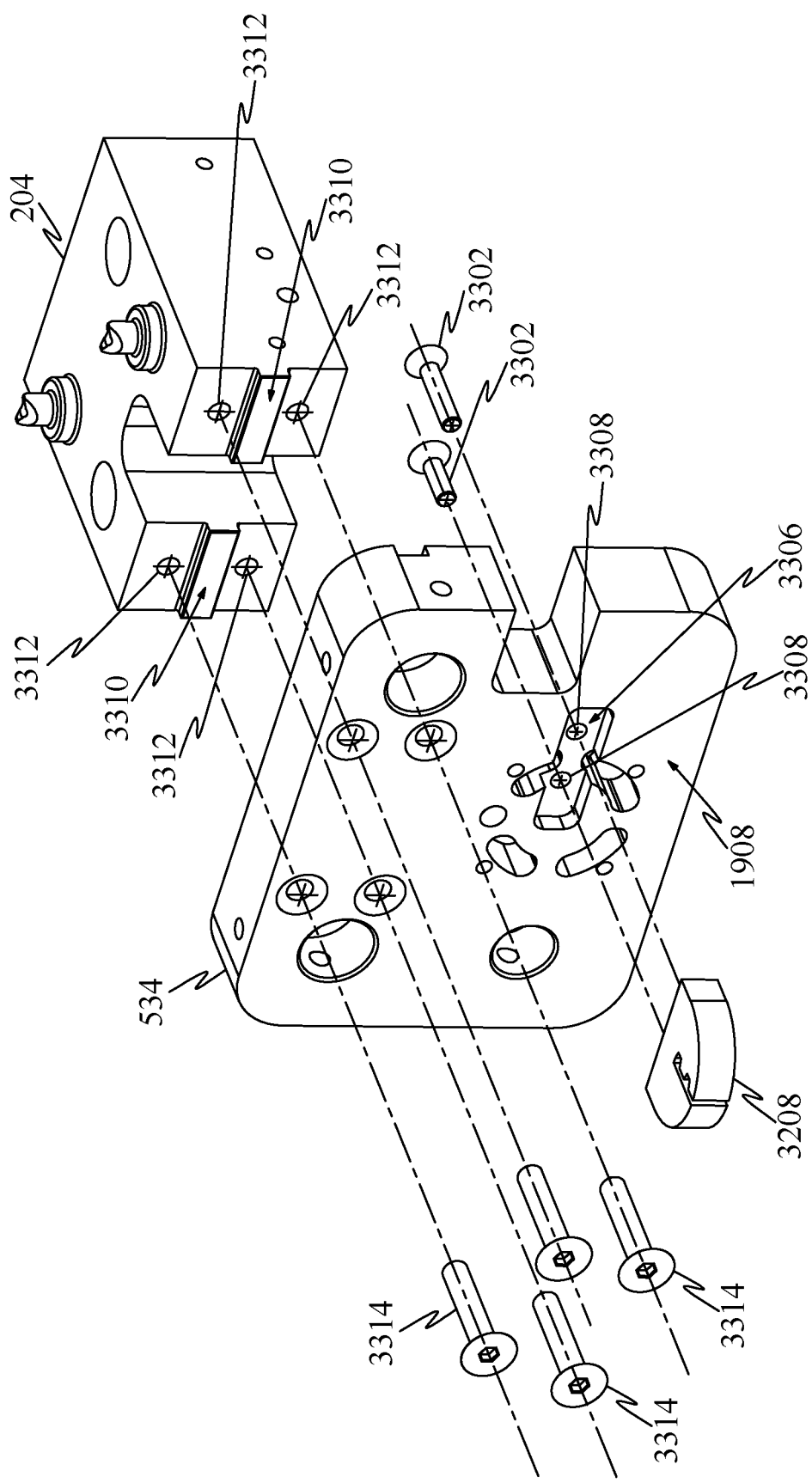
FIG. 33A is an exploded view of a belt holder 3208, being attached to the first holding plate 534 and the first holding plate 534 being attached to the nozzle holder 204, in accordance with an embodiment.

FIG. 33A is an exploded view of the belt holder 3208, being attached to the first holding plate 534, and the first holding plate 534 being attached to the nozzle holder 204, in accordance with an embodiment. In the instant embodiment, the belt 3202 may be attached to the belt holders 3208. One of the belt holders 3208 may be attached to the first holding plate 534 and the other belt holder 3208 may be attached to the second holding plate 1808 using a set of screws 3302. The belt holder 3208 may define a pair of holes 3304 (shown in FIG. 33B) for the screws 3302 to pass through. The front face 1908 of the first holding plate 534 may define a groove 3306 for the belt holder 3208 to fit in and may also define a pair of through holes 3308, such that the axis of the pair of through holes 3308 is along the same axis as that of the pair of holes 3304 defined by the belt holder 3208, for the screws 3302 to pass through. The belt holder 3208 may be placed in the groove 3306 defined on the front face 1908 of the first holding plate 534 and screwed tight using the screws 3302. The nozzle holder 204 may comprise a pair of protrusions 3310. Additionally, the nozzle holder 204 may define four holes 3312 for four screws 3314 to fit in.

Figure 33B:
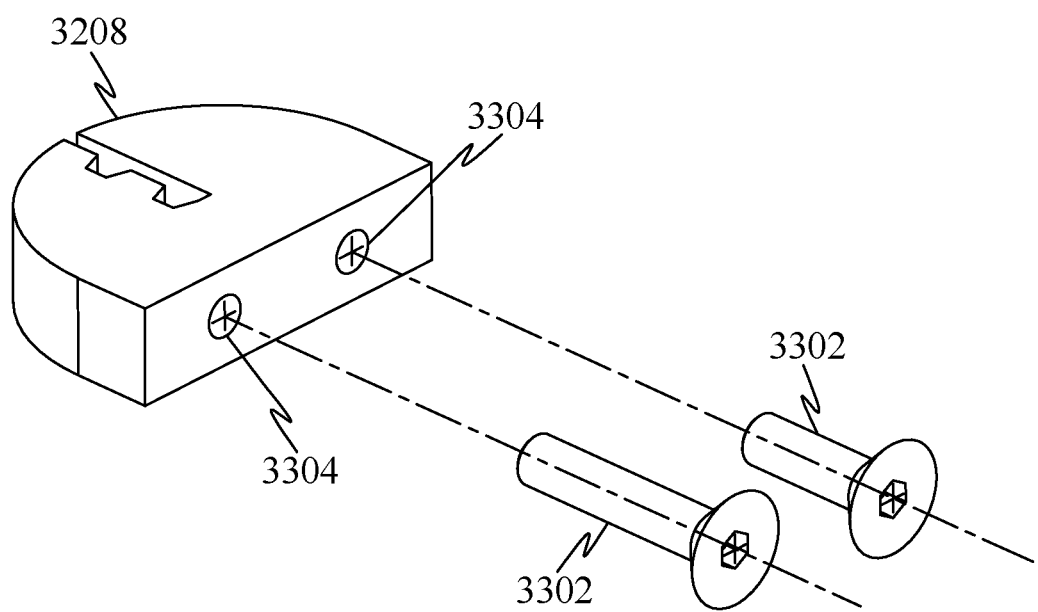
FIG. 33B is an isometric view of the belt holder 3208, in accordance with an embodiment.

FIG. 33B is an isometric view of the belt holder 3208, in accordance with an embodiment. The belt holder may define the holes 3304 for the screws 3302 to pass through.

Figure 34:
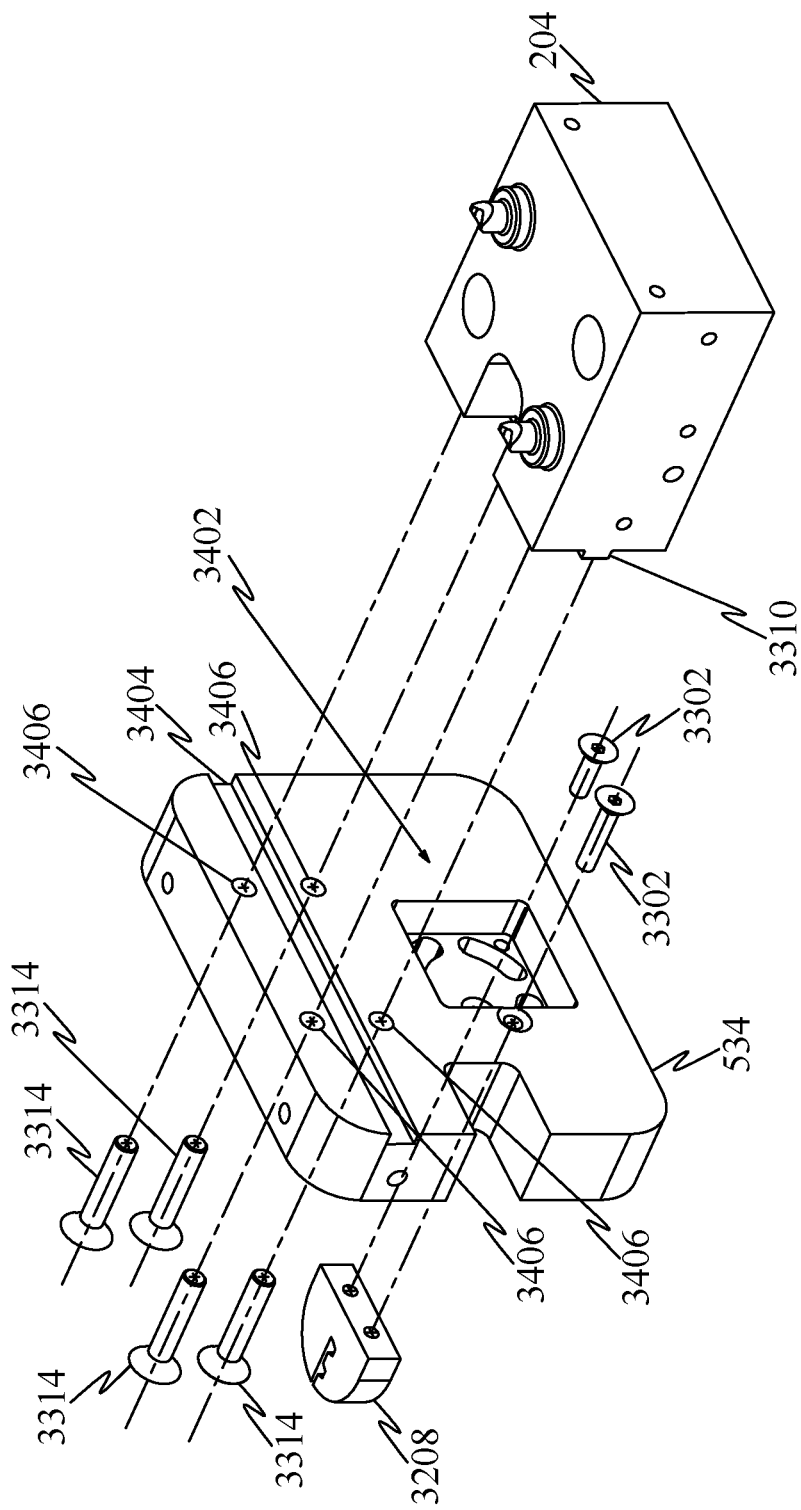
FIG. 34 is an exploded view of the first holding plate 534 and the nozzle holder 204, in accordance with an embodiment.

FIG. 34 is an exploded view of the first holding plate 534 and the nozzle holder 204, in accordance with an embodiment. In an embodiment, back face 3402 of the first holding plate 534 may define a groove 3404 along its length such that the pair of protrusions 3310 on the nozzle holder 204 may fit into the groove 3404 defined by the first holding plate 534.

The first holding plate 534 may define four through holes 3406 for the screws 3314 to pass through. The axis of the four through holes 3406 defined by the first holding plate 534 may be along the same line as that of the axis of the holes 3312 defined by the nozzle holder 204. The nozzle holder 204 and the first holding plate 534 may be attached such that the pair of protrusions 3310 on the nozzle holder 204 may fit in to the groove 3404 defined by the first holding plate 534 and the screws 3314, passing through the through holes 3406 defined by the first holding plate 534 and the holes 3312 defined by the nozzle holder 204, may affix the first holding plate 534 to the nozzle holder 204.

Figure 35:
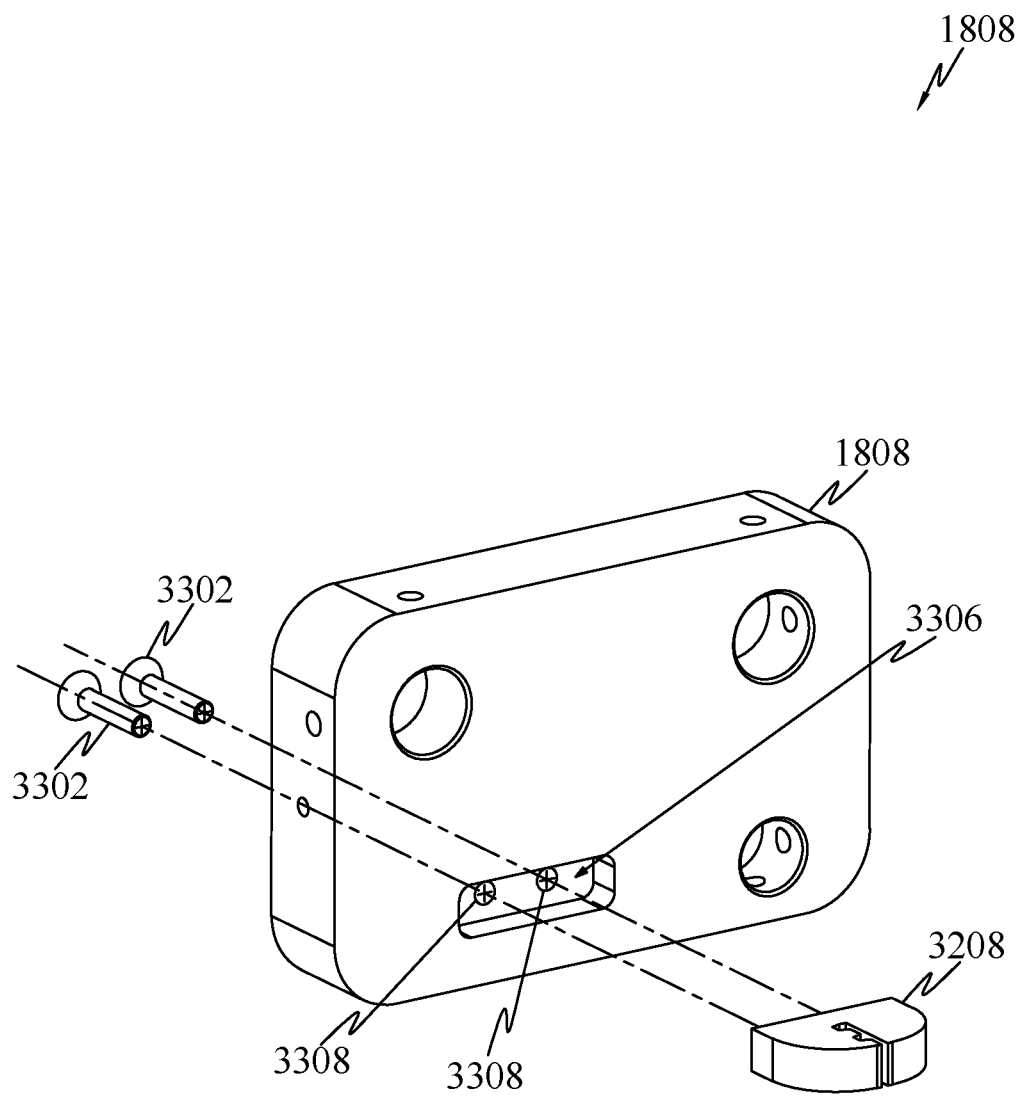
FIG. 35 is an isometric view of the second holding plate 1808, in accordance with an embodiment.

FIG. 35 is an isometric view of the second holding plate 1808, in accordance with an embodiment. The second holding plate 1808 may define the groove 3306 and two through holes 3308 for the screws 3302 to pass through. The belt holder 3208 that may be attached to the second holding plate 1808, may define two holes 3304 for affixing the screws 3302. The belt holder 3208 that may be attached to the second holding plate 1808, may be placed in the groove 3306 defined by the second holding plate 1808 and the screws 3302 may be passed through the through holes 3308 defined by the second holding plate 1808 and may be screwed to the holes 3304 defined by the belt holder 3208.

Figure 36:
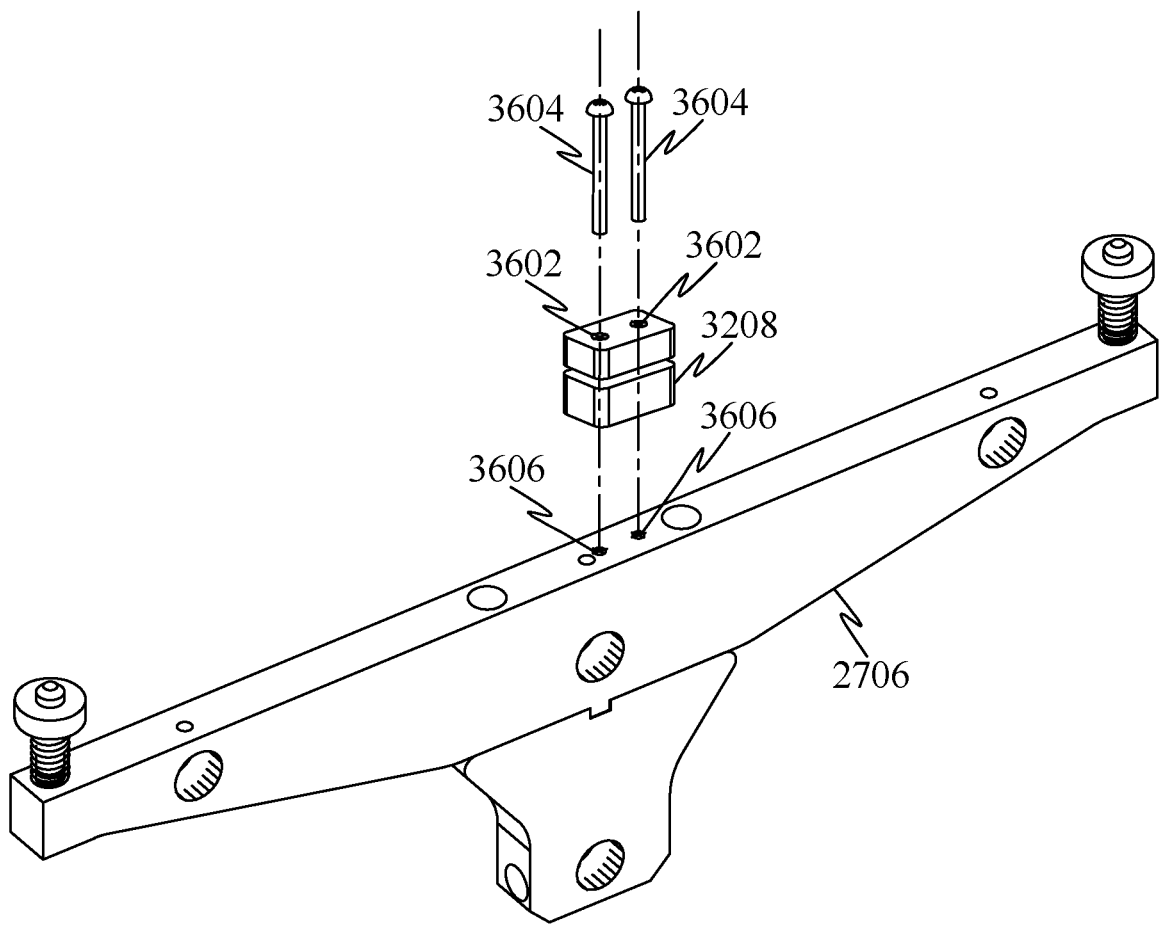
FIG. 36 is an exploded view of the belt holder 3208, being attached to the print plate support block 2706, in accordance with an embodiment.

FIG. 36 is an exploded view of the belt holder 3208, being attached to the print plate support block 2706, in accordance with an embodiment. The belt holder 3208 may define a pair of through holes 3602 for screws 3604 to pass through. The print plate support block 2706 may define a pair of holes 3606, such that the axis of the pair of holes 3606 may be along the same line as that of the axis of the pair of through holes 3602 defined by the belt holder 3208. The belt holder 3208 may be attached to the print plate support block 2706 suing the screws 3604.

In an embodiment, two belt holders 3208 may be attached to two print plate support blocks 2706 using the screws 3604. The belt 3202 may be held in place by the two belt holders 3208.

In an embodiment, when the motor 2302 is turned on, the gear 3204 may rotate, which in turn may drive the belt 3202 that may be in contact with the gear 3204. This may drive the belt 3202 along the first axis 1708 and with it, the belt 3202 may move the first holding plate 534 and the second holding plate 1808 which in turn may move the first tower 1702 along the first axis 1708. The two bearings 3206 located on either side of the gear 3204 reduces the slack on the belt 3202 and provides the required tension without any loss in torque and force.

In another embodiment, when the motor 2302 is turned on, the gear 3204 may rotate, which in turn may drive the belt 3202 that may be in contact with the gear 3204. This may drive the belt 3202 along the third axis 1712 and with it, the belt 3202 may move the print plate support block 2706 which in turn may move the print plate 528 along the third axis 1712.

Figure 37:
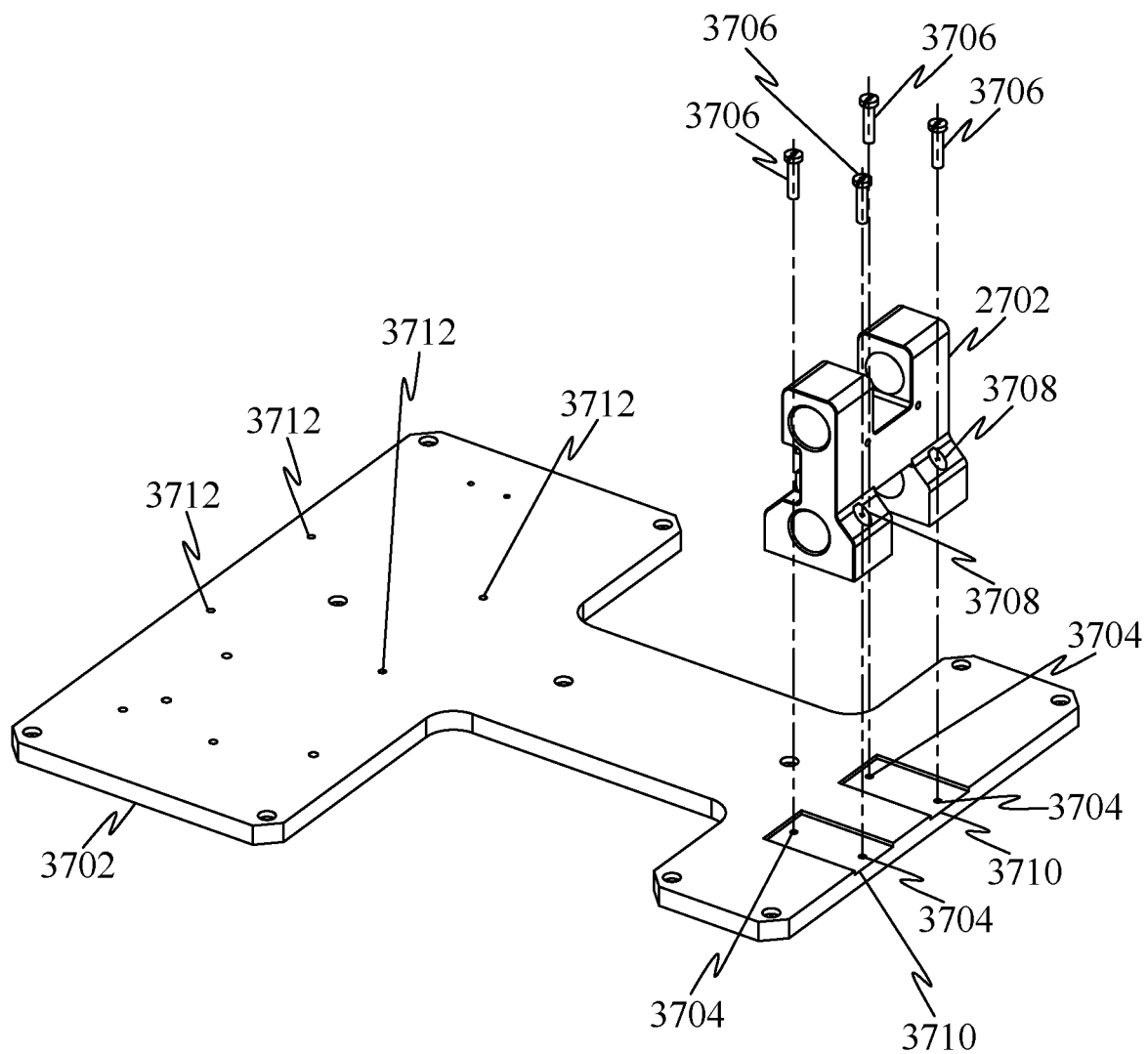
FIG. 37 is an exploded view of a base plate 3702 and the base carriage system 2702, in accordance with an embodiment.

FIG. 37 is an exploded view of a base plate 3702 and the base carriage system 2702, in accordance with an embodiment. In an embodiment, the base plate 3702 may be an H-shaped or an I-shaped plate that may be configured to support and receive the entire load of the additive manufacturing machine 100. The base plate may define a set of grooves 3710 to hold the base carriage system 2702 in place. Each groove 3710 may define a set of threaded through holes 3704 for screws 3706 to pass through. The base carriage system 2702 may define a set of threaded through holes 3708, such that the axis of the threaded through holes 3708 may be along the same line as that of the axis of the threaded through holes 3704 defined by groove 3710 of the base plate 3702, for the screws 3706 to pass through. The screws 3706 may affix the base carriage system 2702 and along with it, the base tower 1706 to the base plate 3702. Additionally, the base plate 3702 may define four threaded through holes 3712, such that the axis of the four threaded through holes 3712 may be in line with the axis of the four threaded through holes 2216 (shown in FIG. 22) defined by the motor mount 2008, for the screws 2218 (shown in FIG. 22) to pass through. The screws 2218 may attach the motor mount 2008, second tower 1704 and along with it, the first tower 1702 to the base plate 3702.

In an embodiment, the base plate 3702 may create the foot print of the additive manufacturing machine 100 and may also stabilize the additive manufacturing machine 100. The base plate 3702 may be light in weight and rigid, that may anchor the additive manufacturing machine 100 to surface. The surface may be that of the table or the floor on which the additive manufacturing machine 100 is being placed. The base plate 3702 may also prevent the vibrations of the additive manufacturing machine 100 caused while printing.

Figure 38:
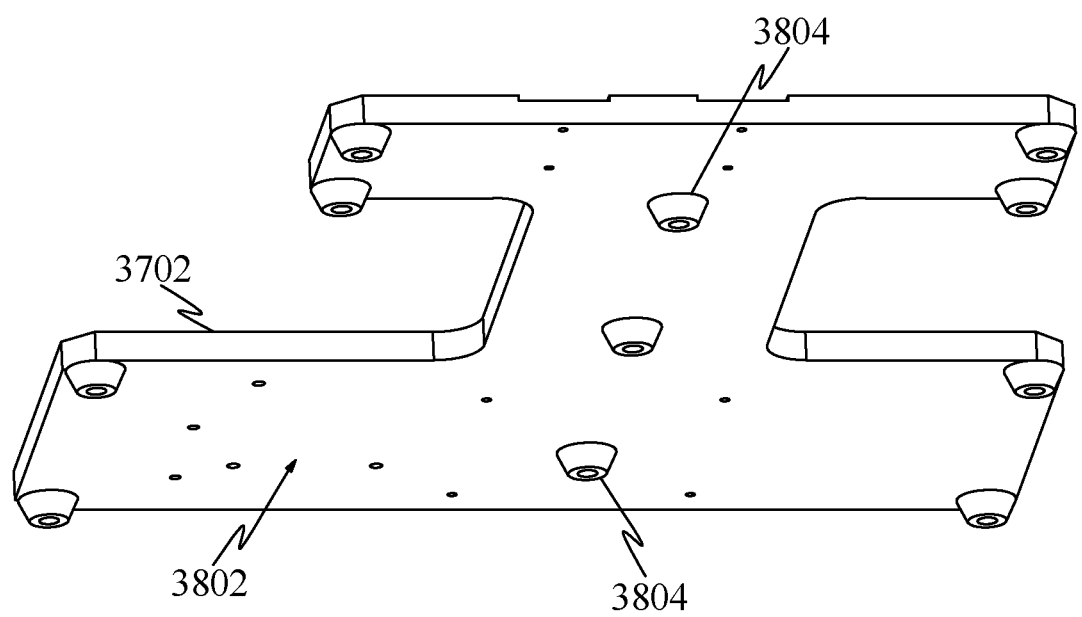
FIG. 38 is an isometric view of the base plate 3702, in accordance with an embodiment.

FIG. 38 is an isometric view of the base plate 3702, in accordance with an embodiment. Bottom side 3802 of the base plate 3702 may comprise a plurality of plastic risers 3804. The plastic risers 3804 may allow for ease of handling and portability of the additive manufacturing machine 100. The plastic risers 3804 may also provide an interface between the additive manufacturing machine 100 and the surface on which it is being placed, damping the energy being transmitted from the additive manufacturing machine 100. It may also help in arresting the movement of the additive manufacturing machine 100 while printing.

The base plate 3702 may also help in distributing the loads from overhang of the first tower 1702. In another embodiment, the base plate 3702 may be scalable to suit the size requirements of the additive manufacturing machine 100.

Figure 39:
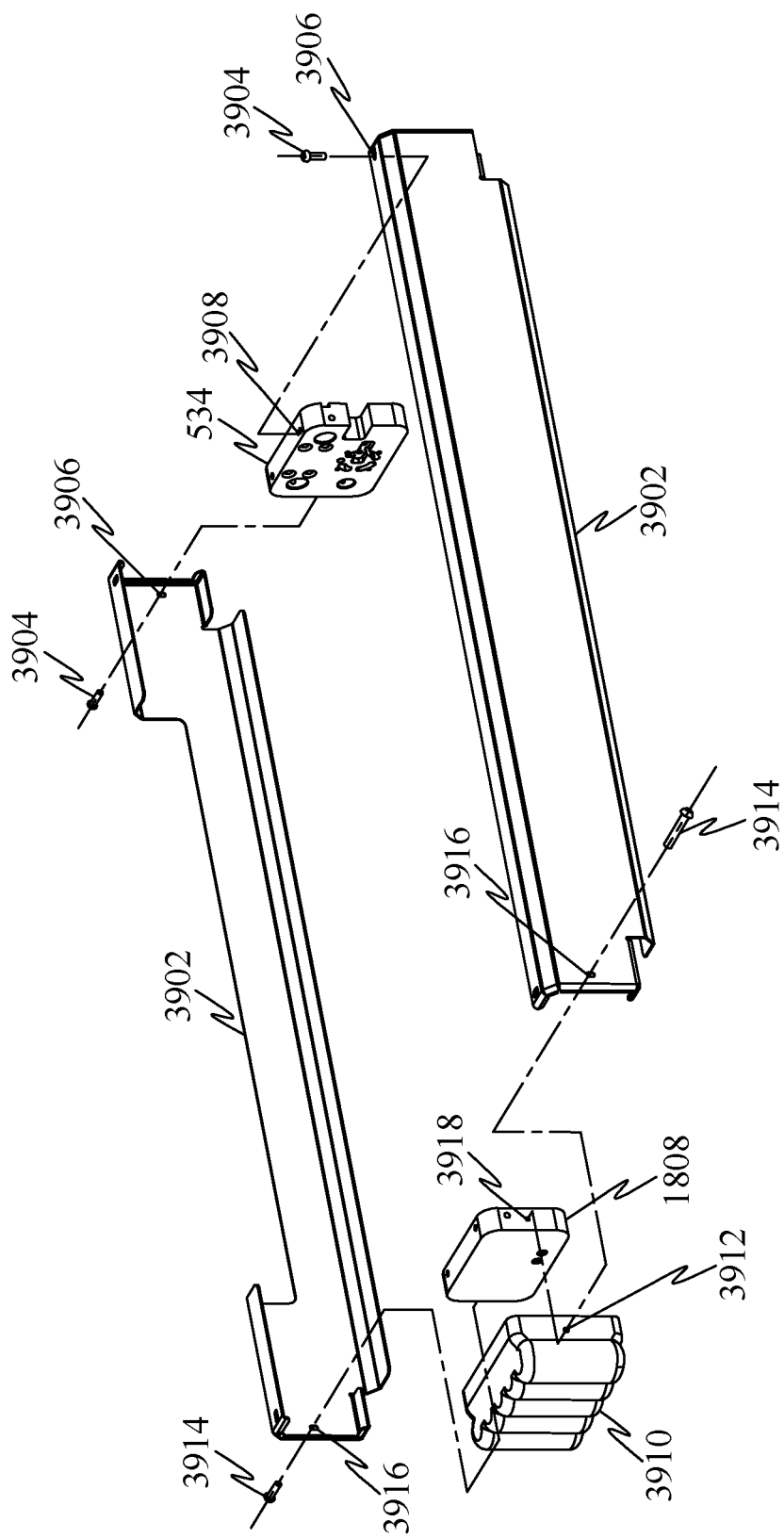
FIG. 39 is an exploded view of the enclosure assembly for the first tower 1702, in accordance with an embodiment.

In an embodiment, the first tower 1702 and the second tower 1704 may include an enclosure assembly. FIG. 39 is an exploded view of the enclosure assembly for the first tower 1702, in accordance with an embodiment. The enclosure assembly may include two primary enclosures 3902. One end of both the primary enclosures 3902 may be attached to the first holding plate 534 using screws 3904. The one end of both the primary enclosures 3902 may define a plurality of through holes 3906 for the screws 3904 to pass through. The first holding plate 534 may define a plurality of holes 3908 such that the axis of the hole 3908 is in line with the axis of the through hole 3906 defined by the primary enclosures 3902.

In an embodiment, other end of both the primary enclosures 3902 may be attached to the second holding plate 1808 using a cap 3910. The cap 3910 may enclose the second holding plate 1808. The cap 3910 may define two through holes 3912 along the edge exactly opposite to each other for screws 3914 to pass through. Other end of both the primary enclosures 3902 may also define a through hole 3916 each for the screw 3914 to pass through. Further, the second holding plate 1808 may also define two holes 3918 along the edge for the screw 3914 to pass through. The through holes 3912 3916 and the holes 3918 may be arranged such that at least one of the through hole 3912 defined by the cap 3910, the through hole 3916 defined by the one end of the primary enclosure 3902 and the hole 3918 defined by the second holding plate 1808 have their axes along the same line. The cap 3910 and the primary enclosures 3902 may be attached to the second holding plate 1808 with the help of the screws 3914.

Figure 40:
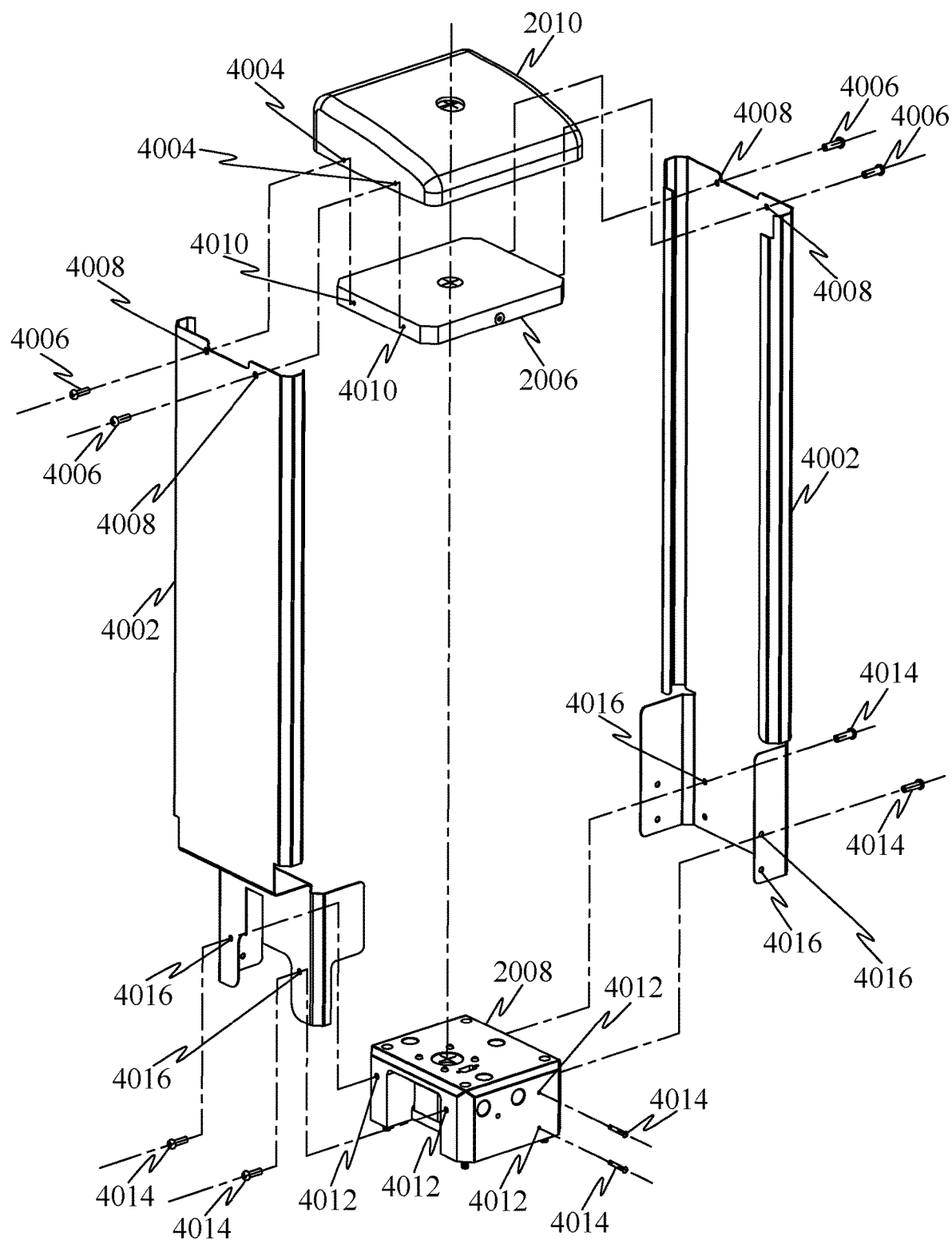
FIG. 40 is an exploded view of the enclosure assembly for the second tower 1704, in accordance with an embodiment.

FIG. 40 is an exploded view of the enclosure assembly for the second tower 1704, in accordance with an embodiment. The enclosure assembly may include two secondary enclosures 4002. One end of both the secondary enclosures 4002 may be attached to the holding plate 2006 using the cap 2010. The cap 2010 may define four through holes 4004, with two through holes 4004 on each side of the cap 2010 for four screws 4006 to pass through. The one end of both the secondary enclosures 4002 may also define two through holes 4008 each, for the screws 4006 to pass through. Further, the holding plate 2006 may also define four holes 4010, with two on each side, along the edge for the screws 4006 to pass through. The through holes 4004 4008 and the holes 4010 may be arranged such that at least one of the through hole 4004 defined by the cap 2010, the through hole 4008 defined by the one end of the secondary enclosure 4002 and the hole 4010 defined by the holding plate 2006 have their axes along the same line. The cap 2010 and the secondary enclosures 4002 may be attached to the holding plate 2006 with the help of the screws 4006.

In an embodiment, other end of both the secondary enclosures 4002 may be attached to the motor mount 2008. The motor mount 2008 may define a set of holes 4012 for screws 4014 to pass through. The other end of the secondary enclosures 4002 may define a set of through holes 4016 for the screws 4014 to pass through. The through hole 4016 on the other end of the secondary enclosures 4002 may be defined such that its axis may be in line with the axis of the hole 4012 defined by the motor mount 2008. The other end of the secondary enclosure 4002 may be affixed to the motor mount 2008 using the screws 4014.

The enclosure assembly (both primary enclosures 3902 and secondary enclosures 4002) may be used to protect all the parts from environmental factors ensuring safety of the parts enclosed. It may also protect the users from pinch hazards due to the moving mechanical parts within the enclosures. The enclosure assembly may also keep the enclosed parts dust proof.

In another embodiment, the controller 110 may be attached to the motor mount 2008.

In an embodiment, size of the primary rods 1806, secondary rods 2002, base rods 2704 and the print plate 528 may be varied to cater to a wide range of print area.

In an embodiment, after printing, arrangements may be provided for the print plate 528 to slide out of the base tower 1706 to transport the printed part to a desired location.

In yet another embodiment, the additive manufacturing machine 100 may include wire casings enclosed within the enclosure assembly. The wire casing may enclose wires interconnecting various parts of the additive manufacturing machine 100 and also wires connecting the various parts to the controller 110.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A movement system for achieving movement of at least a nozzle assembly in an additive manufacturing machine, the movement system comprising:
    a first tower configured to move back and forth along a first axis;
    a belt assembly configured to enable the back and forth movement of the first tower along the first axis, wherein the belt assembly comprises:
        a belt comprising a first end, a second end and a plurality of belt teeth provided between the first end and the second end;
        a first belt holder for securing and selectively tensioning the belt, the first belt holder defining a passage and a plurality of grooves complementing the belt teeth, wherein the first end of the belt is received within the passage and one or more of the belt teeth interface with one or more of the plurality of grooves to secure the first end of the belt;
        a second belt holder, wherein the second end of the belt is engaged to the second belt holder;
        a gear interfacing with the belt to drive the belt; and
        at least two bearings interfacing with the belt, with one bearing on each side of the gear, wherein the bearings are disposed at an offset from the gear such that the belt passes between the gear and the bearings in a way to sandwich the belt between the gear and the bearings, wherein rotation of the gear results in movement of the belt, and thereby the movement of the first tower along the first axis;
    a first holding plate engaged with the first end of the belt via the first belt holder; and
    a second holding plate engaged with the second end of the belt via the second belt holder,
    wherein the first holding plate and the second holding plate are spaced apart.

2. The movement system of claim 1, further comprising a screw,
    wherein,
    the first belt holder defines a threaded hole defined on a side opposing a side that defines the passage, and
    the first belt holder is engaged to the first holding plate, defining a hole, by passing the screw through the hole and driving the screw into the threaded hole.

3. The movement system of claim 2, wherein the first holding plate defines a groove configured to receive at least a portion of the first belt holder when the first belt holder is engaged to the first holding plate, wherein the through hole is exposed to the groove.

4. The movement system as claim in claim 2, wherein the tension in the belt is adjusted by rotating the screw.

5. The movement system of claim 1, wherein the tension in the belt is adjusted by selecting the number of belt teeth to be received within the passage, wherein increase in the number of belt teeth increases the tension in the belt.

6. The movement system of claim 1, wherein the passage and the plurality of grooves are configured to receive the belt into the passage by sliding the belt along an axis of the grooves.

7. The movement system of claim 1, wherein the second belt holder is identical to the first belt holder.

8. The movement system of claim 1, wherein the first belt holder and the second belt holder are engaged to the first tower.

9. The movement system of claim 1, wherein the first tower comprises a first, a second and a third primary rods arranged parallel to the first axis, the three primary rods defining a triangular cross section.

10. The movement system of claim 9, wherein the first and the second primary rods are in a first plane and the third primary rod is in a second plane, wherein the third primary rod is at a shorter distance from one of the first and the second primary rods as compared to the distance from another of the first and the second primary rods.

11. The movement system of claim 9, further comprising a carriage system, wherein the first primary rod and the second primary rod pass through the carriage system, thereby the first primary rod and the second primary rod function as guide rods, whereas the third primary rod is disposed outside of the carriage system to function as support rod to prevent twisting of the first tower about the first axis.

12. The movement system of claim 9, wherein the movement system comprises a second tower configured to enable movement of the first tower up and down along a second axis, wherein the second tower comprises at least three secondary rods arranged parallel to the second axis, the three secondary rods defining a triangular cross section.

13. The movement system of claim 12, further comprising a carriage system, wherein,
    the first primary rod and the second primary rod pass through the carriage system, thereby the first primary rod and the second primary rod function as guide rods;
    the third primary rod is disposed outside of the carriage system to function as support rod to prevent twisting of the first tower about the first axis; and
    the three secondary rods pass through the carriage system.

14. The movement system of claim 1, further comprising:
    a motor driving the gear;
    a first primary rod and a second primary rod engaged to the first holding plate and the second holding plate; and
    a carriage system, wherein the first primary rod and the second primary rod pass through the carriage system, wherein the gear is disposed between the carriage system and one of the first holding plate or the second holding plate.

15. The movement system of claim 14, wherein the gear is disposed within an area confined by planes extending perpendicularly to the first axis and passing through the length of the first primary rod and the second primary rod.

16. The movement system of claim 14, wherein the motor is disposed between the first primary rod and the second primary rod.

17. A movement system for achieving movement of at least a print plate in an additive manufacturing machine, the movement system comprising:
- a base configured to move back and forth along a third axis; and
- a belt assembly configured to enable the back and forth movement of the base along the third axis, wherein the belt assembly comprises:
  - a belt comprising a first end, a second end and a plurality of belt teeth provided between the first end and the second end;
  - a first belt holder for securing and selectively tensioning the belt, the first belt holder defining a passage and a plurality of grooves complementing the belt teeth, wherein the first end of the belt is received within the passage and one or more of the belt teeth interface with one or more of the plurality of grooves to secure the first end of the belt;
  - a second belt holder, wherein the second end of the belt is engaged to the second belt holder;
  - a gear interfacing with the belt to drive the belt; and
  - at least two bearings interfacing with the belt, with one bearing on each side of the gear, wherein the bearings are disposed at an offset from the gear such that the belt passes between the gear and the bearings in a way to sandwich the belt between the gear and the bearings, wherein rotation of the gear results in movement of the belt, and thereby the movement of the base along the third axis;
- a first print plate support block engaged with the first end of the belt via the first belt holder; and
- a second print plate support block engaged with the second end of the belt via the second belt holder, wherein the first print plate support block and the second print plate support block are spaced apart.

18. The movement system of claim 17, further comprising:
- a base carriage system defining at least a pair of through holes, wherein the gear is coupled to the base carriage system;
- a pair of base rods passing through the through holes of the base carriage system, wherein the base rods traverse along the third axis; and
- at least one support rod, which is generally perpendicular to the pair of base rods, engaged to the base carriage system, such that the base carriage system is stationary relative to the support rod.

\* \* \* \* \*